(12) United States Patent
Mihira

(10) Patent No.: US 7,511,842 B2
(45) Date of Patent: Mar. 31, 2009

(54) IMAGE FORMING APPARATUS

(75) Inventor: Sachiko Mihira, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 912 days.

(21) Appl. No.: 10/390,782

(22) Filed: Mar. 19, 2003

(65) Prior Publication Data

US 2003/0218771 A1 Nov. 27, 2003

(30) Foreign Application Priority Data

| Mar. 19, 2002 | (JP) | ............................. 2002-076865 |
| Mar. 20, 2002 | (JP) | ............................. 2002-079118 |
| Mar. 22, 2002 | (JP) | ............................. 2002-081426 |
| Jun. 5, 2002 | (JP) | ............................. 2002-164406 |
| Jun. 5, 2002 | (JP) | ............................. 2002-164407 |
| Jun. 5, 2002 | (JP) | ............................. 2002-164408 |
| Jun. 24, 2002 | (JP) | ............................. 2002-183532 |
| Jul. 24, 2002 | (JP) | ............................. 2002-215542 |
| Mar. 13, 2003 | (JP) | ............................. 2003-068148 |
| Mar. 13, 2003 | (JP) | ............................. 2003-068149 |
| Mar. 13, 2003 | (JP) | ............................. 2003-068150 |
| Mar. 14, 2003 | (JP) | ............................. 2003-070910 |
| Mar. 14, 2003 | (JP) | ............................. 2003-070911 |
| Mar. 14, 2003 | (JP) | ............................. 2003-070912 |
| Mar. 14, 2003 | (JP) | ............................. 2003-070924 |

(51) Int. Cl.
*G06F 15/00* (2006.01)

(52) U.S. Cl. ....................... 358/1.15; 709/217; 709/218; 709/219; 709/203; 713/155; 713/159; 713/168; 713/172; 358/1.14; 358/1.16

(58) Field of Classification Search ......... 713/155–159, 713/168, 172; 358/1.14–1.16; 709/217–219, 709/203

See application file for complete search history.

(56) References Cited

U.S. PATENT DOCUMENTS

| 5,396,763 | A | | 3/1995 | Mayer et al. |
| 5,813,221 | A | | 9/1998 | Geiser et al. |
| 6,266,703 | B1 | * | 7/2001 | Clark et al. ................. 709/237 |
| 6,385,728 | B1 | * | 5/2002 | DeBry ........................... 726/9 |
| 6,424,429 | B1 | | 7/2002 | Takahashi et al. |
| 6,948,122 | B2 | * | 9/2005 | Matsumoto ................. 715/539 |
| 6,968,385 | B1 | * | 11/2005 | Gilbert ....................... 709/229 |

(Continued)

FOREIGN PATENT DOCUMENTS

JP   7-84959   3/1995

(Continued)

OTHER PUBLICATIONS

U.S. Appl. No. 11/211,456, filed Aug. 26, 2005, Takeuchi et al.

*Primary Examiner*—Edward L Coles
*Assistant Examiner*—Chan S Park
(74) *Attorney, Agent, or Firm*—Oblon, Spivak, McClelland, Maier & Neustadt, P.C.

(57) ABSTRACT

An image forming apparatus includes a document control service that generates authentication information corresponding to the request to output a stored document and transmits the authentication information to the network service, and a document output service that receives the authentication information from the network service, obtains the stored document corresponding to the authentication information, and outputs the obtained stored document. After authenticating the stored document, the document control service generates authentication information corresponding to a request to output the stored document from an external network apparatus. The document control service, the external network apparatus, and the document output service can exchange the authentication information instead of the stored document.

15 Claims, 26 Drawing Sheets

U.S. PATENT DOCUMENTS

| | | | |
|---|---|---|---|
| 2002/0051177 A1* | 5/2002 | Nomoto | 358/1.15 |
| 2003/0005133 A1* | 1/2003 | Banerjee et al. | 709/229 |
| 2003/0048470 A1* | 3/2003 | Garcia | 358/1.15 |
| 2003/0218771 A1 | 11/2003 | Mihira | |

FOREIGN PATENT DOCUMENTS

| | | |
|---|---|---|
| JP | 11-31129 | 2/1999 |
| JP | 11-143907 | 5/1999 |
| JP | 11-237969 | 8/1999 |
| JP | 2001-188738 | 7/2001 |
| JP | 2001-243699 | 9/2001 |
| JP | 2001-256010 | 9/2001 |
| JP | 2001-325249 | 11/2001 |
| JP | 2001-334709 | 12/2001 |
| JP | 2002-055868 | 2/2002 |
| JP | 2002-84383 | 3/2002 |
| JP | 2003-242105 | 8/2003 |
| WO | WO 98/19478 | 5/1998 |

* cited by examiner

FIG.4A

```
TICKET
  TICKET ID
  DATA SIZE
```

FIG.4B

```
// TICKET CONTENTS
typedef struct_Ticket{
  unsigned int   ticketId;                              //TICKET ID
  time_t         validTime;                             //EXPIRATION DATE OF TICKET
  int            numFile;                               //NUMBER OF FILE
  struct _documentIds  fileId [MAX_NUM_OF_MERGE_FILE];  //ARRAY OF STRUCTURES EACH INCLUDING FILE ID AND PASSWORD
}Ticket_;

// TICKET CONTROL
typedef struct_Ticket_head{
  unsigned int   currentTicketId;    //CURRENT TICKET NO.
  int            ticketNum;          //NUMBER OF ISSUED TICKETS
}Ticket_head;
```

IMAGE FORMING APPARATUS

BACKGROUND OF THE INVENTION

1. Field of the Invention

The present invention generally relates to an image forming apparatus, and more particularly, to an image forming apparatus that transmits or outputs stored documents or thumbnails thereof, in response to a request from a network apparatus connected via a network. The present invention further relates to a method of obtaining stored documents and thumbnails thereof, a method of outputting stored documents and thumbnails thereof, a system for obtaining stored documents and thumbnails thereof, and a system for outputting stored documents and thumbnails thereof.

2. Description of the Related Art

A multifunctional apparatus is an image forming system that functions as a printer, a copier, a facsimile, and a scanner. The multifunctional apparatus is provided with a display unit, a printing unit, and a scanning unit. Four application programs corresponding to a printer, a copier, a facsimile, and a scanner, respectively, are further provided to the multifunctional apparatus, and are switched to change the function of the multifunctional apparatus. Japanese Laid-open Patent Application No. 2002-84383 discloses such a multifunctional apparatus.

The multifunctional apparatus stores document files (stored document) in a document control data base (DB), for example. The multifunctional apparatus sometimes stores sample images of the stored document, or thumbnails, in the document control DB, for example. The thumbnail is a shrunken image of the stored document with which the user can identify a desired stored document easily.

The multifunctional apparatus is connected with a network apparatus and another multifunctional apparatus via the network. The multifunctional apparatus transmits or outputs a stored document and a thumbnail thereof stored in the document control DB in response to a request from the network apparatus. For example, the multifunctional apparatus outputs the stored document and the thumbnail stored in the document control DB using the printing unit, for example. The stored document and the thumbnail stored in the document control DB are often protected by a password. The multifunctional apparatus requires a user who accesses the stored document to input the password and get authentication.

For example, when the network apparatus operated by the user requests the multifunctional apparatus to output the stored document and the thumbnail stored in the document control DB, the network apparatus transmits the document ID and its password to the multifunctional apparatus to identity the stored document or the thumbnail, and prove the user's authority to access the stored document or the thumbnail. The multifunctional apparatus authenticates the password first, and if the user is authenticated successfully, reads and outputs the stored document and the thumbnail stored in the document control DB.

The multifunctional apparatus supports multi process operations involving various functions such as outputting and transmitting as well as many entities such as the network apparatus and the other multifunctional apparatus.

Conventionally, the multifunctional apparatus needs to authenticate the password for each process redundantly.

Additionally, when the stored document and the thumbnail are used by plural processes, the large amount of data of the stored document or the thumbnail needs to be transferred between the plural processes unnecessarily. As a result, the resources of the multifunctional apparatus are wasted.

Furthermore, if many network apparatuses access the stored documents or the thumbnails simultaneously, the document control DB storing the stored documents and the thumbnails is overloaded.

SUMMARY OF THE INVENTION

Accordingly, it is a general object of the present invention to provide a novel and useful image forming apparatus by which one or more of the problems described above are eliminated.

Another and more specific object of the present invention is to provide an image forming apparatus, a method for an image forming apparatus, and an image forming system, of providing or outputting a stored document, a thumbnail of the stored document stored in the image forming apparatus, or a duplicated thumbnail that is a duplicate of the thumbnail of the stored document, of which functional elements can share an authenticating function for a stored document and provide of output the stored document, the thumbnail, or the duplicated thumbnail without wasting its resources.

To achieve one or more of the above objects, an image forming apparatus having hardware resources used for image forming, a program that processes a user service related to image forming, and a document storage unit that stores therein a stored document, according to the present invention, includes a network service that receives a request to obtain said stored document stored in said document storage unit and obtains, in response to reception of said request, authentication information corresponding to said request, and a document control service that generates said authentication information corresponding to said request and transmits said authentication information to said network service.

After authenticating a stored document, the document control service generates authentication information corresponding to a request to provide a stored document from an external network apparatus, and transmits the authentication information to the external apparatus. The external network apparatus can use the authentication information received from the image forming apparatus to obtain or output the stored document without having to be authenticated again.

In addition, user services of the image forming apparatus can exchange the authentication information of which data size is much smaller than that of the stored document. Accordingly, the image forming apparatus can avoid wasting its resources by not transmitting the stored document itself unnecessarily.

According to another aspect of the present invention, an image forming apparatus having a hardware resource used for image forming, a program that processes a user service related to image forming, and a document storage unit that stores therein a stored document, includes a network service that receives a request to output said stored document stored in said document storage unit and obtains authentication information corresponding to said request to output said stored document; a document control service that generates said authentication information corresponding to said request to output said stored document and transmits said authentication information to said network service; and a document output service that receives said authentication information from said network service, obtains said stored document corresponding to said authentication information, and outputs said obtained stored document.

According to yet another aspect of the present invention, a method of outputting a stored document for an image forming apparatus having a hardware resource used for image forming, a program that processes a user service related to image forming, and a document storage unit that stores therein a stored document, includes the steps of a network service receiving an output request to output said stored document stored in said document storage unit; a document control service generating authentication information corresponding to said output request and transmitting said authentication information to said network service; and a document output service obtaining said authentication information corresponding to said output request, and obtaining and outputting said stored document corresponding to said authentication information.

According yet another aspect of the present invention, a stored document output system that outputs a stored document stored in a document storage unit of an image forming apparatus using at least one external network apparatus, said image forming apparatus being connected to said external network apparatus via a network, wherein said image forming apparatus includes: a network service that receives a request to output said stored document stored in said document storage unit and obtains authentication information corresponding to said request to output said stored document; a document control service that generates authentication information corresponding to said request to output said stored document and transmits said authentication information to said network service; and a document output service that receives said authentication information from said network service, obtains said stored document corresponding to said authentication information, and outputs said obtained stores document.

After authenticating a stored document, the document control service generates authentication information corresponding to a request to output the stored document from an external network apparatus. The external network service obtains the authentication information from the document control service, and the document output service obtains the authentication information from the external network service. Accordingly, the external network service and the document output service can share the authentication function of the document control service.

Since the authentication information corresponding to an output request to output the stored document is exchanged among the network service, the document control service, and the document output service, the image forming apparatus can output the stored document without transferring the stored document unnecessarily among the user services of the image forming apparatus, and without wasting its resources.

According to yet another aspect of the present invention, an image forming apparatus having a hardware resource used for image forming, a program that processes a user service related to image forming, and a document storage unit that stores therein a stored document, includes: a document control service that, in response to reception of an obtaining request to obtain said stored document stored in said document storage unit from an external network apparatus, generates authentication information corresponding to said obtaining request and provides said authentication information to said external network apparatus; and a document output service that, in response to reception of said obtaining request using said authentication information, obtains said stored document corresponding to said authentication information and outputs said stored document.

According to yet another aspect of the present invention, an image forming apparatus having a hardware resource used for image forming, a program that processes a user service related to image forming, and a document storage unit that stores therein a stored document, includes: a document control service that, in response to reception of an obtaining request to obtain said stored document stored in said document storage unit from an external network apparatus, generates authentication information corresponding to said obtaining request and session information corresponding to said authentication information, and provides said session information to said external network apparatus; and a reception of said session information, obtains said stored document corresponding to said authentication information and outputs said stored document.

According to yet another aspect of the present invention, a method of outputting a stored document for an image forming apparatus having a hardware resource used for image forming, a program that processes a user service related to image forming, and a document storage unit that stores therein a stored document, includes the steps of: generating, in response to reception of an obtaining request to obtain said stored document stored in said document storage unit, authentication information corresponding to said obtaining request and providing said authentication information to said external network apparatus; and obtaining, in response to reception of said obtaining request using said authentication information, said stored document corresponding to said authentication information and outputting said stored document.

According to yet another aspect of the present invention, a method of outputting a stored document for an image forming apparatus having a hardware resource used for image forming, a program that processes a user service related to image forming, and a document storage unit that stores therein said stored document, includes the steps of: generating, in response to reception of an obtaining request to obtain said stored document stored in said document storage unit, authentication information corresponding to said obtaining request and session information corresponding to said authentication information, and providing said session information to said external network apparatus; and identifying, in response to reception of said session information from said external network apparatus, authentication information corresponding to the received session information and obtaining and outputting said stored document corresponding to said authentication information.

According to yet another aspect of the present invention, a stored document output system that outputs a stored document stored in a document storage unit of an image forming apparatus using at least one external network apparatus, said image forming apparatus being connected to said external network apparatus via a network, wherein said image forming apparatus comprises: a document control service that, in response to said obtaining request to obtain said stored document stored in said document storage unit, generates authentication information corresponding to said obtaining request and transmits said authentication information to said network service; and a document output service that, in response to reception of output an request using said authentication information from said network service, obtains said stored document corresponding to said authentication information and outputs said obtained stored document.

According to yet another aspect of the present invention, a stored document output system that outputs a stored document stored in a document storage unit of an image forming apparatus using at least one external network apparatus, said image forming apparatus being connected to said external network apparatus via a network, wherein said image forming apparatus includes: a document control service that, in response to an obtaining request from an external network apparatus to obtain said stored document stored in said document storage unit, generates authentication information corresponding to said obtaining request and session information, and transmits said authentication information to said external network apparatus; and a document output service that, in response to reception of an output request using said session information from said external network apparatus, obtains said stored document corresponding to said session information and outputs said obtained stored document.

According to the above aspects of the present invention, after authenticating the stored document, the document control service, generates the authentication information corresponding to the obtaining request to obtain the authentication information from the external network apparatus. The external network apparatus obtains the authentication information from the document control service, and the document output service obtains the authentication information from the external network apparatus so that they can share the authentication function of the document control service.

Since the authentication information corresponding to the obtaining request to obtain the authentication information is exchanged between the external network apparatus, the document control service, and the document output service, the frequency of exchanging the stored document is greatly reduced. Accordingly, the image forming apparatus can avoid wasting its resources and does not overload the network.

Additionally, if the session information corresponding to the authentication information is exchanged among the network apparatus, the document control service, and the document output service, the authentication information does not transferred through the network, and consequently, the image forming apparatus can enhance the security of the stored document.

An image forming apparatus having a hardware resource used for image forming, a program that processes a user service related to image forming, and a document storage unit that stores therein a stored document, according to the present invention, includes a network service that receives a request to output a stored document stored in said document storage unit and obtains authentication information corresponding to said request to output said stored document, a document control service that generates authentication information corresponding to said request to output said stored document and transmits said authentication information to said network service, and a document output service that receives said authentication information from said network service, obtains a stored document corresponding to said authentication information, and output said obtained stored document.

After authenticating a stored document, the document control service generates authentication information corresponding to a request to output the stored document from an external network apparatus. The external network service obtains the authentication information from the document control service, and the document output service obtains the authentication information from the external network service. Accordingly, the external network service and the document output service can share the authentication function of the document control service.

The document control service, the external network apparatus, and the document output service can exchange the authentication information instead of the stored document. Accordingly, the image forming apparatus can output the stored document by directly transmitting the stored document from the document control service to the document output service only once.

According to another aspect of the present invention, an image forming apparatus having a hardware resource used for image forming, a program that processes a user service related to image forming, and a document storage unit that stores therein a stored document, includes a document control service that, in response to reception of an obtaining request to obtain a stored document stored in said document storage unit from an external network apparatus, generate authentication information corresponding to said obtaining request and session information corresponding to said authentication information, and provides said session information to said external network apparatus, and a document output service that, in response to reception of said session information, obtains a stored document corresponding to said authentication information and outputs said stored document.

Since the session information is exchanged between the external network apparatus and the image forming apparatus and the authentication information does not flow through the network, the image forming apparatus according to the present invention can secure the stored document better.

According to another aspect of the present invention, an image forming apparatus that provides, in response to a user request, a thumbnail stored in a document storage unit, includes a network service that receives a request to provide said thumbnail stored in said document storage unit from an external network apparatus, obtains, in response to reception of said request, authentication information corresponding to said request, and provides the location information in which said thumbnail is stored to said external network apparatus, and a document control service that generates authentication information corresponding to said request to obtain said thumbnail, reads said location information in which said thumbnail is stored, corresponding to authentication information, and transmits said location information to said network service.

After authenticating a thumbnail of a stored document, the document control service generates authentication information corresponding to a request to provide a thumbnail from an external network apparatus, and transmits the authentication information to the external apparatus. The external network apparatus can use the authentication information received from the image forming apparatus to obtain or output the thumbnail without having to be authenticated again.

In addition, user services of the image forming apparatus can exchange the authentication information of which data size is much smaller than that of the thumbnail. Accordingly, the image forming apparatus can avoid wasting its resources without transmitting the thumbnail itself unnecessarily.

According to yet another aspect of the present invention, a thumbnail output system has: one or more external network apparatuses and an image forming apparatus connected to said external network apparatus via a network, which outputs a thumbnail of a stored document stored in a document storage unit of said image forming apparatus; wherein said image forming apparatus includes a document control service that receives an obtaining request to obtain authentication information for a thumbnail of a stored document stored in said document storage unit from an external network, generates authentication information corresponding to said obtaining request, and provides said authentication information to said external network apparatus; and a document output service that receives an output request to output a thumbnail using authentication information from said external network apparatus, obtain a thumbnail of a stored document corresponding to said authentication information from said document storage unit, and outputs said thumbnail.

Thanks to the use of the authentication information, the authenticated thumbnail stored in an image forming apparatus can be output by another image forming apparatus by transmitting the thumbnail only once.

Other objects, features, and advantages of the present invention will become more apparent from the following detailed description when read in conjunction with the accompanying drawing.

BRIEF DESCRIPTION OF THE DRAWINGS

FIGS. 4A and 4B illustrate a ticket according to an embodiment;

DETAILED DESCRIPTION OF THE PREFERRED EMBODIMENTS

The preferred embodiments of the present invention will be described in detail by reference to the drawings.

Figure 1:
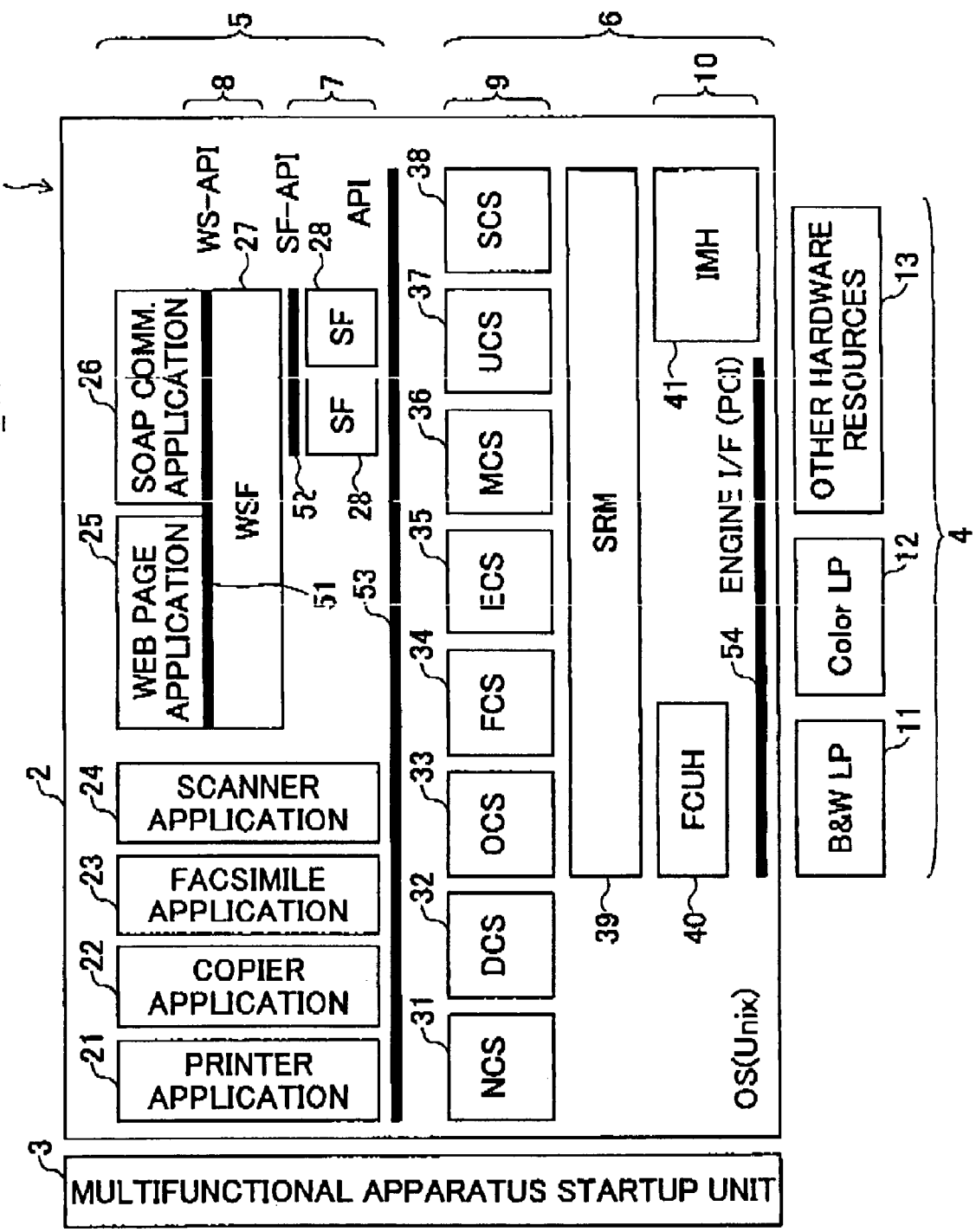
FIG. 1 is a schematic diagram showing the configuration of a multifunctional apparatus according to an embodiment of the present invention.

FIG. 1 is a schematic diagram showing the configuration of a multifunctional apparatus according to an embodiment.

The multifunctional apparatus 1 includes the following: a software group 2, a multifunctional apparatus startup unit 3, and hardware resources 4.

When the multifunctional apparatus 1 is turned on, the multifunctional apparatus startup unit 3 is executed first and activates the application layer 5 and the platform 6. For example, the multifunctional apparatus startup unit 3 reads the programs of the application layer 5 and the platform 6 from a hard disk drive (HDD), stores the read programs in a memory, and activates them.

The hardware resources 4 include a black & white laser printer (B&W LP) 11, a color laser printer (Color LP) 12, and other hardware resources 13 such as a scanner and a facsimile.

The software group 2 includes an application layer 5 and a platform 6 executed on an operating system (OS) such as UNIX (trade mark). The application layer 5 includes programs that provide users with various user services such as those of a printer, a copier, a facsimile, and a scanner.

The application layer 5 includes the following: a printer application 21, a copier application 22, a facsimile application 23, a scanner application 24, a web page application 25, and a simple object access protocol (SOAP) communication application 26. The application layer 5 further includes the following: a shared function layer 7 including one or more shared functions (SF) 28, and a wrapping layer 8 including a web service function (WSF) 27 provided under the web page application 25 and the SOAP communication application 26 and above the SF 28.

The WSF 27 includes an application program interface (API) 51 supporting predefined functions with which the WEB page application 25 and the SOAP communication application 26 request processing. The SF 28 has an API 52 supporting predefined functions with which the WSF 27 requests processing.

In response to reception of requests from the WEB page application 25 and the SOAP communication application 26 through the API 51, the WSF 27 selects one of the SFs 28 based on the request. The WSF 27 transmits the request received through the API 51 to the SF 28 selected based on the request through the API 52. In response to reception of the request through the API 52, the SP 28 handles the request.

For example, the multifunctional apparatus 1 includes two SF's 28. One of the SFs 28 may handle documents control service 123 (to be described later), and the other of the SFs 28 may handle documents output service 130.

The platform 6 includes the following: a control service layer 9, a system resource manager (SRM) 39, and a handler layer 10. In response to requests from the application layer 5, the control service layer 9 interprets them and submits requests for using hardware resources 4. The SRM 39 controls one or more items of the hardware resources 4 and arbitrates the requests issued by the control service layer 9. In response to the requests from the SRM 39, the handler layer 10 reserves and controls the hardware resources 4.

The control service layer 9 includes one or more service modules such as a network control service (NCS) 31, a delivery control service (DCS) 32, an operation panel control service (OCS) 33, a facsimile control service (FCS) 34, an engine control service (ECS) 35, a memory control service (MCS) 36, a user information control service (UCS) 37, and a system control service (SCS) 38.

The platform 6 has an application program interface (API) 53 through which the application layer 5 can request processing by calling predefined functions. The OS concurrently executes programs of the application layer 5 and the platform 6 as processes.

The process of NCS 31 provides application programs requiring network I/O with a commonly usable service. For example, the process of NCS 31 distributes data received through the network using various protocols to corresponding application programs, and mediates the transmitting of data from the application programs to be transmitted through the network.

The NCS 31 controls data exchange with an external network apparatus connected thereto through the network by HyperText Transfer Protocol Daemon (httpd) using HyperText Transfer Protocol (HTTP).

The process of DCS 32 distributes stored documents, for example. The process of OCS 33 controls the operation panel that interfaces an operator and the system.

The process of FCS 34 performs, in response to a request from the application layer 5, facsimile communication through a PSTN or an ISDN, the registration and reference of various facsimile data, the reading of facsimile, and the printing of received facsimile data.

The process of ECS 35 controls the engines of the black & white laser printer 11, the color laser printer 12, and the other hardware resource 13. The process of MCS 36 performs the reservation and discharge of memory area, the storage/retrieval of data to/from the HDD, and the compression and decompression of image data, for example. The process of UCS 37 controls user information.

The process of SCS 38 performs application control, operational unit control, system screen display, LED display, hardware resource control administration, interruption application control, and so forth.

The process of SRM 39 controls the system and the hardware resources 4 together with SCS 38. The process of SRM 39 arbitrates requests from an upper rank layer to use hardware resources 4 such as the black & white laser printer 11 and the color laser printer 12 and controls their execution.

The process of SRM 39 positively determines whether a requested item of the hardware resources 4 is usable (whether the requested item of the hardware resources 4 is not in use by another request). If the requested item is usable, the process of SRM 39 so informs the upper rank layer.

The process of SRM 39 schedules the use of hardware resources 4 in response to the requests from the upper rank layer. The process of SRM 39 also directly controls, for example, the paper transportation and image forming of the printer engine, memory reservation, and file creation.

The handler layer 10 includes a facsimile control unit hander (FCUH) 40 that controls the facsimile control unit (FCU) to be described later and an image memory handler (IMH) 41 that assigns memory region to processes and controls the assigned memory region. SRM 39 and FCUH 40 sends processing requests to the hardware resources 4 using predefined functions through an engine interface (I/F) 54.

In the multifunctional apparatus 1, processing commonly required by the application programs is handled by the platform 6.

Figure 2:
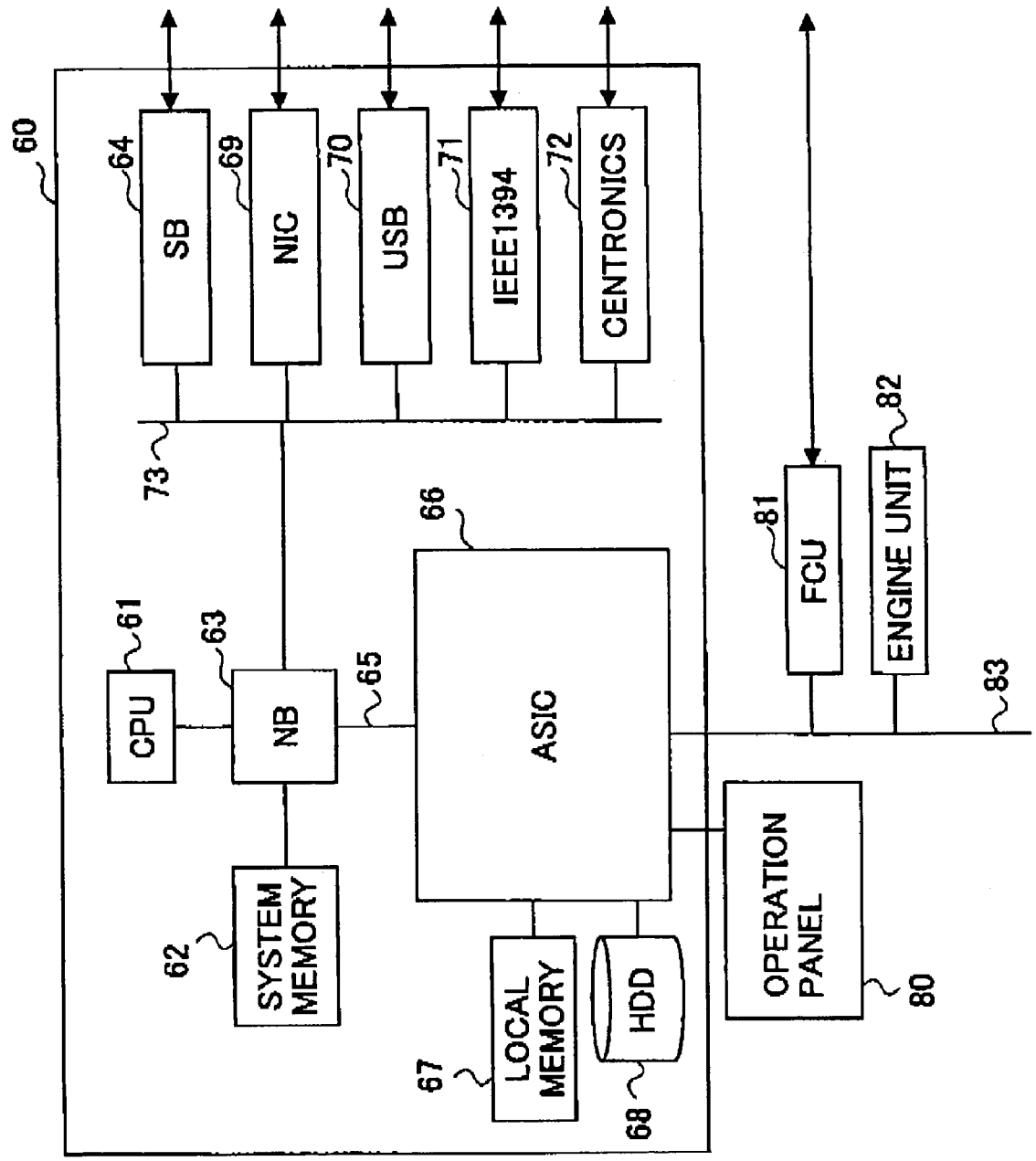
FIG. 2 is a schematic diagram showing the hardware structure of a multifunctional apparatus according to an embodiment.

FIG. 2 is a schematic diagram showing the hardware configuration of a multifunctional apparatus according to an embodiment. The multifunctional apparatus 1 is provided with the following: a controller 60, an operation panel 80, a facsimile control unit (FCU) 81, and an engine unit 82.

The controller 60 is further provided with a CPU 61, a system memory 62, a north bridge (NB) 63, a south bridge (SB) 64, ASIC 66, a local memory 67, an HDD 68, a network interface controller (NIC) 69, a USB device 70, IEEE 1394 device 71, and a centronics device 72.

The operation panel 80 is directly connected to ASIC 66 of the controller 60. FCU 81 and the engine unit 82 are connected to ASIC 66 of the controller 60 through a PCI bus 83.

The local memory 67, the HDD 68, and so forth are connected to ASIC 66 of the controller 60. CPU 61 and ASIC 66 are mutually connected through NB 63 that is one of the CPU chip set. Even if the specification of the CPU interface of CPU 61 is not disclosed, CPU 61 and ASIC 66 can be connected through NB 63 without causing any problem.

ASIC 66 and NB 63 are mutually connected through accelerated graphics port (AGP) 65 instead of the PCI bus. The multifunctional apparatus 1 needs to simultaneously execute a plurality of processes that form the application layer 5 and the platform 6. Accordingly, ASIC 66 and NB 63 need to be connected through ACP 63 that is much faster than the PCI bus to avoid the degrading of performance.

CPU 61 controls the entire operation of the multifunctional apparatus 1. CPU 61 executes NCS 31, DCS 32, OCS 33, FCS 34, ECS 35, MCS 36, UCS 37, SCS 38, SRM 39, FCUH 40, and IMH 41 as processes. CPU 61 also executes the printer application 21, the copier application 22, the facsimile application 23, and the scanner application 24, the web page application 25, SOAP communication application 26, WSF 27, and SF 28 that form the application layer 5.

NB 63 is a bridge to mutually connect CPU 61, the system memory 62, and SB 64, ASIC 66, NIC 69, the USB device 70, the IEEE 1394 device 71, and the centronics device 72. The SB 64, NIC 69 the USB device 70, the IEEE 1394 device 71, and the centronics device 72 are connected to the NB 63 through the PCI bus 73. The SB 64 is a bridge to connect ROM, the PCI bus, and peripheral devices to the NB 63.

The system memory 62 is a memory to be used as an imaging memory of the multifunctional apparatus 1, for example. The local memory 67 is used as an image buffer for copying, a code buffer, and so forth.

ASIC 66 is an integrated circuit for image processing applications that is provided with hardware elements for image processing. The HDD 68 is a storage device that stores image data, document data, programs, font data, forms, and so forth. The operation panel 80 is an operational unit that receives the operator's input and displays various kinds of information for the operator.

The NIC 69 is an interface device that connects the multifunctional apparatus 1 to the network. The USB device 70, the IEEE 1394 device 71, and the centronics device 72 are interface devices that comply with respective specifications thereof. The FCU 81 is provided with a memory. The memory provided in the FCU 81 can temporarily store therein fac simile data received while, for example, the multifunctional apparatus 1 is turned off.

1. Method of Obtaining a Stored Document

First Embodiment

Figure 3:
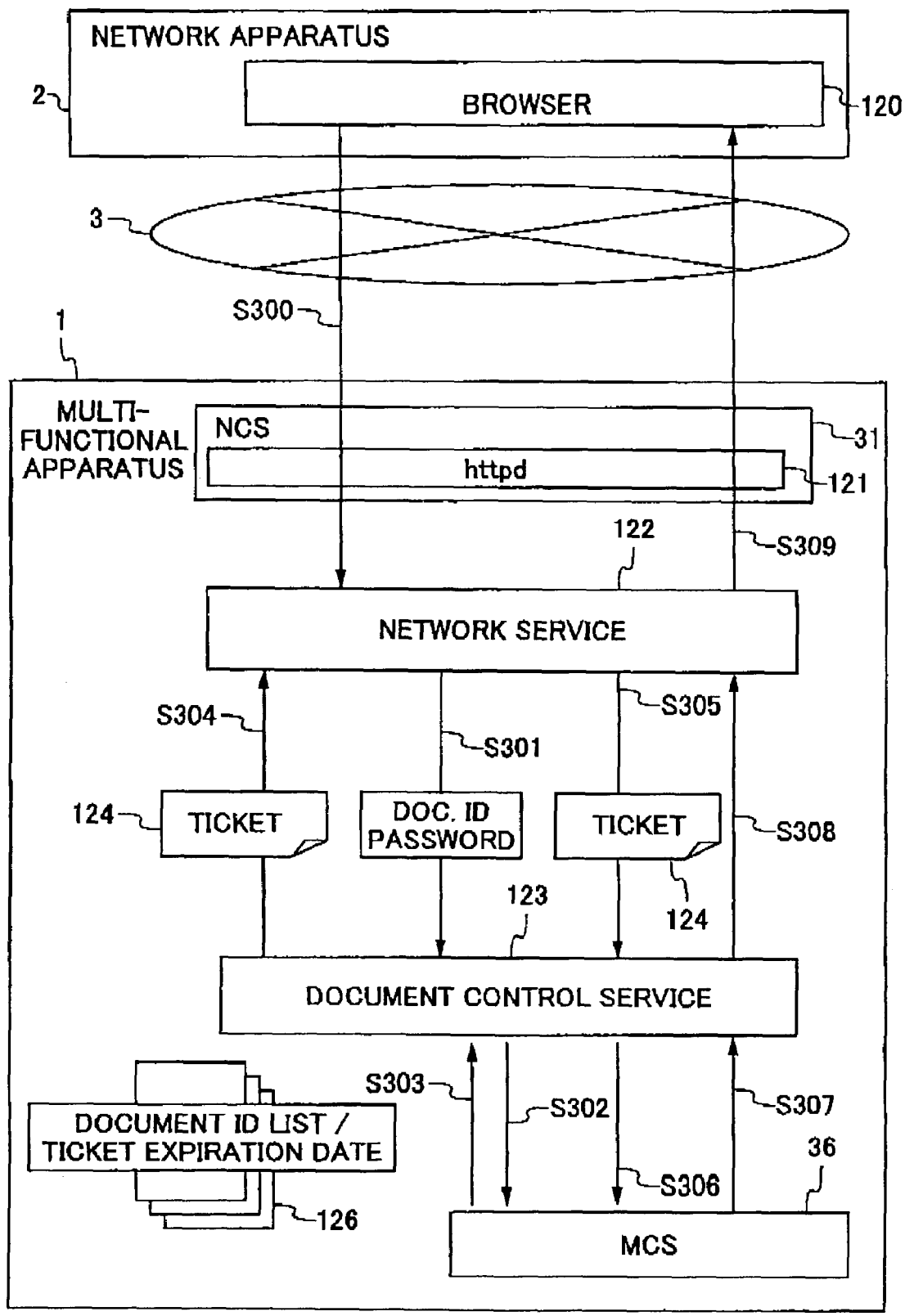
FIG. 3 is a schematic diagram for explaining a method of obtaining a stored document according to the first embodiment.

FIG. 3 is a schematic diagram for explaining a method of obtaining a stored document according to an embodiment. In FIG. 3, functional elements irrelevant to the description are not shown.

As showed in FIG. 3, a network apparatus 2 is connected to the multifunctional apparatus 1 via a network 3 such as the Internet. The network apparatus 2 obtains a document file (stored document) stored in the multifunctional apparatus 1 using the method of obtaining a stored document.

A browser 2 of the network apparatus 2 obtains the list of stored documents and the document IDs thereof stored in the multifunctional apparatus 1 from the multifunctional apparatus 1 using an HTTP request and an HTTP response, for example, in advance. A user operating the network apparatus 2 selects a stored document that the user desires to obtain from the list displayed on the screen of the browser 120, and inputs a password to obtain the desired stored document, if necessary. Then, the user clicks a button provided in the screen of the browser 120 with a mouse, for example, to obtain the stored document.

In step S300, the browser 120 of the network apparatus 2 creates an HTTP request including the document ID and the password of the stored document selected by the user, and transmits it to the multifunctional apparatus 1 via the network 3 such as the Internet. The HTTP request from the network apparatus 2 is transmitted to a network service 122 via the httpd 121 of NCS 31. The network service 122 is included in the web page application 25. The network service 122 may be provided as a control service.

After step S300, the network service 122 transmits the document ID and the password or the stored document to a document control service 123, and requests the document control service 123 to obtain a ticket 124 in step S301. The network service 122 calls, for example, a function "base64Binary getDocTicket(arrayOfUnsignedInt DocId, arrayOfString password) to obtain a ticket, where parameters "DocId" and "password" are the document ID of the stored document and the password thereof, respectively.

The document control service 123 is provided in WSF 27 and SP 28. The document control service 123 may be provided as a control service.

After step S301, the document control service 123 transmits the received document ID of the stored document and the received password of the stored document to MCS 36, and requests MCS 36 to authenticate the password in step S302. The document control service 123 calls a function "int mcsCheckPassword (unsigendInt DocId, string password)" to request MCS 36 to authenticate the document ID and the password of the stored document, where parameters "DocId" and "password" are the document ID and the password, respectively.

MCS 36 authenticates the password received from the document control service 123. After step S302, MCS 45 transmits the result of the password authentication to the document control service 123 in step S303. MCS 36 returns the result of the password authentication to the document control service 123 as a value of the function for requesting authentication.

When the password is authenticated, the document control service 123 generates a ticket as showed in FIGS. 4A and 4B. FIGS. 4A and 4B illustrate a ticket according to an embodiment.

FIG. 4A illustrates a structure of the ticket 124 exchanged between the network service 122 and the document control service 123. The ticket 124 contains a ticket ID and data size.

FIG. 4B illustrates a table 126 for collating the ticket 124. The document control service 123 holds the table 126. The table 126 contains ticket content information and ticket control information. The ticket content information contains includes the ticket ID, the validity time period, and a structure of a file ID and its password as the document ID. The ticket control information includes a current ticket number and the number of generated tickets. The ticket 124 and the table 126 are correlated by the ticket ID.

In step S304, the document control service 123 transmits the generated ticket 124 to the network service 122. The document control service 123 transmits the ticket 124 to the network service 122 as a value of the function for obtaining a ticket.

After step S304, the network service 122 transmits the ticket 124 received in step S304 to the document control service 123, and requests the document control service to obtain the stored document in step S305. The network service 122 calls a function "int getDocments (base64Binary ticket)" to request the document control service 123 to obtain the stored document, where a parameter "ticket" is the ticket 124.

The document control service 123 checks the validity of the received ticket 124. In step S306, if the received ticket 124 is valid, the document control service 123 transmits the document ID corresponding to the ticket 124 to MCS 36, and request MCS 36 to output the stored document. The document control service 123 calls, for example, a function "boolean mcsOpenPage (unsignedInt DocID)" to request MCS 36 to output the stored document, where a parameter "DocID," is the document ID of the stored document.

After step S306, MCS 36 reads the stored document corresponding to the document ID received from the document control service 123 from a document control database (DB) stored in the HDD 68, for example, and transmits the read stored document to the document control service 123 in step S307. MCS 36 transmits the stored document corresponding to the document ID to the document control service 123 as a value of the function for outputting a stored document.

After step S307, the document control service 123 transmits the stored document received from MCS 36 to the network service 122 in step S308. The stored document is transmitted from the document control service 123 to the network service 122 as a value of the function for obtaining a stored document.

After step S308, the network service 122 sends the stored document received from the document control service 123 to the network apparatus 2 via httpd 121 of NCS 31 in step S309.

The network apparatus 2 displays the stored document obtained from the multifunctional apparatus 1 on the screen of the browser 120. Accordingly, the user can easily obtain the stored document stored in the multifunctional apparatus 1 by operating the browser 120 of the network apparatus 2. On the other hand, since the ticket 124 is transferred instead of the stored document itself, the multifunctional apparatus 1 can prevent its resources from being wasted.

Second Embodiment

Figure 5:
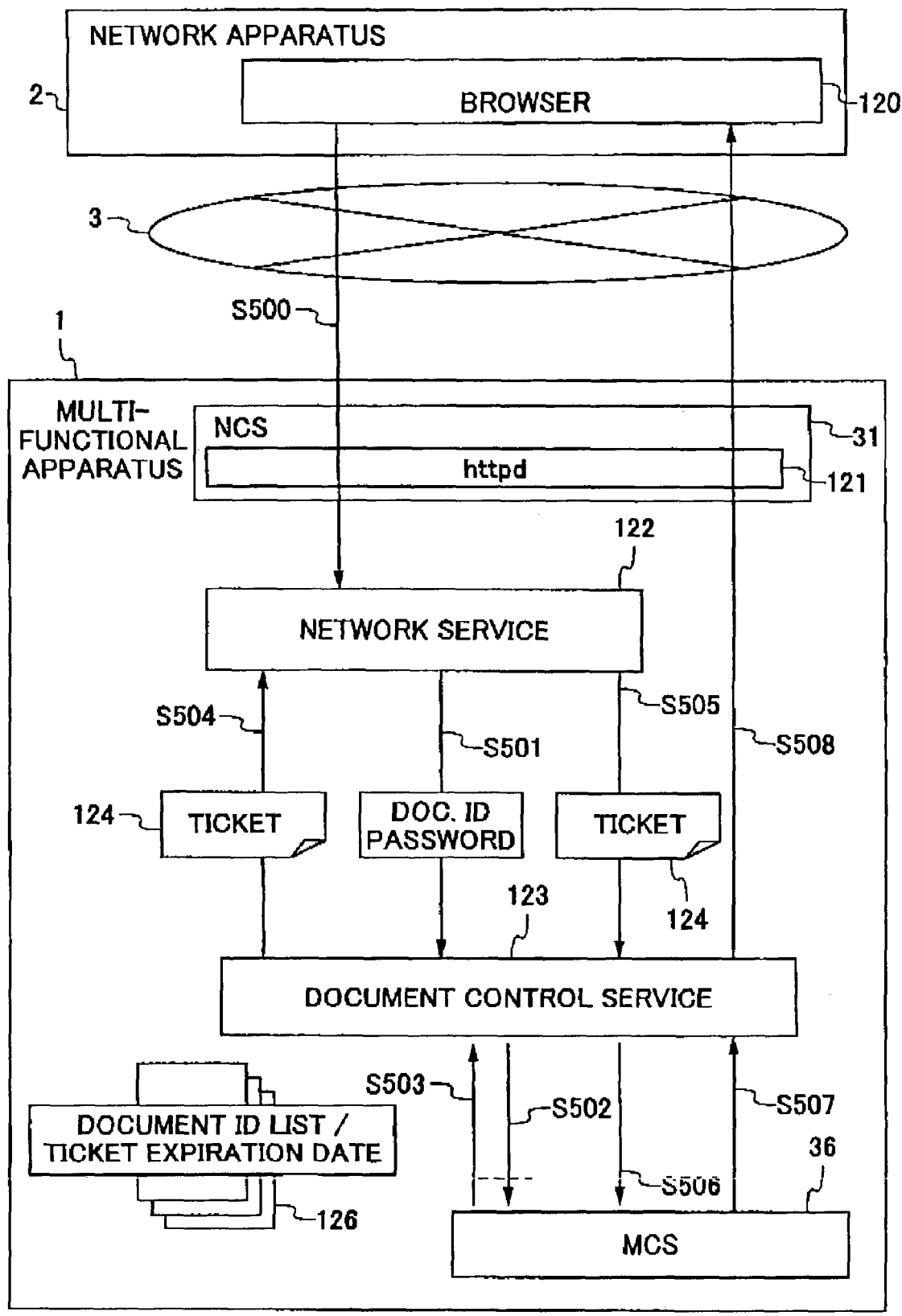
FIG. 5 is a schematic diagram for explaining a method of obtaining a stored document according to the second embodiment.

FIG. 5 is a schematic diagram for explaining a method of obtaining a stored document according to another embodiment. Functional elements irrelevant to the description are no shown in FIG. 5. Since steps S500 through S507 of FIG. 5 are identical to steps S300 through S307 of FIG. 3, their description will be omitted.

After step S507, the document control service 123 transmits the stored document received from MCS 36 in step S507 to the network apparatus 2 via httpd 121 of NCS 31 in step S508.

The network apparatus 2 displays the stored document obtained from the multifunctional apparatus 1 on the screen of the browser 120. Accordingly, the user can easily obtain the stored document stored in the multifunctional apparatus 1 by operating the browser 120 of the network apparatus 2. Since the use of the ticket 124 prevents the stored document from being transferred unnecessarily, the multifunctional apparatus 1 can avoid wasting its resources.

Third Embodiment

Figure 6:
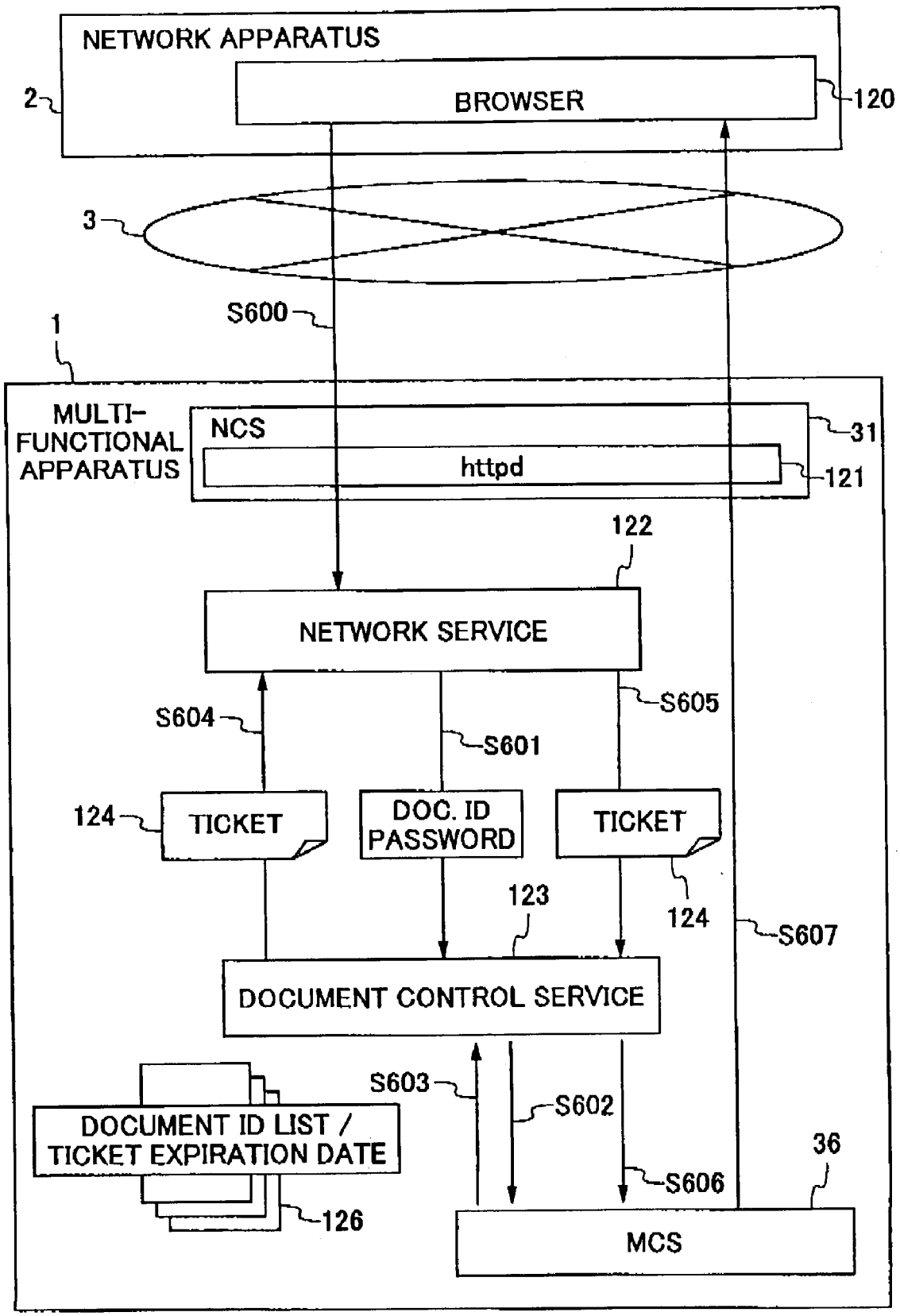
FIG. 6 is a schematic diagram for explaining a method of obtaining a stored document according to the third embodiment.

FIG. 6 is a schematic diagram for explaining a method of obtaining a stored document according to yet another embodiment. Functional elements irrelevant to the description are not shown in FIG. 6. Additionally, since steps S600 through S606 of FIG. 6 are identical to steps S300 through S306 of FIG. 3, their description will be omitted.

After step S606, MCS 36 reads the stored document corresponding to the document ID received from the document control service from the document control DB stored in HDD 68, for example, and transmits the read stored document to the network apparatus 2 via httpd 121 of NCS 31 in step S607.

The network apparatus 2 displays the stored document obtained from the multifunctional apparatus 1 on the screen of the browser 120. Accordingly, the user can easily obtain the stored document stored in the multifunctional apparatus 1 by operating the browser 120 of the network apparatus 2. In addition, the multifunctional apparatus 1 can avoid wasting its resources by transferring the ticket 124 instead of the stored document unnecessarily.

2. Method of Outputting a Stored Document

First Embodiment

Figure 7:
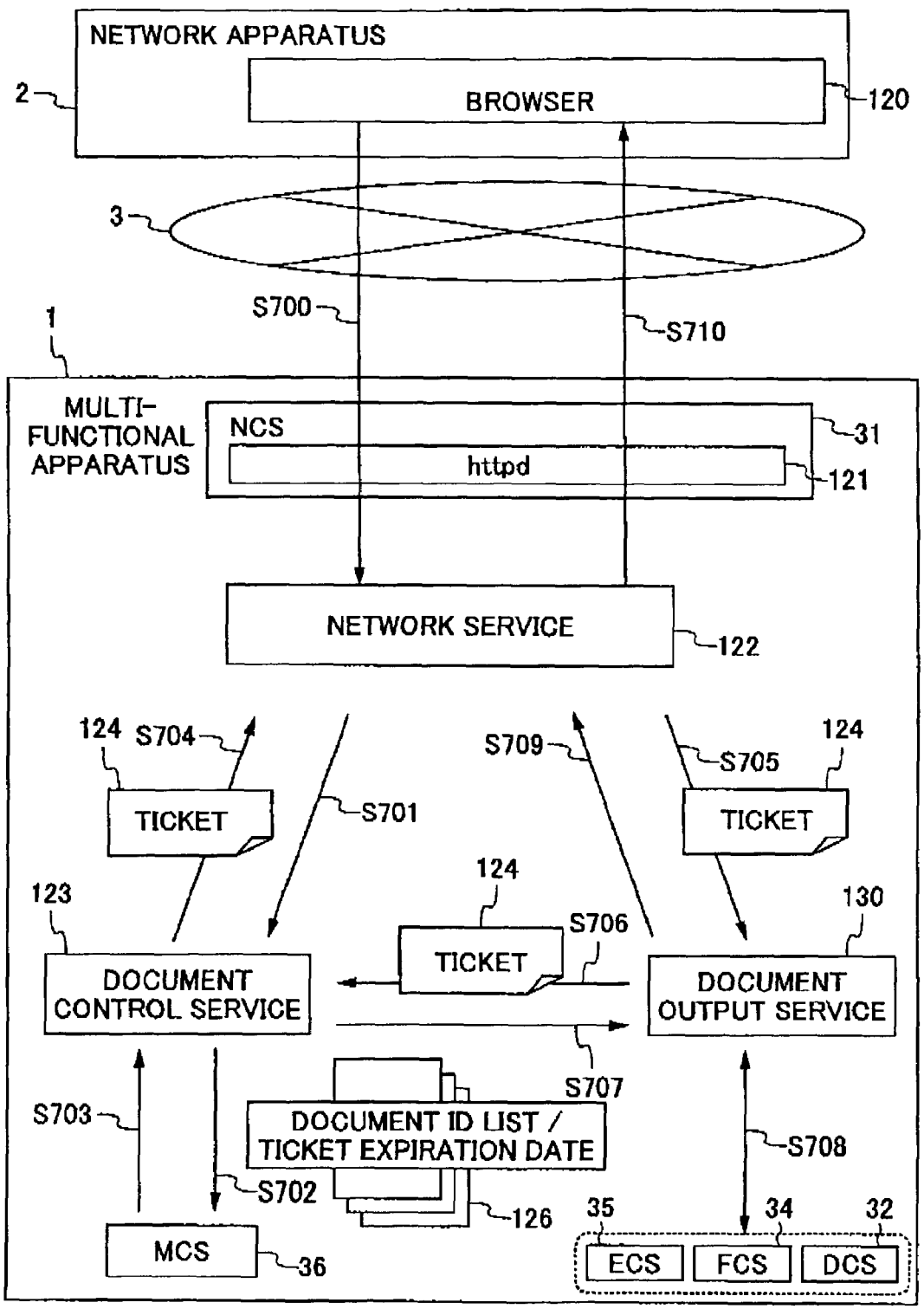
FIG. 7 is a schematic diagram for explaining a method of outputting a stored document according to the first embodiment.

FIG. 7 is a schematic diagram for explaining a method of outputting a stored document according to an embodiment. Functional elements irrelevant to the description are omitted in FIG. 7.

The network apparatus 2 connected to the multifunctional apparatus 1 via the network 3 such as the Internet causes the multifunctional apparatus 1 to output a stored document by a method of outputting a stored document according to the embodiment.

The browser 120 of the network apparatus 2 obtains the list of stored documents and the document IDs thereof stored in the multifunctional apparatus 1 from the multifunctional apparatus 1 using an HTTP request and an HTTP response, for example, in advance. A user operating the network apparatus 2 selects a stored document that the user would like to output from the list displayed on the screen of the browser 120, and inputs a password to output the desired stored document, if necessary. Then, the user clicks a button provided in the screen of the browser 120 with a mouse, for example, to output the stored document.

In step S700, the browser 120 of the network apparatus 2 creates an HTTP request including the document ID and the password of the stored document selected by the user, and transmits it to the multifunctional apparatus 1 via the network 3 such as the Internet. The HTTP request from the network apparatus 2 is transmitted to a network service 122 via the httpd 121 of NCS 31. The network service 122 is included in the web page application 25. The network service 122 may be provided as a control service.

After step S700, the network service 122 obtains a ticket 124 from the document control service 123 by following steps S701 through S704. Since steps S701 through S704 of FIG. 7 are identical to steps S301 through S304 showed in FIG. 3, respectively, their description will be omitted. Since the ticket 124 and the table 126 in FIG. 7 are also identical to the ticket 124 and the table 126 described in connection with FIGS. 4A and 4B, respectively, their description will be omitted.

After step S704, the network service 122 transmits the ticket 124 received in step S704 to document output service 130, and requests the document output service 130 to output the desired stored document in step S705. The network service 122 calls a function "void printDocmentsByTicket (base64Binary ticket)", for example, to cause the document output service 130 to output the desired stored document. The document output service 130 is provided in the printer application 31, for example. The document output service 130 may be provided as a control service.

After S705, the document output service 130 transmits the ticket received in step S705 to the document control service 123, and requests the document control service 123 to obtain a document ID corresponding to the ticket 124 in step S706, by calling a function "arrayOfAnyURI getDocumentIdsByThicket (base64Binary ticket)", for example, where a parameter "ticket" is the ticket 124.

After step S706, the document control service 123 obtains the document ID corresponding to the ticket 124 from the table 126, and transmits the document ID to the document output service 130 in step S707. The document control service 123 transmits the document ID as a value of the above function to the document output service 130.

After step S707, the document output service 130 transmits the document ID 124 received in step S707 to ECS 35 to cause ECS 35 to output the desired stored document in step S708.

Figure 8:
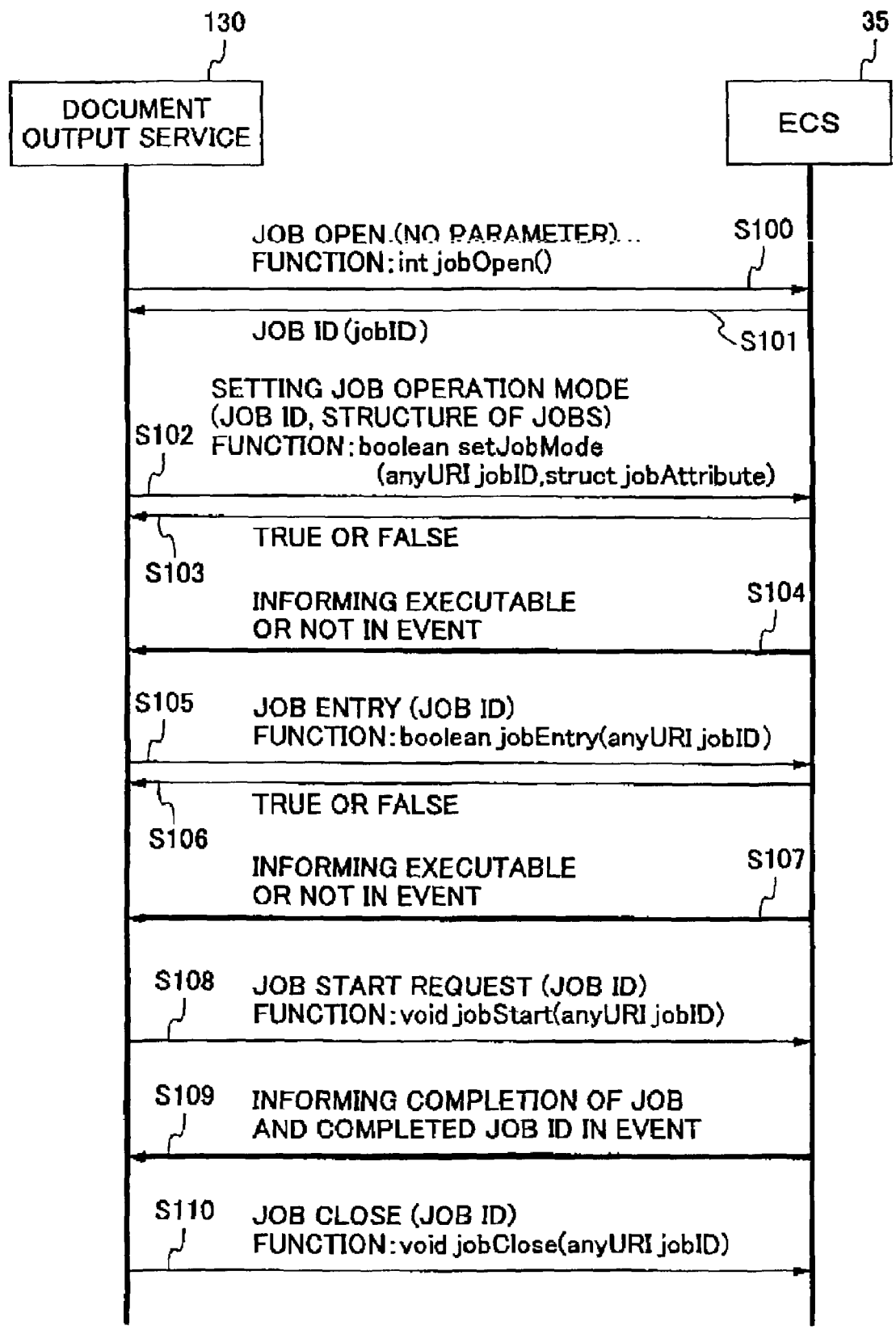
FIG. 8 is a schematic diagram for explaining the operation of a document output service and ECS.

FIG. 8 is a schematic diagram for explaining the operation of a document output service and ECS. An operation of outputting a stored document executed by the document output service 130 and ECS 35 is described below by reference to FIG. 8.

The document output service 130 requests ECS 35 to open a job using a function "int jobOpen ( )" in step S100. After step S100, ECS 35 transmits a job ID to the document output service 130 as a value of the function "int jobOpen ( )" in step S101.

After stop S101, the document output service 130 requests ECS 35 to set job mode by calling a function "boolean setJobMode (anyURI jobIF, struct jobAttribute)" in step S102. After step S102, ECS 35 informs the document output service 130 whether the job mode is successfully set or not as a value of the function "boolean setJobMode (anyURI jobIF, struct jobAttribute)" in step S103.

After S103, ECS 35 informs the document output service 130 whether a job is acceptable as an event in step S104. After step S104, the document output service 130 requests ECS 35 to accept a job entry using a function "boolean jobEntry (anyURI jobID)" in step S105. After step S105, ECS 35 informs the document output service 130 whether the job entry is successfully executed or not as the value of the function "boolean jobEntry (anyURI jobID)" in step S106.

After step S106, ECS 35 informs the document output service 130 whether the job is executable or not as an event in step S107. After step S107, the document output service 130 requests ECS 35 to start the job by calling a function "void jobStart (anyURI jobID) in step S108.

After step S108, ECS 35 informs the document output service 130 of the completion of the job and its job ID as an event in step S109. After step S109, the document output service 130 requests ECS 35 to close the job using a function "void jobClose (anyURI jobID) in step S110.

The document output service 130 outputs the stored document corresponding to the document ID received in step S708 by following the above operation as described in FIG. 8.

After step S708, the document output service 130 transmits the result of the output operation to the network service 122 in step S709.

The network service 122 transmits the result of the output operation received in step S709 to the network apparatus 2 via httpd 121 of NCS 31 in step S710. The network apparatus 2 displays the result of the output operation received from the multifunctional apparatus 1 on the screen of the browser 120. Accordingly, the user can easily output the stored document stored in the multifunctional apparatus 1 by operating the browser 120 of the network apparatus 2.

On the other hand, the multifunctional apparatus 1 can efficiently use its resources that may be otherwise wasted if the large amount of data of the stored document is transferred, by using the ticket 124. The multifunctional apparatus 1 can output the stored document that is already authenticated by using the ticket 124, without informing the document service 130 of the password.

Second Embodiment

Figure 9:
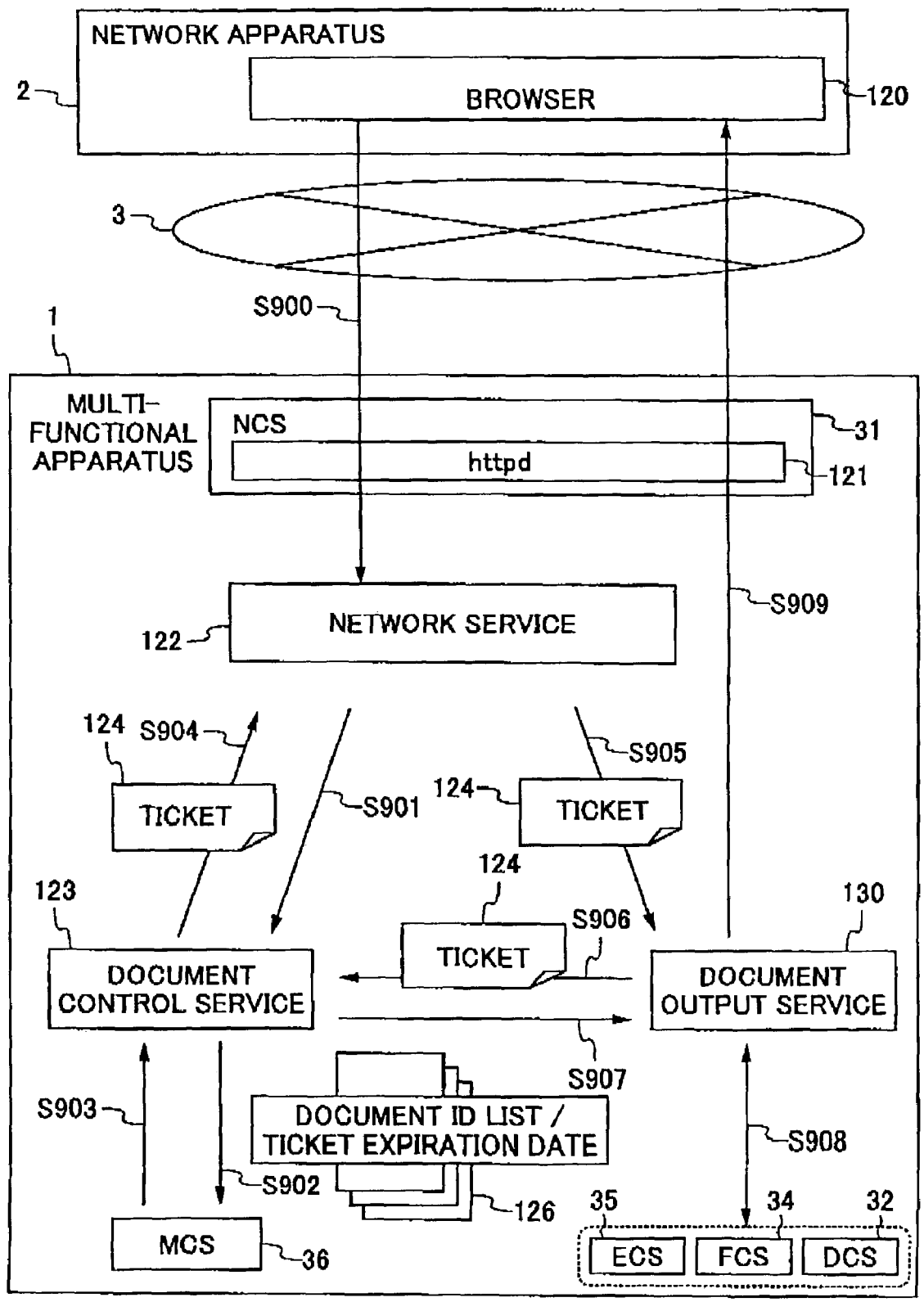
FIG. 9 is a schematic diagram for explaining a method of outputting a stored document according to the second embodiment.

FIG. 9 is a schematic diagram for explaining a method of outputting a stored document according to another embodiment. Functional elements irrelevant to the description are not showed in FIG. 9. Since steps S900 through S908 of FIG. 9 are identical steps S700 through S708 of FIG. 7, their description will be omitted.

After step S908, the document output service 130 transmits the result of the output operation to the network apparatus 2 via httpd 121 of NCS 31 in step S909. The network apparatus 2 displays the result of the output operation received from the multifunctional apparatus 1 on the screen of the browser 120. Accordingly, the user can easily output the stored document stored in the multifunctional apparatus 1 by operating the browser 120 of the network apparatus 2.

The multifunctional apparatus 1 can prevent its resources from being wasted by transferring the ticket 124 instead of the large amount of data of the stored document. In addition, the multifunctional apparatus 1 uses the ticket 124 to output the stored document that is already authenticated without informing the document output service 130 of the password.

Third Embodiment

Figure 10:
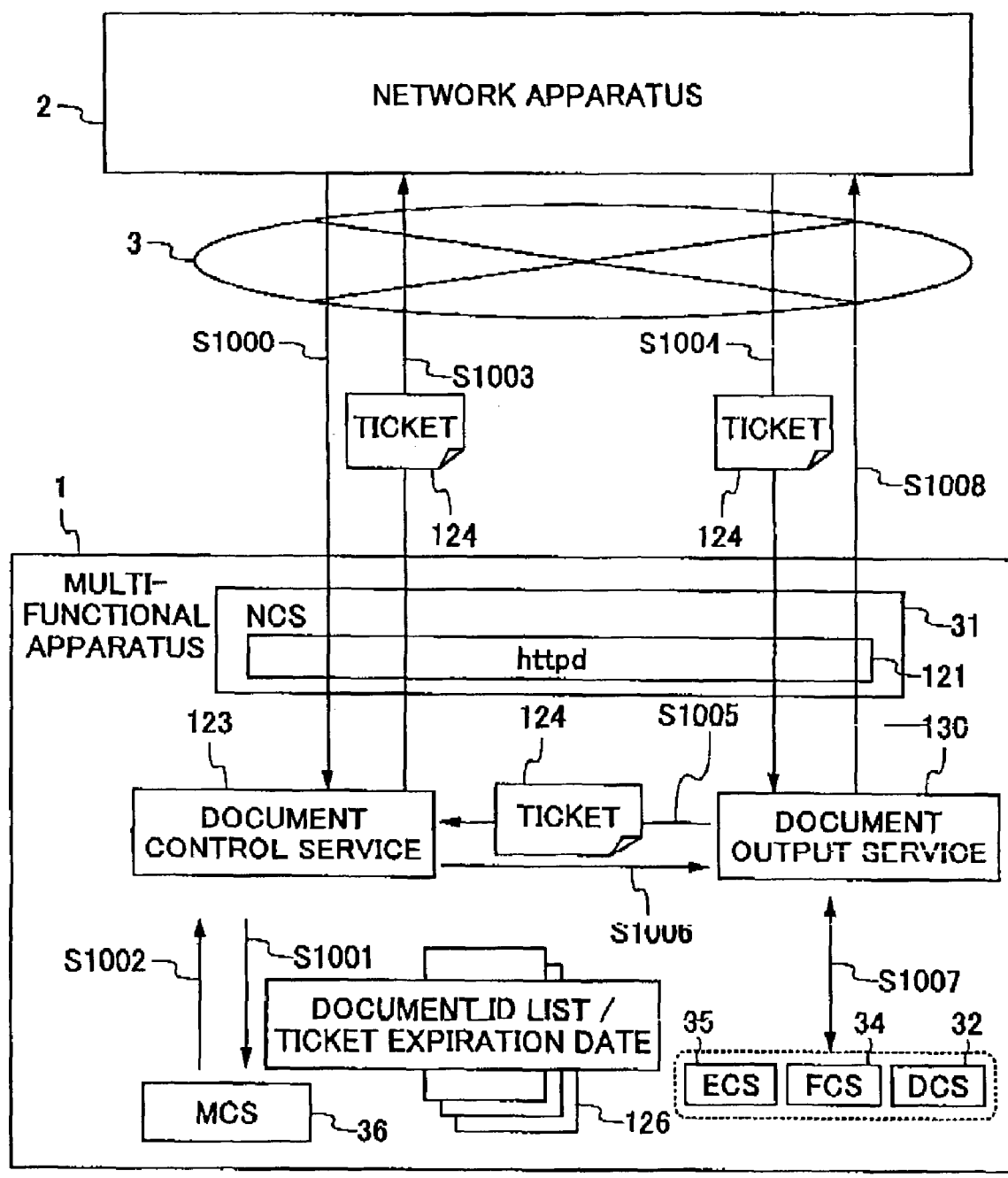
FIG. 10 is a schematic diagram for explaining a method of outputting a stored document according to the third embodiment.

FIG. 10 is a schematic diagram for explaining a method of outputting a stored document according to yet another embodiment. Functional elements irrelevant to the description are not shown in FIG. 10.

As showed in FIG. 10, the network apparatus 2 is connected to the multifunctional apparatus 1 according to this embodiment via the network such as the Internet. The network apparatus 2 causes the multifunctional apparatus 1 to output a stored document stored in the multifunctional apparatus 1 using a method of outputting a stored document according to this embodiment.

The network apparatus 2, the document control service 123 of the multifunctional apparatus 1, and the document output service 130 of the multifunctional apparatus 1 exchange data using the extensible markup language (XML). They also use the simple object access protocol (SOAP) for data access.

The network apparatus 2 obtains the list of the stored documents stored in the multifunctional apparatus 1 and their document IDs from the multifunctional apparatus 1. The user selects a stored document that the user desires to output (print, for example) from the list of the stored documents displayed on the screen or the network apparatus 2 and inputs a password that is required for outputting the stored document, if necessary.

The network apparatus 2 transmits, using SOAP and XML, the document ID selected by the user and its password to the document control service 123 of the multifunctional apparatus 1 via httpd 121 of NCS 31 to request the document control service 123 to obtain the ticket 124 in step S1000.

The document control service 123 is provided in WSP 27 and SF 28 of FIG. 1. The document control service 123 may be provided as a control service. After step S1000, the document control service 123 transmits to MCS 36 the document ID and its password received from the network apparatus 2 and requests MCS 36 to authenticate the password by using a function "int mcsCheckPassword (unsignedInt DocId, string password) in step S1001, where the parameters "DocId" and "password" are the document ID of the stored document and its password.

MCS 36 authenticates the password received from the document control service 123. After step S1001, MCS 36 transmits the result of the password authentication to the document control service 123 in step S1002. The result of the password authentication is transmitted as the value of the function for requesting the password authentication, for example.

After the password authentication, the document control service 123 generates the ticket 124, and transmits, using SOAP and XML, the generated ticket 124 to the network apparatus 2 via httpd 121 of NCS 31 and the network in step S1003.

After step S1003, the network apparatus 2 transmits, using SOAP and XML, the ticket 124 received in step S1003 to the document output service 130 of the multifunctional apparatus 1 and requests the document output service to output (print, for example) the stored document in step S1004.

The document output service 130 is provided in the printer application 21. The document output service 130 may be provided as a control service. After step S1004, the document output service 130 transmits the ticket 124 received in step S1004 to the document control service 123, and requests the document control service to obtain the stored document corresponding to the ticket 124 using a function "arrayOfAnyURI getDocumentIdsByTicket (base64Binary ticket)" in step S1005, where the parameter "ticket" is the ticket 124.

After step S1005, the document control service 123 obtains the document ID corresponding to the ticket ID included in the received ticket 124 from the table 126, and transmits the document ID to the document output service 130 in step S1006. The document ID is transferred from the document control service 123 to the document output service 130 as the value of the function for obtaining the document ID.

After S1006, the document output service 130 transmits the document ID received in step S1006 to ECS 35, and outputs (print, for example) the stored document corresponding to the document ID in step S1007. The document output service 130 and ECS 35 operate in the same manner as described in connection with FIG. 8.

The document output service 130 outputs the stored document corresponding to the document ID received in step S1006 by following the output operation described by reference to FIG. 8. After step S1007, the document output service 130 transmits, using SOAP and XML, the result of the output operation to the network apparatus 2 via httpd 121 of NCS 35 and the network 3 in step S1008.

The network apparatus 2 displays the result of the output operation received from the multifunctional apparatus 1 on the screen. Accordingly, the user operating the network apparatus 2 can easily output (print, for example) the stored document stored in the multifunctional apparatus 1. The multifunctional apparatus 1 can output the stored document that is already authenticated using the ticket 124 without informing the document output service 130 of the password.

Since only the ticket 124 is exchanged among the network apparatus 2, the document control service 123, and the document output service 130 instead of the stored document itself, the multifunctional apparatus 1 can save its resources and avoid overloading the network.

Fourth Embodiment

Figure 11:
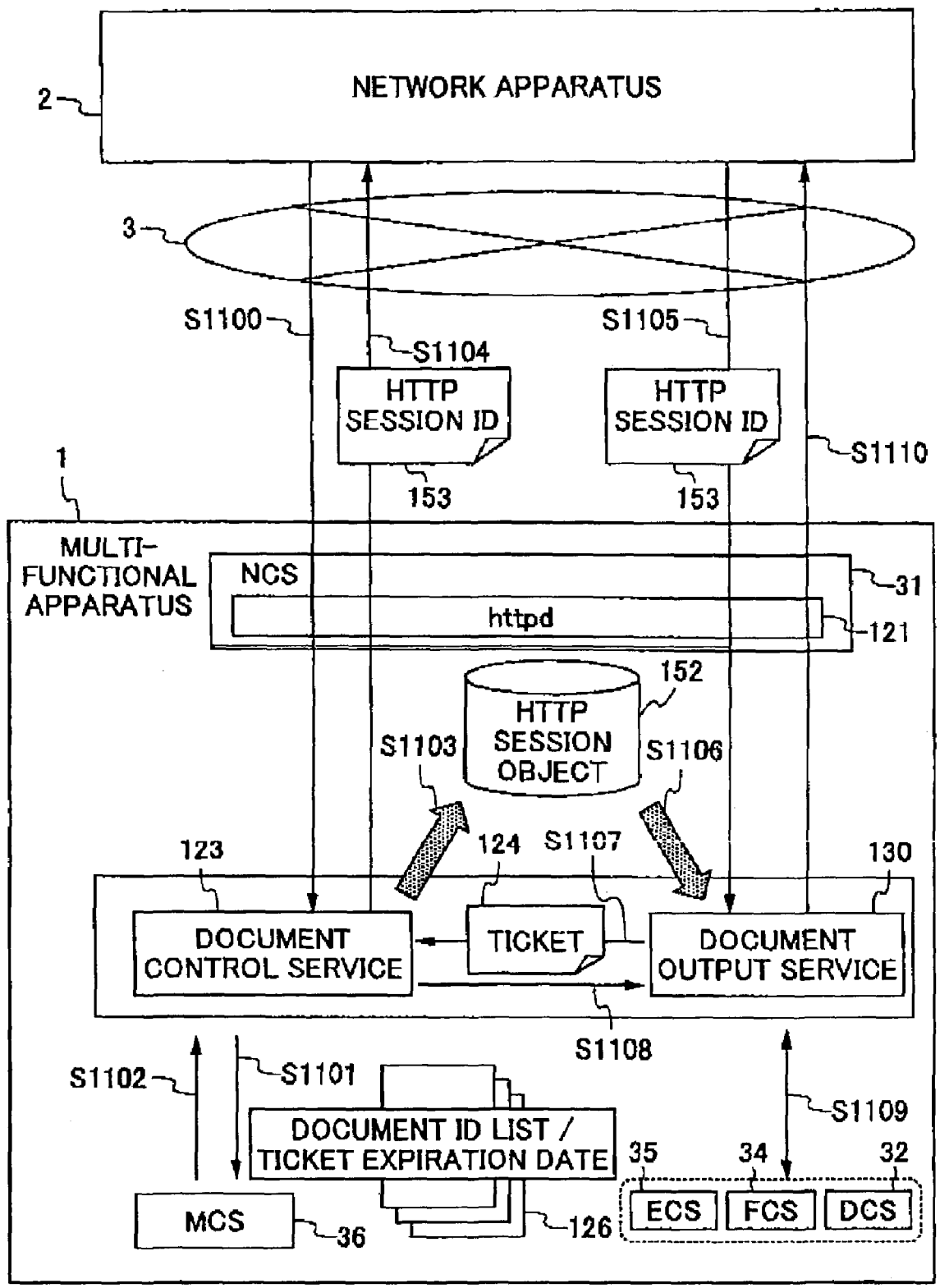
FIG. 11 is a schematic diagram for explaining a method of outputting a stored document according to the fourth embodiment.

FIG. 11 is a schematic diagram for explaining a method of outputting a stored document according to yet another embodiment. Functional elements irrelevant to the description are not shown in FIG. 11. Additionally, because steps S1100 through S1102 of FIG. 11 are identical to steps S1000 through S1002 of FIG. 10, their description will be omitted.

After step S1102, the document control service 123 stores the generated ticket 124 in a HTTP session object 152 so that the ticket 124 corresponds to a HTTP session ID 153 in step S1103. After step S1103, the document control service 123 transmits, using SOAP and XML, a HTTP session ID 153 corresponding to the HTTP session object 152 to the network apparatus 2 via httpd 121 of NCS 31 and the network 3 in step S1104.

The network apparatus 2 transmits, using SOAP and XML, the HTTP session ID 153 received in step S1104 to the document output service 130 of the multifunctional apparatus 1, and requests the document output service 130 to output the stored document in step S1105.

In step S1106, the document output service 130 refers to the HTTP session object 152 and obtains the ticket 124 from the HTTP session object 152 corresponding to the HTTP session ID 153 received in step S1105. The document output service 130 may determine whether the network apparatus 2 that receives the HTTP session ID 153 in step S1104 and the network apparatus 2 that transmits the HTTP session ID 153 in step S1105 are the same and, if they are different, may not accept the request from the different network apparatus 2 to output the stored document.

Since steps S1107 through S1110 in FIG. 11 are identical to steps S1005 through S1008 of FIG. 10, their description will be omitted.

As described above, the multifunctional apparatus 1 and the network apparatus 2 exchanges the HTTP session ID 153 corresponding to the HTTP session object 152 storing the ticket 124 therein instead of the ticket 124 itself through the network 3 so as to improve the security of information.

Fifth Embodiment

Figure 12:
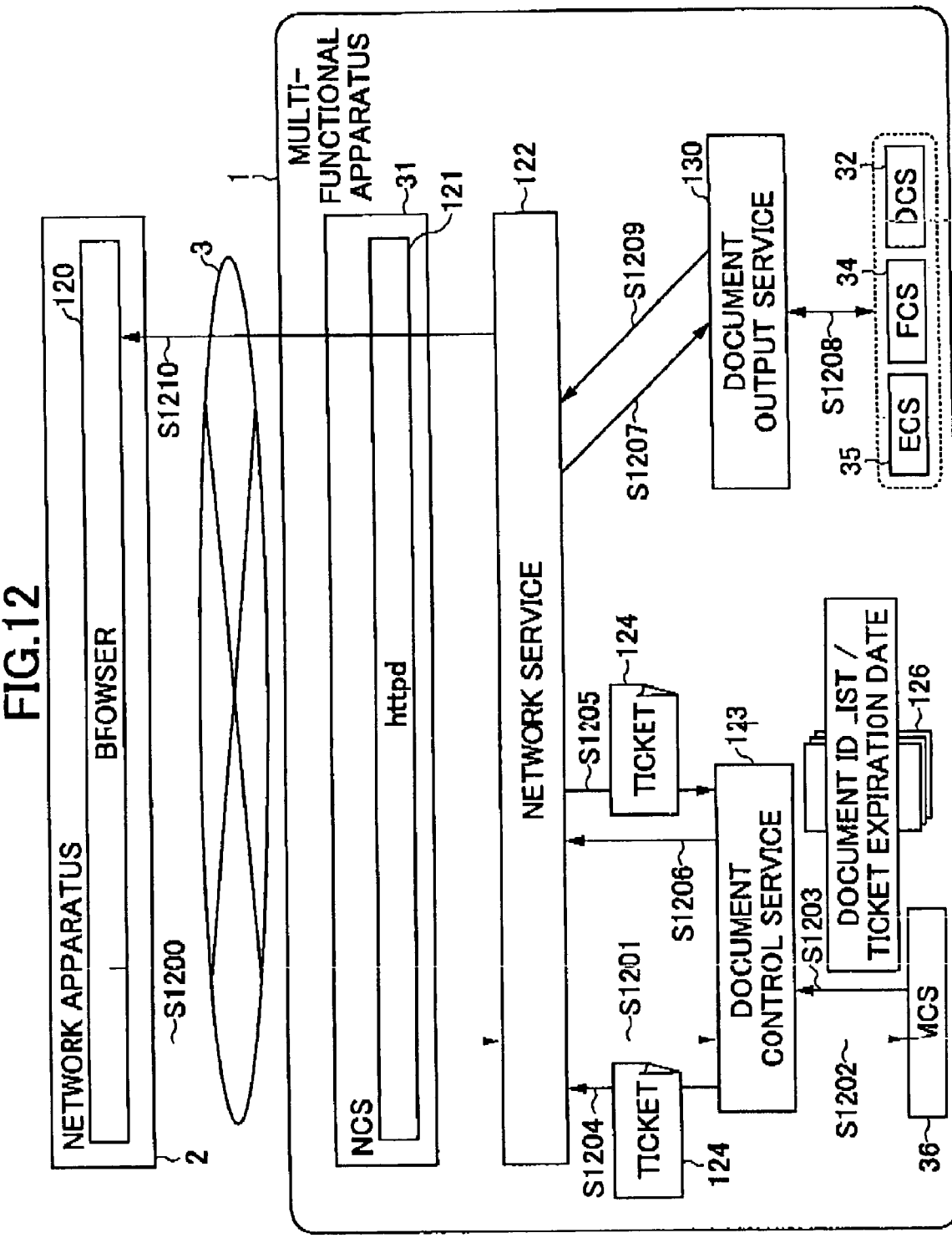
FIG. 12 is a schematic diagram for explaining a method of outputting a stored document according to the fifth embodiment.

FIG. 12 is a schematic diagram for explaining a method of outputting a stored document according to an embodiment. In FIG. 12, functional elements irrelevant to the description are not shown.

As showed in FIG. 12, a network apparatus 2 is connected to the multifunctional apparatus 1 via a network 3 such as the Internet. The network apparatus 2 outputs (for example, prints) a document file (stored document) stored in the multifunctional apparatus 1 using the method of outputting (printing, for example) a stored document.

A browser 120 of the network apparatus 2 obtains the list of stored documents and the document IDs thereof stored in the multifunctional apparatus 1 from the multifunctional apparatus 1 using an HTTP request and an HTTP response, for example, in advance. A user operating the network apparatus 2 selects a stored document that the user desires to output from the list displayed on the screen of the browser 120, and inputs a password to output the desired stored document, if necessary. Then, the user clicks a button provided in the screen of the browser 120 with a mouse, for example, to output the stored document.

In step S1200, the browser 120 of the network apparatus 2 creates an HTTP request including the document ID and the password of the stored document selected by the user, and transmits the HTTP request to the multifunctional apparatus 1 via the network 3 such as the Internet. The HTTP request from the network apparatus 2 is transmitted to a network service 122 via the httpd 121 of NCS 31. The network service 122 is included in the web page application 25.

After step S1200, the network service 122 obtains the document ID and the password of the stored document stored in the HTTP request, transmits the document ID and the password to the document control service 123, and requests the document control service 123 to obtain a ticket 124 in step S1201. The document control service 123 is provided in WSF 27 and SF 28.

The network service 122 calls, for example, a function "base64Binary getDocTicket (arrayOfUnsignedInt DocId, arrayOfString password) to obtain a ticket, where parameters "DocId" and "password" are the document ID of the stored document and the password thereof, respectively.

After step S1201, the document control service 123 transmits the received document ID of the stored document and the received password of the stored document to MCS 36, and requests MCS 36 to authenticate the password in step S1202. The document control service 123 calls a function "int mcsCheckPassword (unisigendInt DocId, string password)" to request MCS 36 to authenticate the document ID and the password of the stored document, where parameters "DocId" and "password" are the document ID and the password, respectively. MCS 36 authenticates the password received from the document control service 123.

After step S1202, MCS 36 transmits the result of the password authentication to the document control service 123 in step S1203. MCS 36 transmits the result of the password authentication to the document control service 123 as a value of the function for requesting authentication.

When the password is authenticated successfully, the document control service 123 generates the ticket 124. The ticket 124 is described above by reference to FIGS. 4A and 4B.

In step S1204, the document control service 123 transmits the generated ticket 124 to the network service 122. The document control service 123 transmits the ticket 124 to the network service 122 as a value of the function for obtaining a ticket.

After step S1204, the network service 122 transmits the ticket 124 received in step S1204 to the document control service 123, and requests the document control service 123 to obtain the document ID corresponding to the stored document in step S1205. The network service 122 calls a function "int getDocumentIdsByTicket (base64Binary ticket)" to request the document control service 123 to obtain the document ID of the stored document, where a parameter "ticket" is the ticket 124.

After step S1205, the document control service 123 obtains the document ID from the table 126 based on the ticket ID included in the received ticket 124, and transmits the obtained document ID to the network service 122 in step S1206. The document ID is transmitted from the document control service 123 to the network service 122 as the value of the above function "getDocumentIdsByTicket" for obtaining the document ID, for example.

After step S1206, the network service 122 transmits the document ID received from the document control service 123 to the document output service 130, and requests the document output service 130 to output the stored document in step S1207. The document output service 130 is provided in WS 28 of FIG. 1.

After step S1207, the document output service 130 transmits the document ID received from the network service 122 to DCS 32, FCS 34, or ECS 35, and causes them to output the stored document corresponding to the document ID in step S1208. For example, the document output service 130 and ECS 35 follow the output operation described by reference to FIG. 8. Since step S1208 is identical to step S708, its description is omitted.

After step S1208, the document output service 130 transmits the result of the output operation to the network service 122 in step S1205. After step S1209, the network service 122 transmits the result of the output operation received from the document output service 130 to the network apparatus 2 via httpd 121 of NCS 31 in step S1210. The network apparatus 2 displays the result of the output operation received from the multifunctional apparatus 1 on the screen of the browser 120.

Accordingly, the user can easily output the stored document stored in the multifunctional apparatus 1 by operating the browser 120 of the network apparatus 2. Additionally, thanks to the use of the ticket 124, the multifunctional apparatus 1 of FIG. 12 does not need to transfer the large amount of data of the stored document, and the multifunctional apparatus 1 can use its resources efficiently. The multifunctional apparatus 1 transmits the document ID instead of the ticket 124. Accordingly, the document output service 130 can output the stored document that is already authenticated without knowing the password.

Furthermore, the multifunctional apparatus 1 of FIG. 12 does not need to control the communication between the document control service 123 and the document output service 130 as a host and a client, respectively, in a complex way since they do not directly communicate with each other.

Sixth Embodiment

Figure 13:
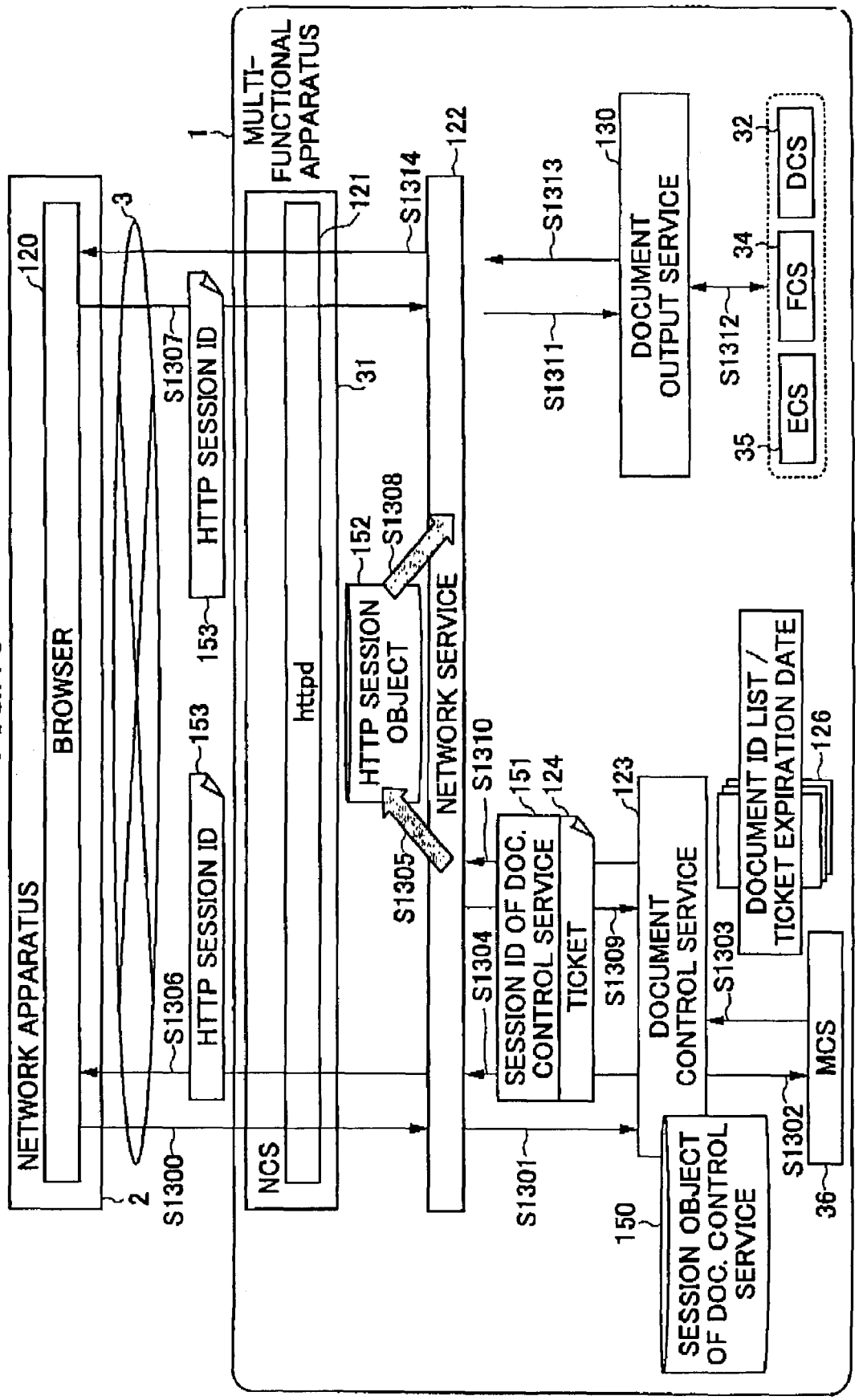
FIG. 13 is a schematic diagram for explaining a method of outputting a stored document according to the sixth embodiment.

FIG. 13 is a schematic diagram for explaining a method of outputting a stored document according to another embodiment. In FIG. 13, functional elements irrelevant to the description are not shown.

In step S1300, the browser 120 of the network apparatus 2 generates a HTTP request including the document ID and the password of the stored document selected by the user, and transmits it to the multifunctional apparatus via the network 3. The HTTP request transmitted from the network apparatus 2 is provided to the network service 122 via httpd 121 of NCS 31.

After step S1300, the network service 122 establishes a session with the document control service 123 in step S1301. The document control service 123 obtains a session ID 151 of the document control service 123 corresponding to a session object 150 of the document control service 123.

The network service 122 obtains the document ID and the password included in the HTTP request provided from the network apparatus 2. The network service 122 transmits the document ID and the password to the document control service 123, and requests it to obtain the ticket 124.

After step S1301, the document control service 123 transmits the document ID and the password received from the network service 122 to MCS 36, and requests MCS 36 to authenticate the password in step S1302. MCS 36 authenticates the password using the document ID and the password received from the document control service 123.

After step S1302, MCS 36 transmits the result of the password authentication to the document control service 123 in step S1303. If the password authentication of the document ID is successfully completed, the document control service 123 generates the ticket 124.

In step S1304, the document control service 123 transmits the generated ticket 124 and the session ID 151 of the document control service to the network service 122.

In step S1305, the network service 122 stores the ticket 124 and the session ID 151 of the document control service in the HTTP session object 152 correspondingly to the HTTP session ID 151. After step S1305, the network service 122 transmits the HTTP session ID 153 corresponding to the HTTP session object 152 to the network apparatus 2 via the network 3 and httpd 121 of NCS 31 in step S1306.

In step S1307, the browser 120 of the network apparatus 2 generates a HTTP request including an output request of the selected stored document and the HTTP session ID 153, and transmits the HTTP request to the multifunctional apparatus 1 via the network 3. The HTTP request transmitted from the network apparatus 2 is provided to the network service 122 via httpd 121 of NCS 31.

After step S1307, the network service 122 obtains the HTTP session ID 153 included in the HTTP request provided from the network apparatus 2 in step S1308. The network service 122 refers to the HTTP session object 152, and obtains the ticket 124 and the session ID 151 of the document control service from the session object 152 corresponding to the HTTP session ID 153 received in step S1307.

In this case, the network service 1229 may determine in step S1306 whether the network apparatus 2 that receives the HTTP session ID 153 is the same as the network apparatus that transmitted the HTTP session ID 153 in step S1307, and if they are different, the network service 122 may reject the request from the different network apparatus 2 to output the stored document.

In step S1309, the network Service 122 transmits the ticket 124 and the session ID 151 of the document control service obtained in step S1308 to the document control service 123, and requests the document control unit 123 to obtain the document ID corresponding to the ticket 124.

After step S1309, the document control service 123 obtains the document ID corresponding to the ticket ID included in the received ticket 124 from the table 126, and transmits the document ID to the network service 122 in step S1310.

Since steps S1311 through S1314 of FIG. 13 after the network service 122 obtains the document ID from the document control service 123 are identical to steps S1207 through S1210 of FIG. 12, their description will be omitted.

Accordingly, the user can easily output the stored document stored in the multifunctional apparatus 1 by operating the browser 120 of the network apparatus 2. Additionally, thanks to the use of the ticket 124, the multifunctional apparatus 1 of FIG. 13 does not need to transfer the large amount of data of the stored document, and the multifunctional apparatus 1 can use its resources efficiently. The multifunctional apparatus 1 transmits the document ID instead of the ticket 124 to the document output service 130. Accordingly, the document output service 130 can output the stored document that is already authenticated without knowing the password.

Furthermore, the multifunctional apparatus 1 of FIG. 13 does not need to control the communication between the document control service 123 and the document output service 130 as a host and a client, respectively, in a complex way since they do not directly communicate with each other.

Seventh Embodiment

Figure 14:
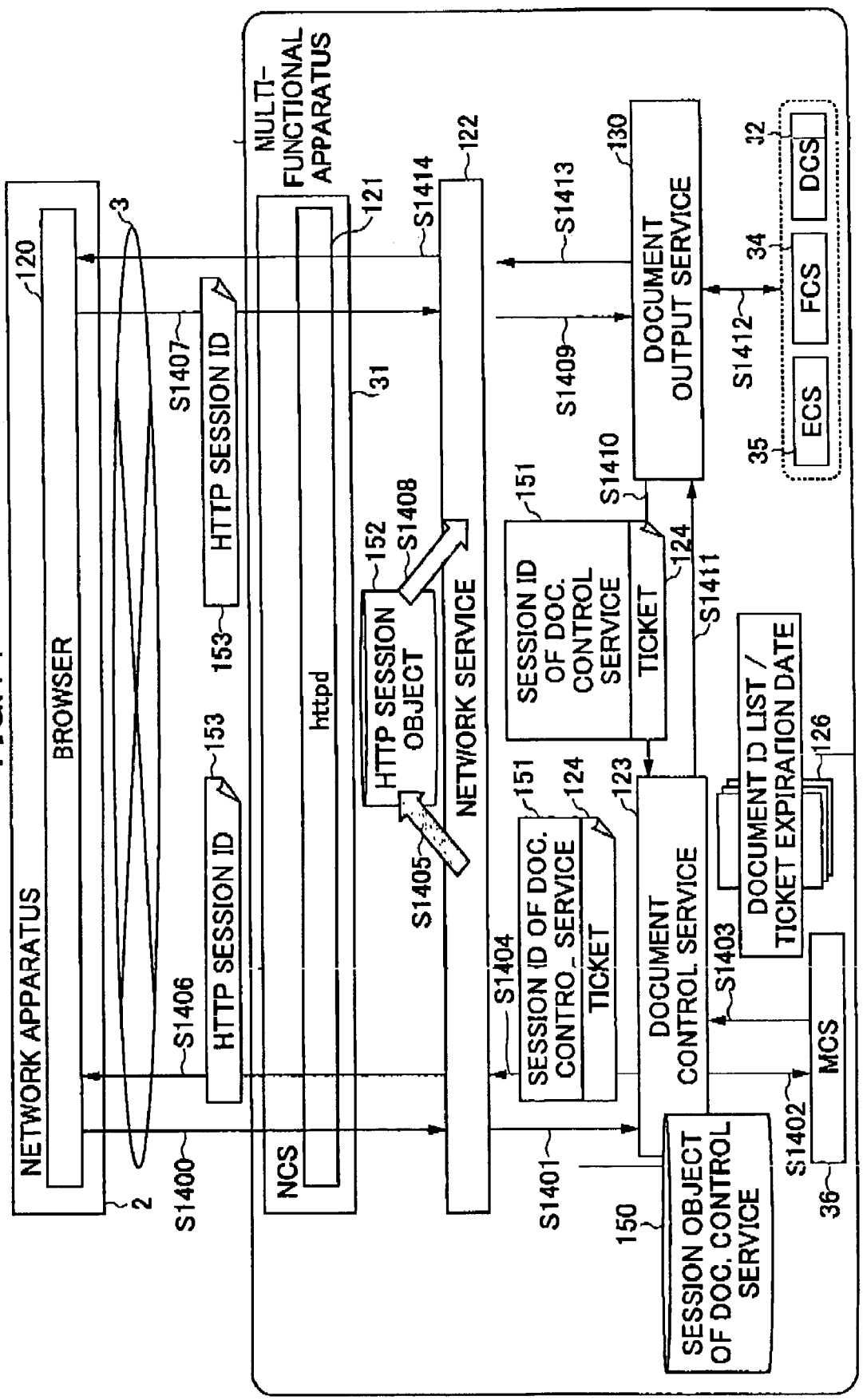
FIG. 14 is a schematic diagram for explaining a method of outputting a stored document according to the seventh embodiment.

FIG. 14 is a schematic diagram for explaining a method of outputting a stored document according to another embodiment. In FIG. 14, functional elements irrelevant to the description are not shown. Because steps S1400 through S1408 of FIG. 14 are identical to steps S1300 through S1308 of FIG. 13, their description will be omitted.

In step S1409, the network service 122 transmits the ticket 124 and the session ID 151 of the document control service received in step S1408 to the document output service 130.

After step S1409, the document output service 130 transmits the ticket 124 and the session ID 151 of the document control service received from the network service 122 to the document control service 123, and requests the document control service 123 to obtain the document ID corresponding to the ticket 124 in step S1410. For example, the document output service 130 uses a function "arrayOfAnyURI getDocumentIdsByTicket (base64Binary ticket)" to request the document control service 123 to obtain the document ID, where a parameter "ticket" is the ticket 124.

After step S1410, the document control service 123 obtains the document ID corresponding to the ticket ID included in the received ticket 124 from the table 126, and transmits the document ID to the document output service 130 in step S1411. The document ID is transmitted from the document control service 123 to the document output service 130 as a value of the above function to obtain the document ID, for example.

After obtaining the document ID from the document control service 123, the document output service 130 follows steps S1412 through S1415 that are identical to steps S1312 through S1314 of FIG. 13. The description of steps S1412 through S1415 will be omitted.

Accordingly, the user can easily output the stored document stored in the multifunctional apparatus 1 by operating the browser 120 of the network apparatus 2. Additionally, thanks to the use of the ticket 124, the multifunctional apparatus 1 of FIG. 14 does not need to transfer the large amount of data of the stored document, and can use its resources efficiently. Since the multifunctional apparatus 1 transmits the ticket 124 to the document output service 130, the document output service 130 can output the stored document that is already authenticated without knowing the password.

Eighth Embodiment

Figure 15:
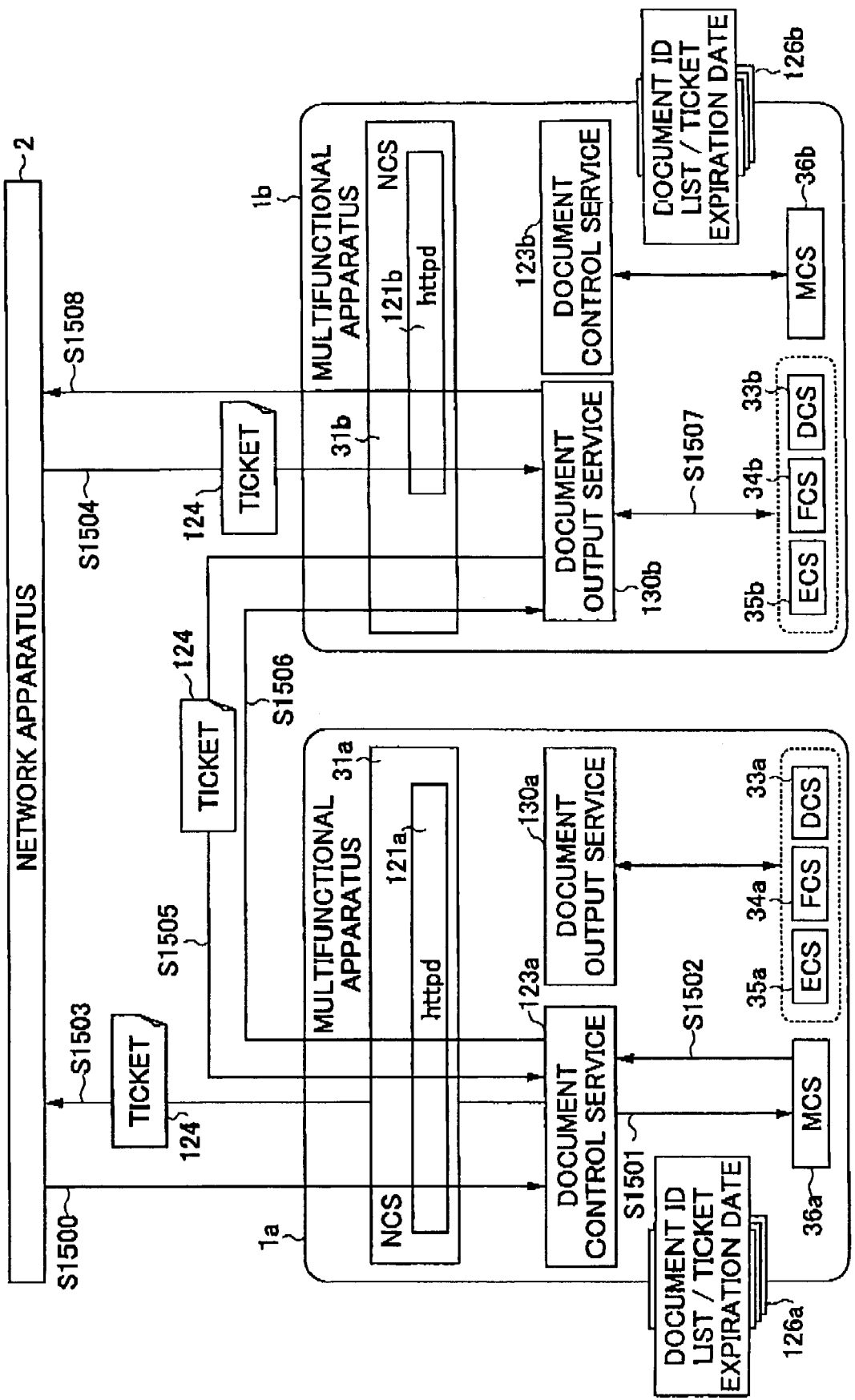
FIG. 15 is a schematic diagram for explaining a method of outputting a stored document according to the eighth embodiment.

FIG. 15 is a schematic diagram for explaining a method of outputting a stored document according to yet another embodiment. In FIG. 15, functional elements irrelevant to the description are not showed.

The network apparatus 2 is connected to the multifunctional apparatuses 1a and 1b via the network such as the Internet. The network apparatus 2 causes the multifunctional apparatus 1b to output (print, for example) the stored document stored in the multifunctional apparatus 1a using a method of outputting a stored document according to this embodiment.

When the method of outputting a stored document according to this embodiment, the network apparatus 2, the document control service 123a of the multifunctional apparatus 1a, and the document output service 130b of the multifunctional apparatus 1b mutually exchange data using the extensible markup language (XML) format. The method of outputting the stored document according to this embodiment uses SOAP (Simple Object Access Protocol) as the data access protocol.

The network apparatus 2 obtains the list and document ISs of stored documents stored in the multifunctional apparatus 1a from the multifunctional apparatus 1a. The user operating the network apparatus 2 selects a stored document that the user desires to output from the list of the stored documents displayed on the screen of the network apparatus 2, and inputs the password if it is required to output the stored document.

In step S1500, the network apparatus 2 transmits the document ID and the password of the stored document selected by the user to the document control service 123a of the multifunctional apparatus 1a via the httpd 121a of NCS 31a, and requests the document control service 123a to generate the ticket 124 for the selected stored document. The request for the ticket 124 is transmitted using SOAP and XML. The document control service 123a is provided in SF 28 of the multifunctional apparatus 1a.

After step S1500, the document control service 123a transmits the document ID and the password of the stored document received from the network apparatus 2 to MCS 36a, and requests MCS 36a to authenticate the password in step S1501. The request for authentication of the password is requested by calling, for example, a function "int mcsCheckPassword (unsignedInt DocId, string password)", where the parameters "DocId" and "password" are the document ID and the password, respectively. MCS 36a authenticates the password using the document ID and the password received from the document control service 123a.

After step S1501, MCS 36a transmits the result of the password authentication to the document control service 123a in step S1502. The result of the password authentication is transmitted from MCS 36a to the document control service 123a as a value of the password authentication request function, for example.

If the password authentication is successfully completed, the document control service 123a generates the ticket 124 as showed in FIGS. 4a and 4b.

In step S1503, the document control service 123a transmits the generated ticket 124 to the network apparatus 2 via the httpd 121a of NCS 31a. The ticket 124 is transferred from the document control service 123a to the network apparatus 2 using SOAP and XML.

In step S1504, the network apparatus 2 transmits the ticket 124 received in step S1503 to the document output service 130b of the multifunctional apparatus 1b via the httpd 121b of NCS 31b, and requests the document output service 130b to output the stored document. The request for outputting the stored document is transmitted using SOAP and XML. The document output service 130b is provided in SF 28 of the multifunctional apparatus 1b.

In step S1505, the document output service 130b transmits the ticket 124 received in step S1504 to the document control service 123a of the multifunctional apparatus 1a via NCS 31b and the httpd 121a of NCS 31a, and requests the document control service 123a to obtain the stored document corresponding to the ticket 124.

In step S1506, the document control service 123a obtains the document ID corresponding to the ticket ID included in the received ticket 124 from the table 126a, and reads the stored document corresponding to the document ID from the document control DB. The document control service 123a transmits the obtained stored document to the document output service 130b of the multifunctional apparatus 1b via the httpd 121a of NCS 31a and NCS 31b.

In step S1507, the document output service 130b transmits the stored document received in step S1506 to DCS 31b, FCS 34b, or ECS 35b to output the stored document. For example, the stored document is output by the document output service 130b and ECS 35b as described above by reference to FIG. 8.

After step S1507, the document output service 130b transmits the result of the output operation to the network apparatus 2 via the httpd 121b of NCS 31b in step S1508. The network apparatus 2 displays the result of the output operation received from the multifunctional apparatus 1b on the screen.

Accordingly, the user can easily output the stored document stored in the multifunctional apparatus 1a with the multifunctional apparatus 1b using the document control service 123a of the multifunctional apparatus 1a by operating the network apparatus 2.

Additionally, thanks to the use of the ticket 124, the multifunctional apparatuses 1a and 1b of FIG. 15 do not need to exchange the large amount of data of the stored document unnecessarily, and the multifunctional apparatuses 1a and 1b can avoid wasting the network resources and their hardware resources. Furthermore, thanks to the use of the ticket 124, the document output service 130b of the multifunctional apparatus 1b can output the authenticated stored document stored in the multifunctional apparatus 1a without knowing the password of the stored document.

Ninth Embodiment

Figure 16:
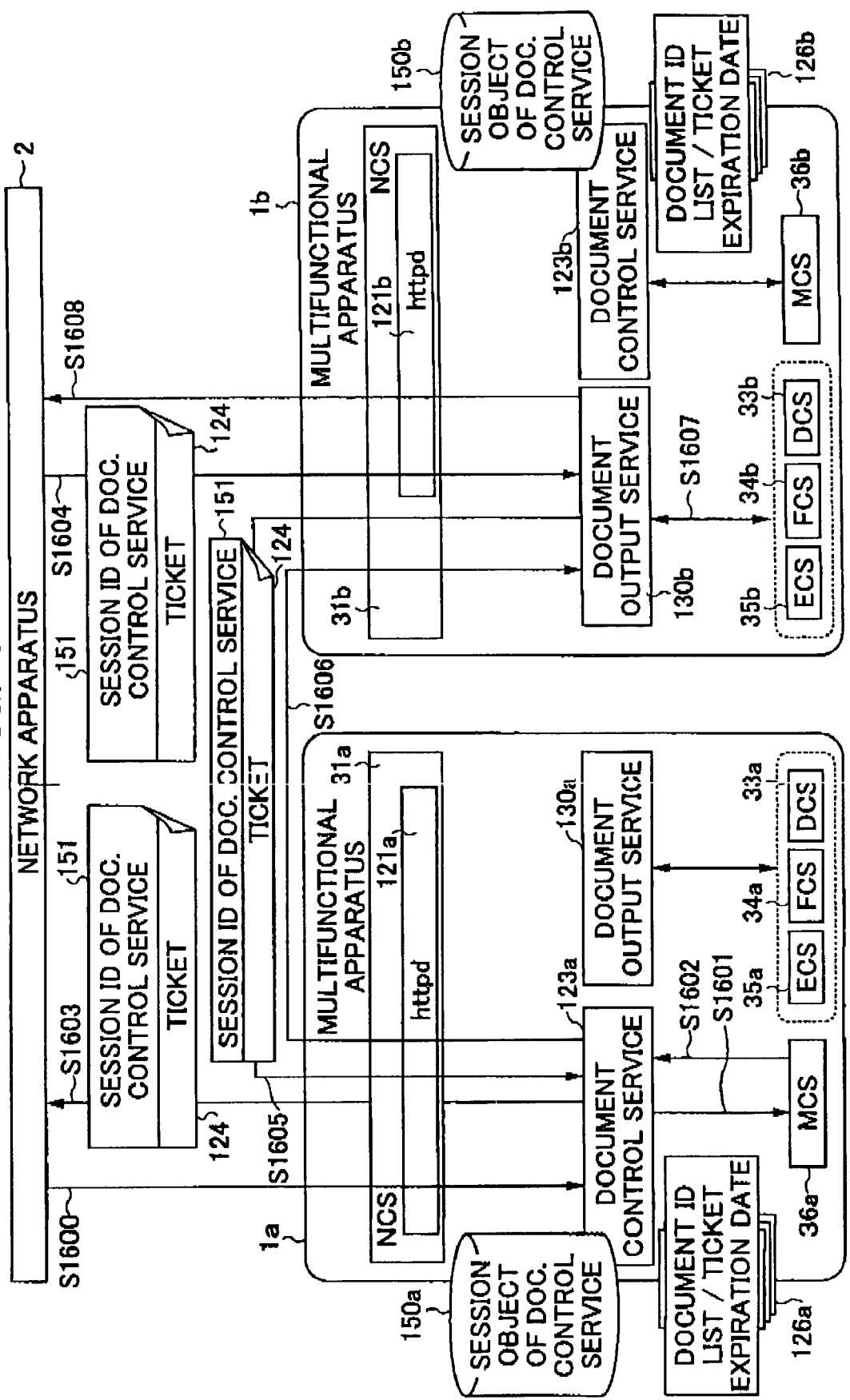
FIG. 16 is a schematic diagram for explaining a method of outputting a stored document according to the ninth embodiment.

FIG. 16 is a schematic diagram for explaining a method of outputting a stored document according to yet another embodiment. In FIG. 16, functional elements irrelevant to the description are not showed.

In step S1600, the network apparatus 2 establishes a session with the document control service 123a of the multifunctional apparatus 1a. The document control service 123a obtains the session ID 151 corresponding to the session object 150a.

The network apparatus 2 transmits the document ID and the password of the stored document selected by the user to the document control service 123a of the multifunctional apparatus 1a via the httpd 121a of NCS 31a, and requests the document control service 123a to obtain the ticket 124.

After step S1600, the document control service 123a transmits the document ID and the password of the stored document received from the network apparatus 2 to MCS 36a, and request MCS 36a to authenticate the password in step S1601. MCS 36a authenticates the password using the document ID and the password received from the document control service 123a.

After step S1601, MCS 36a transmits the result of the password authentication to the document control service 123a in step S1602. If the password is successfully authenticated, the document control service 123a generates the ticket 124 as showed in FIGS. 4A and 4B.

In step S1603, the document control service 123a transmits the generated ticket 124 and the session ID 151 of the document control service to the network apparatus 2 via httpd 121a of NCS 31a.

In step S1604, the network apparatus 2 transmits the ticket 124 and the session ID of the document control service received in step S1603 to the document output service 130b of the multifunctional apparatus 1b via the httpd 121b of NCS 31b to request the output of the stored document.

In step S1605, the document output service 130b transmits the ticket 124 and the session ID 151 of the document control service received in step S1604 to the document control service 123a of the multifunctional apparatus 1a via NCS 31b and the httpd 131a of NCS 31a, and requests the document control service 123a to obtain the stored document.

In step S1606, the document control service 123a obtains the document ID corresponding to the ticket ID included in the received ticket 124, and reads the stored document corresponding to the document ID from the document control DB. The document control service 123a transmits the stored document read from the document control DB to the document output service 130b of the multifunctional apparatus 1b via the httpd 121a of NCS 31a and NCS 31b.

Steps S1607 and S1608 follow step S1606 after the document output service 130b of the multifunctional apparatus 1b obtains the stored document from the document control service 123a of the multifunctional apparatus 1a. Since steps S1607 and S1608 are identical to steps 1507 and S1508, their description is omitted.

Accordingly, the user can easily cause the multifunctional apparatus 1b to output the stored document stored in the multifunctional apparatus 1a using the document control service 123a of the multifunctional apparatus 1a by operating the network apparatus 2.

Additionally, thanks to the use of the ticket 124 and the session ID 151 of the document control service, the multifunctional apparatuses 1a and 1b of FIG. 16 do not need to exchange the large amount of data of the stored document unnecessarily, and can avoid wasting the network resources and their hardware resources. Furthermore, thanks to the use of the ticket 124 and the session ID 151 of the document control service, the document output service 130b of the multifunctional apparatus 1b can output the authenticated stored document stored in the multifunctional apparatus 1a without knowing the password of the stored document. The use of the session ID 151 of the document control service enhances security of the stored document.

In the above embodiment, the ticket 124 is used as authentication information to access the stored document; however, another kind of authentication information may be used. Additionally, the session ID 151 of the document control service is used as authentication information to use the document control service; however, another kind of authentication information may be used.

Tenth Embodiment

Figure 17:
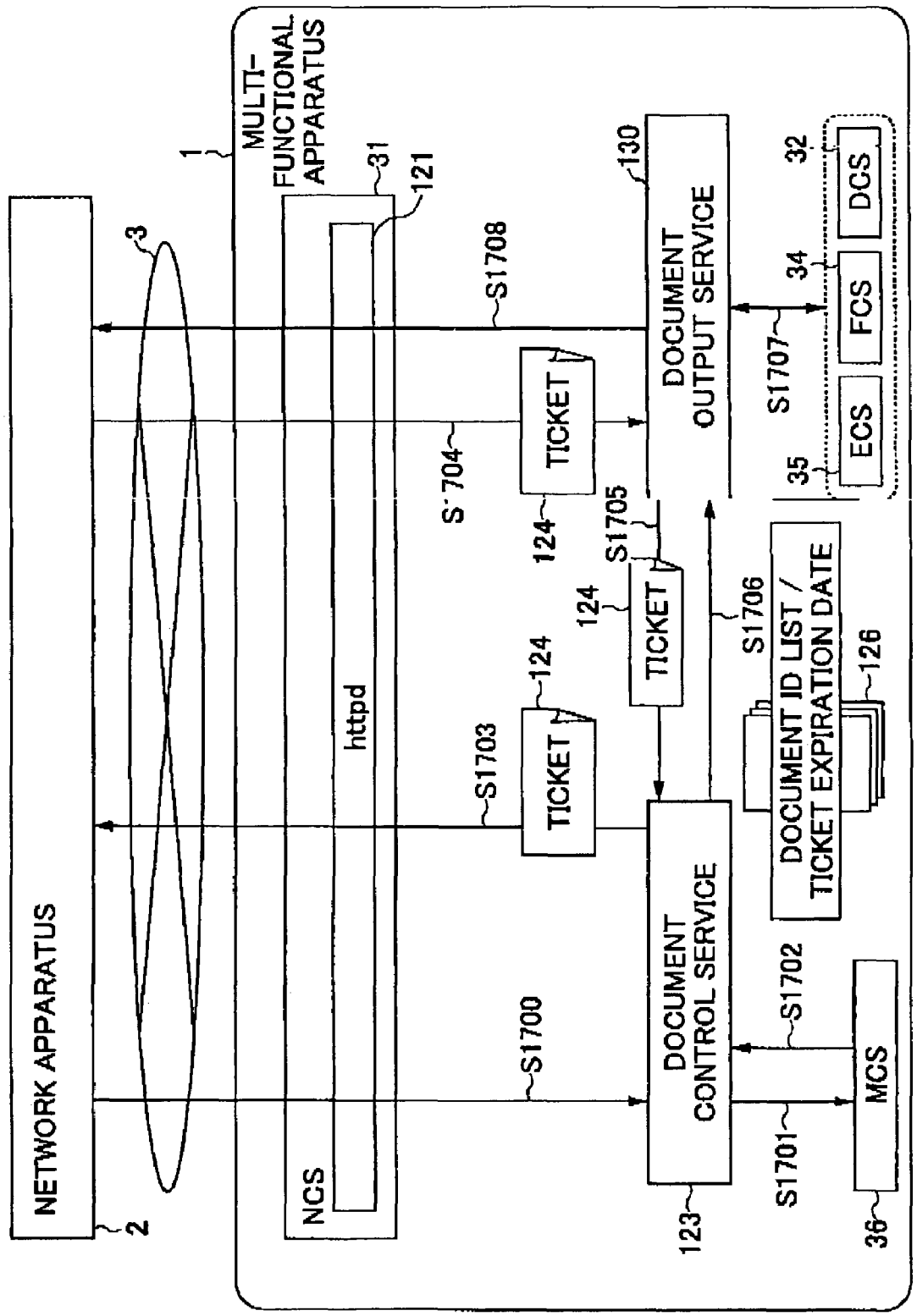
FIG. 17 is a schematic diagram for explaining a method of outputting a stored document according to the tenth embodiment.

FIG. 17 is a schematic diagram for explaining a method of outputting a stored document according to an embodiment. In FIG. 17, functional elements irrelevant to the description are not shown.

As showed in FIG. 17, the network apparatus 2 is connected to the multifunctional apparatus 1 via the network 3 such as the Internet. The network apparatus 2 outputs the stored document stored in the multifunctional apparatus 1 using the method of outputting the stored document.

The network apparatus 2 and the document control service 123 and the document output service 130 of the multifunctional apparatus exchange data using the XML format, and use SOAP as the communication protocol.

The network apparatus 2 obtains the list of stored documents and the document IDs thereof stored in the multifunctional apparatus 1. The user operating the network apparatus 2 selects a stored document that the user desires to output from the list displayed on the screen, and inputs a password to output the desired stored document, if necessary.

In step S1700, the network apparatus 2 transmits, using SOAP and XML, the document ID and the password of the stored document selected by the user to the document control service 123 of the multifunctional apparatus 1 via the network 3 and the httpd 121 of NCS 31, and requests the document control service 123 to obtain the ticket 124.

After step S1700, the document control service 123 transmits the document ID and the password included in the request received from the network apparatus 2 to MCS 36 in step S1701, and requests MCS 36 to authenticate the password, for example, by calling a function "int mcsCheckPassword (unsignedInt DocId, string password)", where parameters are the document ID and the password. MCS 36 authenticates the password using the document ID and the password received from the document control service 123.

After step S1701, MCS 36 transmits the result of the password authentication to the document control service 123 in step S1702. MCS 36 transmits the result of the password authentication to the document control service 123 as a value of the function for requesting authentication.

When the password is authenticated successfully, the document control service 123 generates the ticket 124. The ticket 124 is described above by reference to FIGS. 4A and 4B.

In step S1703, the document control service 123 transmits the generated ticket 124 to the network apparatus 2 via the httpd 121 of NCS 31 and the network 3. The ticket 124 is transmitted from the document control service 123 to the network apparatus 2 using SOAP and XML.

In step S1704, in step s1705 the network apparatus 120 transmits the ticket 124 received in step S1703 to the document output service 130 of the multifunctional apparatus, and request the document output service 130 to output the stored document using SOAP and XML.

After step S1704, the document output service 130 transmits the ticket 124 received from the network apparatus 2 in step S1704 to the document control service 123, and requests the document control service 123 to obtain the document ID corresponding to the ticket 124 by calling, for example, a function "arrayOfAnyURI getDocumentIdsByTicket (base64Binary ticket)" to request the document control service 123 to obtain the document ID of the stored document, where a parameter "ticket" is the ticket 124.

After step S1705, the document control service 123 obtains the document ID from the table 126 based on the ticket ID included in the received ticket 124, and transmits the obtained document ID to the network service 122 in step S1706. The document ID is transmitted from the document control service 123 to the document output service 130 as the value of the above function "getDocumentIdsByTicket" for obtaining the document ID, for example.

After step S1706, the document output service 130 transmits the document ID received from the document control service 123 in step S1706 to DCS 32, FCS 34, or ECS 35, and outputs the stored document corresponding to the document ID in step S1707. Since step S1707 is identical to step S708 of FIG. 7 that is described by reference to FIG. 8, its description is omitted.

After step S1707, the document output service 130 transmits the result of the output operation to the network apparatus 2 via the httpd 121 of NCS 31 and the network 3 using SOAP and XML in step S1708. The network apparatus 2 display the result of the output operation received from the multifunctional apparatus 1 on its screen.

Accordingly, the user can easily output the stored document stored in the multifunctional apparatus 1 by operating the network apparatus 2. Additionally, thanks to the use of the ticket 124, the multifunctional apparatus 1 of FIG. 17 does not need to transfer the large amount of data of the stored document, and the multifunctional apparatus 1 can use its resources efficiently.

In addition, because the ticket 124 is transferred to the document output service 130, the document output service 130 can output the stored document that is already authenticated without knowing the password.

Eleventh Embodiment

Figure 18:
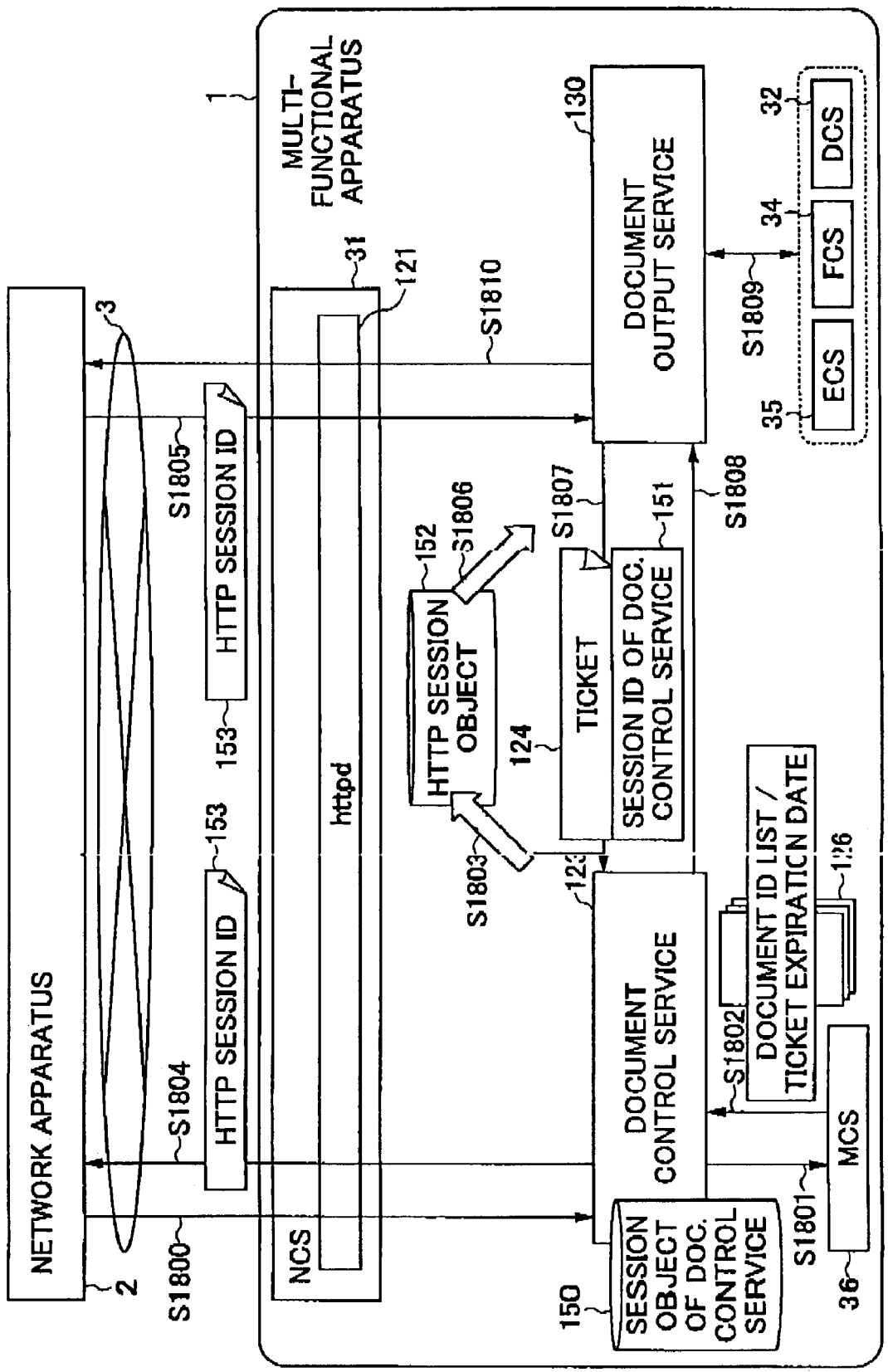
FIG. 18 is a schematic diagram for explaining a method of outputting a stored document according to the eleventh embodiment.

FIG. 18 Is a schematic diagram for explaining a method of outputting a stored document according to yet another embodiment. In FIG. 18, functional elements irrelevant to the description are not shown.

In step S1800, the network apparatus 2 establishes a session with the document control service 123 of the multifunctional apparatus 1. The document control service 123 obtains a session ID 151 of the document control service corresponding to the session object 150 of the document control service.

The network apparatus 2 transmits the document ID and the password of the stored document selected by the user to the document control service 123 of the multifunctional apparatus 1 via the network 3 and the httpd 121 of NCS 31.

After step S1800, the document control service 123 transmits the document ID and the password included in the request to obtain the ticket 124 received from the network apparatus 2 to MCS 36, and requests MCS 36 to authenticate the password in step S1801. Using the document ID and the password received from the document control service 123, MCS 36 authenticates the password.

After step S1801, MCS 36 transmits the result of the password authentication to the document control service 123 in step S1802. If the password authentication of the document ID is successfully completed, the document control service 123 generates the ticket 124.

In step S1803, the document control service 123 stores the generated ticket 124 and the session ID of the document control service in the HTTP session object 152 corresponding to the HTTP session ID 153. After step S1803, the document control service 123 transmits the HTTP session ID 153 corresponding to the HTTP session object 152 to the network apparatus 2 via the httpd 121 of NCS 31 and the network 3 in step S1804.

In step S1805, the network apparatus 2 requests the document output service 130 of the multifunctional apparatus 1 to output the stored document using the HTTP session ID 153 received in step S1804.

After step S1805, the document output service 130 refers to the HTTP session ID 153 received from the network apparatus 2 in step S1805, and obtains the ticket 124 and the session ID 151 of the document control service from the HTTP session object 152 corresponding to the HTTP session ID 153 in step S1806.

At this point of time, the document output service 130 may determine whether the network apparatus 120 that transmits the HTTP session ID 153 in step S1805 is the same as the network apparatus 120 that received the HTTP session ID 153 in step S1804. If they are different, the document output service 130 may reject the request to output the stored document from the different network apparatus 120.

After step S1806, the document output service 130 transmits the ticket 124 and the session ID 151 of the document control service obtained in step S1806 to the document control service 123, and requests the document control service 123 to obtain the document ID in step S1807.

At this point of time, the document control service 123 verifies the session object 150 of the document control service corresponding to the received session ID 151 of the document control service, and if the session ID 151 is not available, the document control service 123 may reject the request to obtain the stored document.

After step S1807, the document control service 123 obtains the document ID corresponding to the ticket ID included in the received ticket 124 from the table 126, and transmits the document ID to the document output service 130 in step S1808.

Steps S1809 and S1810 follow step S1808 in which the document output service 130 obtains the document ID from the document control service 123. The description of steps S1809 and S1810 is omitted since they are identical to steps S1707 and S1708.

Accordingly, the user can easily output the stored document stored in the multifunctional apparatus 1 by operating the network apparatus 2. Additionally, thanks to the use of the ticket 124, the multifunctional apparatus 1 of FIG. 18 does not need to transfer the large amount of data of the stored document, and the multifunctional apparatus 1 can use its resources efficiently.

In addition, because the ticket 124 is transferred to the document output service 130, the document output service 130 can output the stored document that is already authenticated without knowing the password.

3. Method of Obtaining a Thumbnail

First Embodiment

Figure 19:
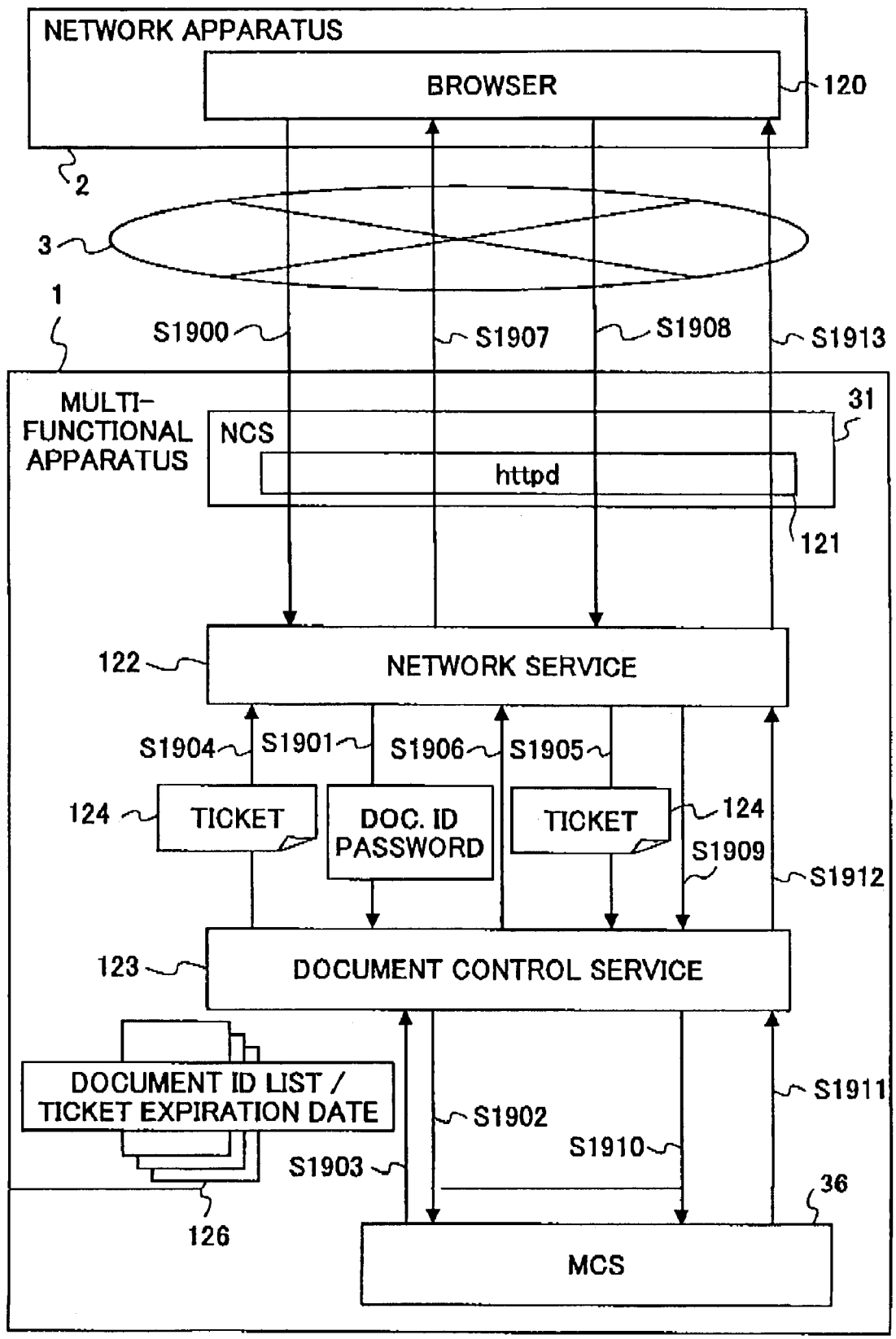
FIG. 19 is a schematic diagram for explaining a method of obtaining a thumbnail according to the first embodiment.

FIG. 19 is a schematic diagram for explaining a method of obtaining a thumbnail according to an embodiment. In FIG. 19, functional elements irrelevant to the description are not shown.

As showed in FIG. 19, a network apparatus 2 is connected to the multifunctional apparatus 1 via a network 3 such as the Internet. The network apparatus 2 obtains the thumbnail of a document file (stored document) stored in the multifunctional apparatus 1 using the method of obtaining a stored document.

A browser 2 of the network apparatus 2 obtains the list of stored documents and the document IDs thereof stored in the multifunctional apparatus 1 from the multifunctional apparatus 1 using an HTTP request and an HTTP response, for example, in advance. The user operating the network apparatus 2 inputs a password to obtain the thumbnail of a stored document, if necessary, and the user clicks a button provided in the screen of the browser 120 with a mouse, for example, to obtain the thumbnail. The user may select all or a part of the stored documents listed on the screen of the browser 120.

In step S1900, the browser 120 of the network apparatus 2 creates an HTTP request including the document ID and the password of the stored document selected by the user, and transmits it to the multifunctional apparatus 1 via the network 3 such as the Internet. The HTTP request from the network apparatus 2 is transmitted to a network service 122 via the httpd 121 of NCS 31.

After step S1900, the network service 122 transmits the document ID and the password of the stored document to a document control service 123, and requests the document control service 123 to obtain a ticket 124 in step S1901. The network service 122 calls, for example, a function "base64Binary getDocTicket (arrayOfUnsignedInt DocId, arrayOfString password) to obtain a ticket, where parameters "DocId" and "password" are the document ID of the stored document and the password thereof, respectively.

After step S1901, in step S1905 the document control service 123 transmits the received document ID of the stored document and the received password of the stored document to MCS 36, and requests MCS 36 to authenticate the password in step S1902. The document control service 123 calls, for each stored document, a function "int mcsCheckPassword (unisigendInt DocId, string password)" to request MCS 36 to authenticate the password of the stored document, where parameters "DocId" and "password" are the document ID and the password, respectively.

MCS 36 authenticates the password received from the document control service 123. After step S1902, MCS 36 transmits the result of the password authentication to the document control service 123 in step S1903. MCS 36 returns the result of the password authentication to the document control service 123 as a value of the function for requesting authentication.

When the password is authenticated, the document control service 123 generates a ticket as showed in FIGS. 4A and 4B.

In step S1904, the document control service 123 transmits the generated ticket 124 to the network service 122. The document control service 123 transmits the ticket 124 to the network service 122 as a value of the function for obtaining a ticket.

After step S1904, the network service 122 transmits the ticket 124 received in step S1904 to the document control service 123, and requests the document control service 123 to obtain the URL (thumbnail URL) indicating where the thumbnail is stored by calling, for example, a function "anyURL getThumbnailURL (base64Binary ticket)" while the parameter is the ticket.

After step S1905, the document control service checks the validity of the received ticket 124, and if the ticket 124 is valid, generates and transmits the thumbnail URL of thumbnail of the stored document corresponding to the ticket 124 in step S1906.

The thumbnail URL is transmitted from the document control service 123 to the network service 122 as a value of the function to obtain the thumbnail URL. The thumbnail URL is expressed as http://[IP address of apparatus]/[document file name]?[ticket data].

The document control service 123, however, may transmit any type of location information, instead of the thumbnail URL, at which the thumbnail is located.

After step S1906, the network service 122 transmits the thumbnail URL received in step S1906 to the network apparatus 2 via the httpd 121 of NCS 31 in step S1907.

After step S1907, the browser of the network apparatus 2 generates a HTTP request including the thumbnail URL, and transmits the HTTP request to the multi functional apparatus 1 via the network 3 in step S1908.

The HTTP request including the thumbnail URL requests the thumbnail URL by the "get method" of the HTTP. The HTTP request transmitted from the network apparatus 2 is provided to the network service 122 via the httpd 121 of NCS 31.

After step S1908, the network service 122 transmits the thumbnail URL to the document control service 123, and requests the document control service to obtain the thumbnail by calling a function, for example, "void getThumbnail (anyURL docID)" where the parameter is the thumbnail URL in step S1909.

After step S1909, the document control service 123 transmits the thumbnail ID of the thumbnail corresponding to the thumbnail URL to MCS 36, and requests MCS 36 to open the thumbnail file by calling, for example, a function "boolean mcsOpenThumbnail (unsignedInt thumbnailID)", where the thumbnail ID is a parameter, in step S1910.

After step S1910, MCS 36 reads the thumbnail corresponding to the thumbnail ID from the document control DB included in HDD 68 and so forth using the thumbnail ID received from the document control service 123, and transmits the read thumbnail to the document control service 123 in step S1911. The thumbnail corresponding to the thumbnail ID is transmitted from MCS 36 to the document control service 123 as a value of the function to open the thumbnail.

After step S1911, the document control service 123 transmits the thumbnail received from MCS 36 to the network service 122 in step S1912. The thumbnail is transmitted from the document control service 123 to the network service 122 as a value of the function for obtaining the thumbnail.

After step S1912, the network service 122 transmits the thumbnail received from the document control service 123 to the network apparatus 2 via httpd 121 of NCS 31 in step S1913.

The network apparatus 2 displays the thumbnail obtained from the multifunctional apparatus 1 on the screen of the browser 120. Accordingly, the user can easily obtain the thumbnail of a stored document stored in the multifunctional apparatus 1 by operating the browser 120 of the network apparatus 2. On the other hand, since the ticket 124 is transferred instead of the thumbnail itself, the multifunctional apparatus 1 can prevent its resources from being wasted.

Second Embodiment

Figure 20:
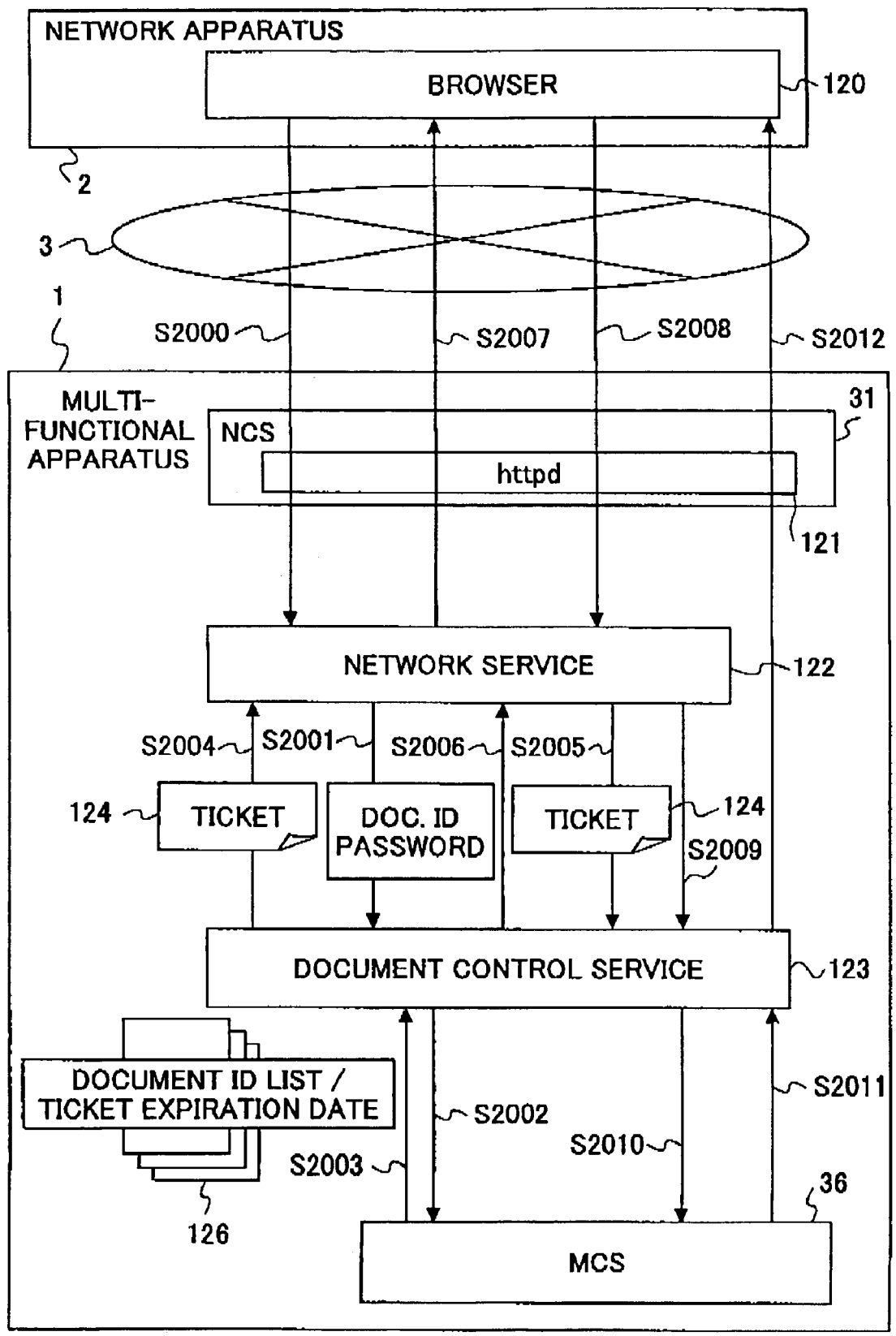
FIG. 20 is a schematic diagram for explaining a method of obtaining a thumbnail according to the second embodiment.

FIG. 20 is a schematic diagram for explaining a method of obtaining a thumbnail according to an embodiment. In FIG. 20, functional elements irrelevant to the description are not shown.

Since steps S2000 through S2011 of FIG. 20 are identical to steps S1900 through S1911 of FIG. 19, their description is omitted.

After step S2011, the document control service 123 transmits the thumbnail received from MCS 36 in step S2011 to the network apparatus 2 via the htttpd 121 of NCS 31 in step S2012.

The network apparatus 2 displays the thumbnail obtained from the multifunctional apparatus 1 on the screen of the browser 120. Accordingly, the user can easily obtain the thumbnail of a stored document stored in the multifunctional apparatus 1 by operating the browser 120 of the network apparatus 2. On the other hand, since the ticket 124 is transferred instead of the thumbnail itself, the multifunctional apparatus 1 can prevent its resources from being wasted.

Third Embodiment

Figure 21:
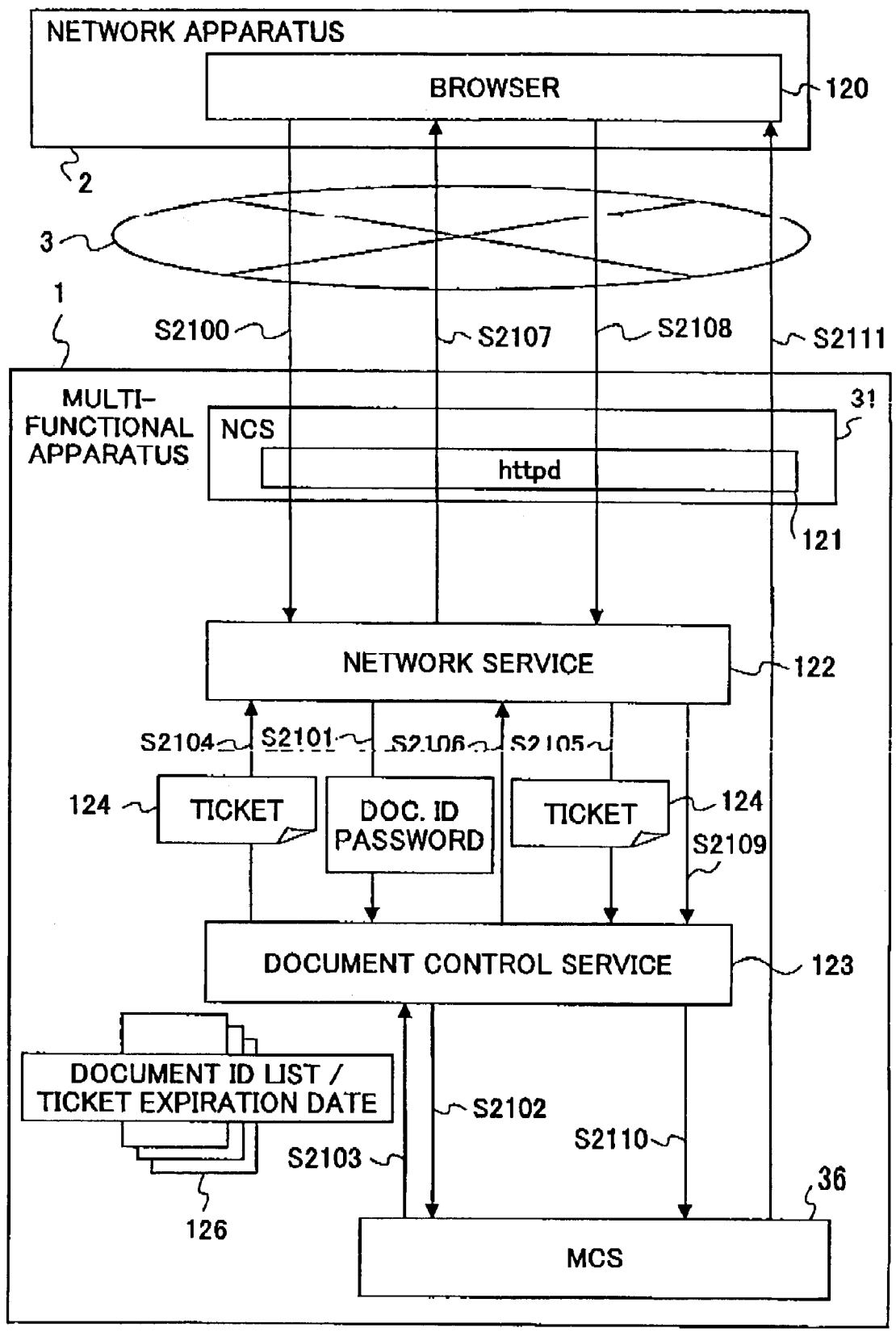
FIG. 21 is a schematic diagram for explaining a method of obtaining a thumbnail according to the third embodiment.

FIG. 21 is a schematic diagram for explaining a method of obtaining a thumbnail according to an embodiment. In FIG. 21, functional elements irrelevant to the description are not shown. Since steps S2100 through S2110 of FIG. 21 are identical to steps S1900 through S1910 of FIG. 19, their description is omitted.

After step S2110, the MCS 36 reads the thumbnail corresponding to the thumbnail ID from the document control DB included in HDD 68 and so forth using the thumbnail ID received from the document control service 123, and transmits the read thumbnail to the network apparatus via the httpd 121 of NCS 31 in step S2111.

The network apparatus 2 displays the thumbnail obtained from the multifunctional apparatus 1 on the screen of the browser 120. Accordingly, the user can easily obtain the thumbnail of a stored document stored in the multifunctional apparatus 1 by operating the browser 120 of the network apparatus 2. On the other hand, since the ticket 124 is transferred instead of the thumbnail itself, the multifunctional apparatus 1 can prevent its resources from being wasted.

In the method for obtaining a thumbnail according to the above three embodiment, the thumbnail of a stored document is already stored in the document control DB included in HDD 68, for example. The thumbnail of a stored document may be generated in response to a request to open the thumbnail file.

Figure 22:
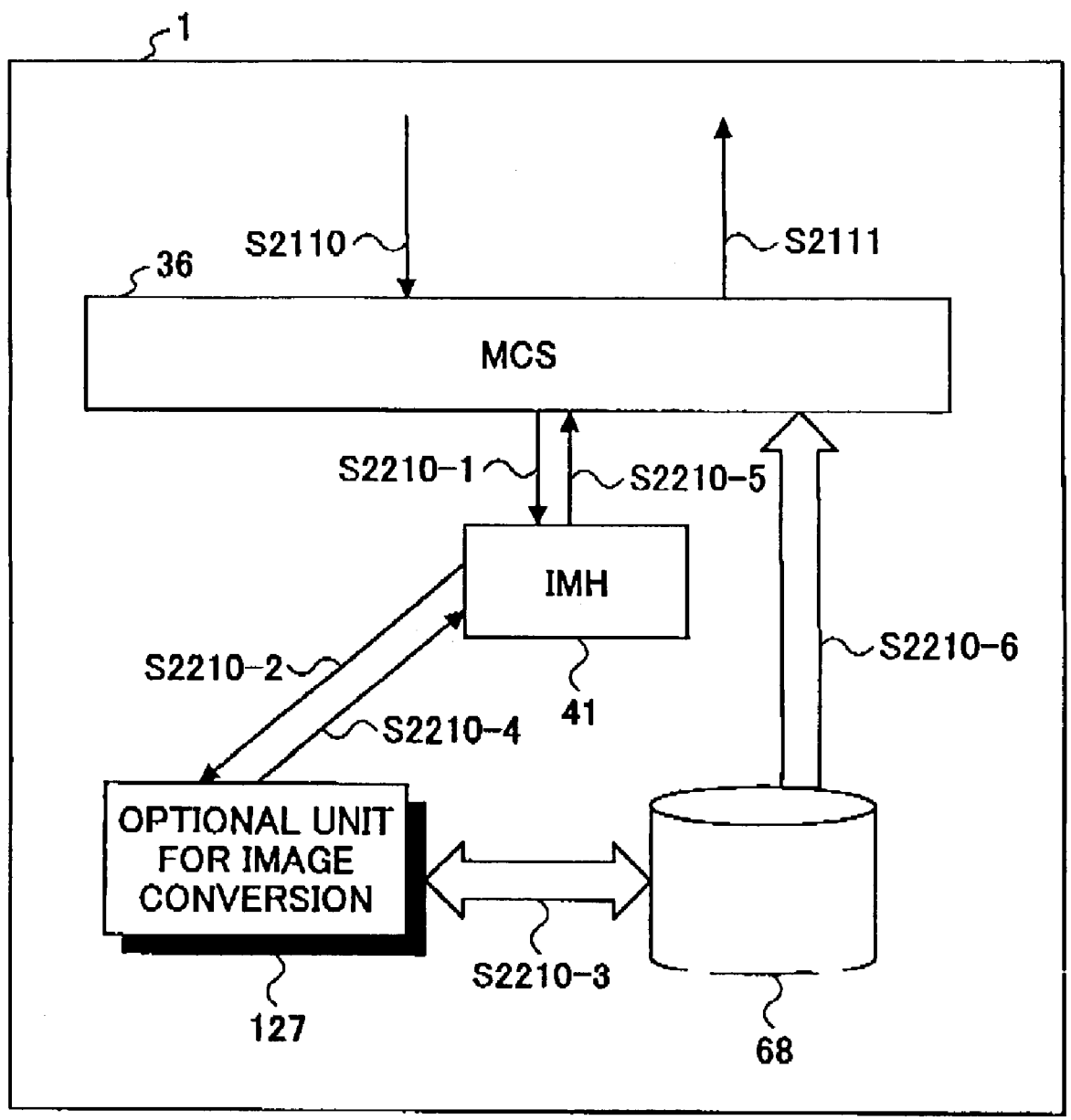
FIG. 22 is a schematic diagram for explaining the generation of a thumbnail according to an embodiment.

FIG. 22 is a schematic diagram for explaining the generating of the thumbnail of a stored document in response to a request to open the thumbnail file. Functional elements irrelevant to the description are not shown in FIG. 22. The generating of the thumbnail showed in FIG. 22 is applicable to the method of obtaining the thumbnail according to the above embodiments.

In this embodiment, it is assumed that the generating operation of the thumbnail follows step S2110 of FIG. 21. However, the generating operation of the thumbnail is also applicable to the embodiments described by reference to FIGS. 19 and 20 in the same manner. In these cases, the generating operation of the thumbnail follows step S1910 and S2010 of FIGS. 19 and 20, respectively.

After step S2110 of FIG. 21, in FIG. 22 MCS 36 requests IMH 41 to generate the stored document into the thumbnail using the thumbnail ID received from the document control service 123 in step S2210-1. After step S2210-1, IMH 41 generates the thumbnail from the stored document using an optional unit for image conversion in step S2210-2.

After step S2210-2, the optional unit for image conversion temporarily stores the generated thumbnail in HDD 68 in step S2210-3. After step S2110-3, the optional unit for image conversion informs IMH 41 that the image conversion from the stored document to the thumbnail is completed in step S2210-4. After step S2210-4, IMH 41 sends a response to MCS 36 indicating the completion of the image conversion in step S2210-5.

After step S2210-5, MCS 36 obtains the thumbnail from HDD 68 in step S2210-6. After step S2210-6, MCS 36 follows step S2111 of FIG. 21.

In the case where the generating operation of the thumbnail is applied to the method of obtaining the thumbnail of FIG. 20, MCS 36 follows step S2011 of FIG. 20. In the case where the generating operation of the thumbnail is applied to the method of obtaining the thumbnail of FIG. 19, MCS 36 follows step S1911 of FIG. 19.

Accordingly, since the thumbnail of a stored document is generated in response to a request to open the thumbnail function, the memory capacity of HDD 68 required to store the thumbnail can be reduced.

In addition, the thumbnail URL of a provisional thumbnail is transmitted to the network apparatus 2 in step S2107 because the thumbnail of a stored document is generated after a request to open the thumbnail file is made.

Figure 23:
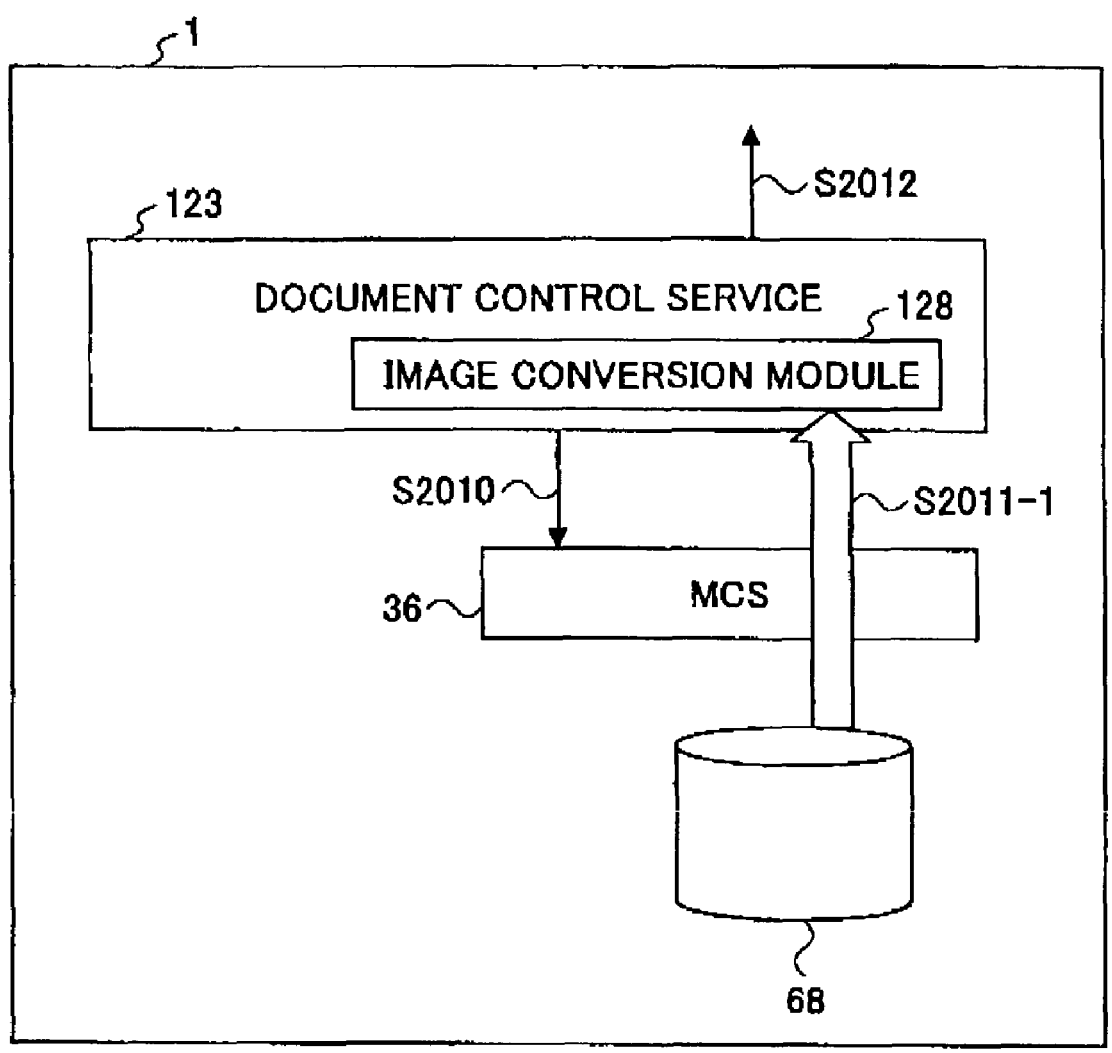
FIG. 23 is a schematic diagram for explaining the generation of a thumbnail according to another embodiment.

FIG. 23 is a schematic diagram for explaining another generating of the thumbnail of a stored document in response to a request to open the thumbnail file. Functional elements irrelevant to the description are not shown in FIG. 23. The generating of the thumbnail showed in FIG. 23 is applicable to the method of obtaining the thumbnail according to the above embodiments described by reference to FIGS. 19 and 20.

In this embodiment, it is assumed that the generating operation of the thumbnail follows step S2010 of FIG. 20. However, the generating operation of the thumbnail is also applicable to the embodiment described by reference to FIG. 20.

After step S2010, MCS 36 obtains the stored document from HDD 68 using the thumbnail ID received from the document control service 123, and provides the stored document to an image conversion module 128 in the document control service 123 in step S2011-1. The image conversion module 128 generates the thumbnail from the stored document.

The document control service 123 follows step S2012 of FIG. 20, and transmits the generated thumbnail to the network apparatus 2 via the httpd 121 of NCS 31. In the case where the generating operation of the thumbnail is applied to the embodiment of FIG. 19, the document control service 123 follows step S1912, and transmits the generated thumbnail to the network service 122.

Accordingly, since the thumbnail of a stored document is generated in response to a request to open the thumbnail function, the memory capacity of HDD 68 required to store the thumbnail can be reduced.

In addition, the thumbnail URL of a provisional thumbnail is transmitted to the network apparatus 2 in step S2007 because the thumbnail of a stored document is generated after a request to open the thumbnail file is made.

4. Method of Outputting a Thumbnail

Preferred embodiments of a method of outputting a thumbnail are described below by reference to the drawings that are referred to previously.

First Embodiment

FIG. 7 is a schematic diagram for explaining a method of outputting (printing, for example) a thumbnail according to an embodiment. Functional elements irrelevant to the description are omitted in FIG. 7.

The network apparatus 2 connected to the multifunctional apparatus 1 via the network 3 such as the Internet causes the multifunctional apparatus 1 to output (print, for example) a thumbnail by a method of outputting a thumbnail according to the embodiment.

The browser 120 of the network apparatus 2 obtains the list of stored documents and the document IDs thereof stored in the multifunctional apparatus 1 from the multifunctional apparatus 1 using an HTTP request and an HTTP response, for example, in advance.

If a password is required to output the thumbnail, a user operating the network apparatus 2 inputs a password for the desired thumbnail, and clicks a button provided in the screen of the browser 120 with a mouse, for example, to output the thumbnail. The user may select all or a part of the stored documents from the list of the stored documents displayed on the screen of the browser 120 to output the thumbnails of selected stored documents.

In step S700, the browser 120 of the network apparatus 2 creates an HTTP request including the document ID and the password of the stored document selected by the user, and transmits it to the multifunctional apparatus 1 via the network 3 such as the Internet. The HTTP request from the network apparatus 2 is transmitted to a network service 122 via the httpd 121 of NCS 31.

After step S700, in step S701 the network service 122 transmits the document ID and the password of the stored document to the document control service 123, and requests the document control service 123 to obtain the ticket 124 by calling, for example, the function "base64Binary getDocTicket (unsigned int[ ] docId, string[ ] password)", where the document ID and the password are parameters.

After step S701, in step S702 the document control service 123 transmits the document ID and the password of the stored document received to MCS 36, and requests MCS 36 to authenticate the password by calling, for example, the function "int mcsCheckPassword (unsignedInt DocId, string password)", where the document ID and the password of the stored document are parameters.

MCS 36 authenticates the password received from the document control service 123. After step S702, MCS 36 transmits the result of the password authentication to the document control service 123 as a value of the function "int mcsCheckPassword (unsignedInt DocId, string password)", for example, in step S703.

When the password is authenticated, the document control service 123 generates the ticket 124.

In step S704, the document control service 123 transmits the generated ticket 124 to the network service 122 as a value of the above function "base64Binary getDocTicket (unsigned int[ ] docId, string[ ] password)", for example.

In step S705, the network service 122 transmits the ticket 124 received in step S704 to document output service 130, and requests the document output service 130 to output the thumbnail by calling, for example, a function "void printThumbnailByTicket (base64Binary ticket)", where the ticket 124 is a parameter, to cause the document output service 130 to output the desired stored document. The document output service 130 is provided in the printer application 31, for example. The document output service 130 may be provided in the control service layer 9.

In step S706, the document output service 130 transmits the ticket received in step S705 to the document control service 123, and requests the document control service 123 to obtain a thumbnail ID corresponding to the ticket 124, by calling, for example, a function "arrayOfAnyURI getThumbnailIdsByThicket (base64Binary ticket)" where a parameter "ticket" is the ticket 124.

In step S707, the document control service 123 checks the validity of the received ticket 124 using the table 126, if the ticket 124 is valid, obtains the document ID corresponding to the ticket ID included in the ticket 124 from the table 126, and transmits the thumbnail ID corresponding to the document ID to the document output service 130. The thumbnail ID is transmitted from the document control service 123 to the document output service 123 as a value of the above function "arrayOfAnyURI getThumbnailIdsByThicket (base64Binary ticket)", for example.

In step S708, the document output service 130 transmits the thumbnail ID received in step S707 to ECS 35, for example, to cause ECS 35 to output (print, for example) the thumbnail. For example, ECS 35 reads the thumbnail from the document control DB stored in HDD 68 using the thumbnail ID, and outputs the thumbnail. The document output service 130 and ECS 35 follow the steps described above by reference to FIG. 5.

Following the event flow showed in FIG. 5, the document output service 130 outputs the thumbnail corresponding to the thumbnail ID received in step S707. After step S708, the document output service 130 transmits the result of the output operation to the network service 122 in step S709.

In step S710, the network service 122 transmits the result of the output service received in step S709 to the network apparatus 2 via the httpd 121 of NCS 31. The network apparatus 2 displays the result of output operation received from the multifunctional apparatus 1 on the screen of the browser 120.

Accordingly, the user can easily output the thumbnail stored in the multifunctional apparatus 1 by operating the network apparatus 2. Additionally, thanks to the use of the ticket 124, the multifunctional apparatus 1 of FIG. 7 does not need to transfer the large amount of data of the thumbnail, and the multifunctional apparatus 1 can use its resources efficiently.

In addition, because the ticket 124 is transferred to the document output service 130, the document output service 130 can output the thumbnail that is already authenticated without knowing the password.

Second Embodiment

FIG. 9 is a schematic diagram for explaining a method of outputting a thumbnail according to another embodiment. Functional elements irrelevant to the description are not showed in FIG. 9. Since steps S900 through S908 of FIG. 9 are identical steps S700 through S708 of FIG. 7, their description will be omitted.

After step S908, the document output service 130 transmits the result of the output operation to the network apparatus 2 via httpd 121 of NCS 31 in step S909. The network apparatus 2 displays the result of the output operation received from the multifunctional apparatus 1 on the screen of the browser 120.

Accordingly, the user can easily output the thumbnail stored in the multifunctional apparatus 1 by operating the browser 120 of the network apparatus 2. Thanks to the use of the ticket 124 instead of the large data of the thumbnail, the multifunctional apparatus 1 can prevent its resources from being wasted. In addition, thanks to the use of the ticket 124, the document output service 130 can output the thumbnail that is already authenticated without receiving the password of the thumbnail.

Third Embodiment

FIG. 12 is a schematic diagram for explaining a method of outputting a stored document according to an embodiment. In FIG. 12, functional elements irrelevant to the description are not shown. Since steps S1200 through S1204 of FIG. 12 are identical to steps S700 through S704 of FIG. 7, their description are omitted.

As showed in FIG. 12, the network apparatus 2 is connected to the multifunctional apparatus 1 via the network 3 such as the Internet, and causes the multifunctional apparatus 1 to output (print, for example) the thumbnail of a stored document stored in the multifunctional apparatus 1 using a method of outputting a thumbnail according to this embodiment.

After step S1204, the network service 122 transmits the ticket 124 received in step S1204 to the document control service 123, and requests the document control service 123 to obtain the thumbnail ID corresponding to the ticket 124 in step S1205. The network service 122 calls a function "int getDocumentIdsByTicket (base64Binary ticket)" to request the document control service 123 to obtain the thumbnail ID corresponding to the ticket 124, where a parameter "ticket" is the ticket 124.

After step S1205, the document control service 123 checks the validity of the received ticket 124 with the table 126, If the ticket 124 is valid, the document control service 123 obtains the document ID from the table 126 based on the ticket ID included in the received ticket 124, and transmits the thumbnail ID corresponding to the document ID to the network service 122 in step S1206. The thumbnail ID is transmitted from the document control service 123 to the network service 122 as the value of the above function "getDocumentIdsByTicket" for obtaining the document ID, for example.

After step S1206, the network service 122 transmits the thumbnail ID received from the document control service 123 to the document output service 130, and requests the document output service 130 to output the thumbnail in step S1207.

After step S1207, the document output service 130 transmits the thumbnail ID received from the network service 122 to DCS 32, FCS 34, or ECS 35, and causes them to output the thumbnail corresponding to the thumbnail ID in step S1208. For example, DCS 32, FCS 34, or ECS 35 reads the thumbnail corresponding to the thumbnail ID from the document control DB stored in HDD 68 and so forth, and outputs the thumbnail.

For example, the document output service 130 transmits the thumbnail ID received from the network service 122 to ECS 35, and prints the thumbnail corresponding to the thumbnail ID by following the steps described above by reference to FIG. 5.

After step S1208, the document output service 130 transmits the result of the output operation to the network service 122 in step S1209. In step S1210, the network service 122 transmits the result of the output operation received from the document output service 130 to the network apparatus 2 via httpd 121 of NCS 31. The network apparatus 2 displays the result of the output operation received from the multifunctional apparatus 1 on the screen of the browser 120.

Accordingly, the user can easily output the thumbnail stored in the multifunctional apparatus 1 by operating the browser 120 of the network apparatus 2. Additionally, thanks to the use of the ticket 124, the multifunctional apparatus 1 of FIG. 12 does not need to transfer the large amount of data of the thumbnail, and the multifunctional apparatus 1 can use its resources efficiently. Since the multifunctional apparatus 1 transmits the thumbnail ID instead of the ticket 124, the document output service 130 can output the stored document that is already authenticated without receiving the password.

Furthermore, the multifunctional apparatus 1 of FIG. 12 does not need to control the communication between the document control service 123 and the document output service 130 as a host and a client, respectively, in a complex way since they do not directly communicate.

Fourth Embodiment

FIG. 13 is a schematic diagram for explaining a method of outputting a stored document according to another embodiment. In FIG. 13, functional elements irrelevant to the description are not shown.

In step S1300, the browser 120 of the network apparatus 2 generates a HTTP request including the document ID and the password of the stored document selected by the user, and transmits it to the multifunctional apparatus 1 via the network 3. The HTTP request transmitted from the network apparatus 2 is provided to the network service 122 via httpd 121 of NCS 31.

After step S1300, the network service 122 establishes a session with the document control service 123 in step S1301. The document control service 123 obtains a session ID 151 of the document control service 123 corresponding to a session object 150 of the document control service 123.

The network service 122 obtains the document ID and the password included in the HTTP request provided from the network apparatus 2. The network service 122 transmits the document ID and the password to the document control service 123, and requests the document control service 123 to obtain the ticket 124.

After step S1301, the document control service 123 transmits the document ID and the password received from the network service 122 to MCS 36, and requests MCS 36 to authenticate the password in step S1302. MCS 36 authenticates the password based on the document ID and the password received from the document control service 123.

After step S1302, MCS 36 transmits the result of the password authentication to the document control service 123 in step S1303. If the password authentication of the document ID is successfully completed, the document control service 123 generates the ticket 124.

In step S1304, the document control service 123 transmits the generated ticket 124 and the session ID 151 of the document control service to the network service 122.

In step S1305, the network service 122 stores the ticket 124 and the session ID 151 of the document control service in the HTTP session object 152 correspondingly to the HTTP session ID 153. After step S1305, the network service 122 transmits the HTTP session ID 153 corresponding to the HTTP session object 152 to the network apparatus 2 via httpd 121 of NCS 31 and the network 3 in step S1306.

In step S1307, the browser 120 of the network apparatus 2 generates a HTTP request including an output request of the thumbnail and the HTTP session ID 153, and transmits the HTTP request to the multifunctional apparatus 1 via the network 3. The HTTP request transmitted from the network apparatus 2 is provided to the network service 122 via httpd 121 of NCS 31.

After step S1307, the network service 122 obtains the HTTP session ID 153 included in the HTTP request provided from the network apparatus 2 in step S1308. The network service 122 refers to the HTTP session object 152, and obtains the ticket 124 and the session ID 151 of the document control service from the HTTP session object 152 corresponding to the HTTP session ID 153 received in step S1307.

In this case, the network service 122 may determine in step S1306 whether the network apparatus 2 that receives the HTTP session ID 153 is the same as the network apparatus that transmitted the HTTP session ID 153 in step S1307, and if they are different, the network service 122 may reject the request from the different network apparatus 2 to output the thumbnail.

In step S1309, the network service 122 transmits the ticket 124 and the session ID 151 of the document control service obtained in step S1308 to the document control service 123, and requests the document control service 123 to obtain the thumbnail ID corresponding to the ticket 124.

After step S1309, the document control service 123 checks the validity of the received ticket 124 using the table 126. If the ticket 124 is valid, the document control service 123 obtains the document ID corresponding to the ticket ID included in the received ticket 124 from the table 126, and transmits the document ID to the network service 122 in step S1310.

Since steps S1311 through S1314 of FIG. 12 after the network service 122 obtains the thumbnail ID from the document control service 123 are identical to steps S1207 through S1210 of FIG. 12, their description will be omitted.

Accordingly, the user can easily output the thumbnail stored in the multifunctional apparatus 1 by operating the browser 120 of the network apparatus 2. Additionally, thanks to the use of the ticket 124, the multifunctional apparatus 1 of FIG. 13 does not need to transfer the large amount of data of the thumbnail, and the multifunctional apparatus 1 can use its resources efficiently. Since the multifunctional apparatus 1 transmits the thumbnail ID instead of the ticket 124 to the document output service 130, the document output service 130 can output the thumbnail that is already authenticated without knowing the password.

Furthermore, the multifunctional apparatus 1 of FIG. 13 does not need to control the communication between the document control service 123 and the document output service 130 as a host and a client, respectively, in a complex way since they do not directly communicate with each other.

Fifth Embodiment

FIG. 14 is a schematic diagram for explaining a method or outputting a stored document according to another embodiment. In FIG. 14, functional elements irrelevant to the description are not shown. Because steps S1400 through S1406 of FIG. 14 are identical to steps S1300 through S1308 of FIG. 13, their description will be omitted.

In step S1409, the network service 122 transmits the ticket 124 and the session ID 151 of the document control service received in step S1408 to the document output service 130.

After step S1409, the document output service 130 transmits the ticket 124 and the session ID 151 of the document control service received from the network service 122 to the document control service 123, and requests the document control service 123 to obtain the thumbnail ID corresponding to the ticket 124 in step S1410.

After step S1410, the document control service 123 checks the validity of the received ticket 124 using the table 126. If the ticket 124 is valid, the document control service 123 obtains the document ID corresponding to the ticket ID included in the received ticket 124 from the table 126, and transmits the thumbnail ID corresponding to the document ID to the document output service 130 in step S1411. The thumbnail ID is transmitted from the document control service 123 to the document output service 130 as a value of the function to obtain a thumbnail ID, for example.

Since steps S1412 through S1415 after obtaining the thumbnail ID from the document control service 123 are identical to steps S1212 through S1214 of FIG. 12, the description of steps S1412 through S1415 will be omitted.

Accordingly, the user can easily output the thumbnail stored in the multifunctional apparatus 1 by operating the browser 120 of the network apparatus 2. Additionally, thanks to the use of the ticket 124, the multifunctional apparatus 1 of FIG. 14 does not need to transfer the large amount of data of the thumbnail, and can use its resources efficiently. Since the thumbnail ID, instead of the ticket 124, is transmitted to the document output service 130, the document output service 130 can output the thumbnail that is already authenticated without receiving the password.

In the description of the above embodiments showed in FIGS. 12 through 14, it is assumed that the thumbnail of the stored document is already stored in the document control DB stored in HDD 68, for example. The thumbnail may be generated in response to a request to obtain the thumbnail indicating the thumbnail ID as described above by reference to FIG. 22.

Sixth Embodiment

FIG. 10 is a schematic diagram for explaining a method of outputting a stored document according to yet another embodiment. Functional elements irrelevant to the description are not shown in FIG. 10.

As showed in FIG. 10, the network apparatus 2 is connected to the multifunctional apparatus 1 according to this embodiment via the network such as the Internet. The network apparatus 2 causes the multifunctional apparatus 1 to output a thumbnail stored in the multifunctional apparatus 1 using a method of outputting a stored document according to this embodiment.

The network apparatus 2 and the document control service 123 of the multifunctional apparatus 1, and the network apparatus 2 and the document output service 130 of the multifunctional apparatus 1 exchange data using the extensible markup language (XML). They also use the simple object access protocol (SOAP) for data access.

In step S1000, the network apparatus 2 transmits, using SOAP and XML, the document ID selected by the user and the password thereof to the document control service 123 of the multifunctional apparatus 1 via httpd 121 of NCS 31, and requests the document control service 123 to obtain the ticket 124.

After step S1000, the document control service 123 transmits the document ID and the password included in the request to obtain the ticket 124 received from the network apparatus 2 to MCS 36, and requests MCS 36 to authenticate the password by using a function "int mcsCheckPassword (unsignedInt DocId, string password) in step S1001, where the parameters "DocId" and "password" are the document ID of the stored document and its password. MCS 36 authenticates the password using the document ID and the password received from the document control service 123.

After step S1001, MCS 36 transmits the result of the password authentication to the document control service 123 in step S1002. The result of the password authentication is transmitted from MCS 36 to the document control service 123 as the value of the function to request the password authentication, for example.

After the password is authenticated, the document control service 123 generates the ticket 124 as showed in FIG. 4A.

In step S1003, the document control service 123 transmits, using SOAP and XML, the generated ticket 124 to the network apparatus 2 via the httpd 121 of NCS 31 and the network 3.

In step S1004 the network apparatus 2 transmits, using SOAP and XML, the ticket 124 received in step S1003 to the document output service 130 of the multifunctional apparatus 1, and requests the document output service to output (print, for example) the thumbnail.

After step S1004, the document output service 130 transmits the ticket 124 received in step S1004 to the document control service 123, and requests the document control service 123 to obtain the thumbnail ID corresponding to the ticket 124 in step S1005. The document output service 130 may use a function "arrayOfAnyURI getDocumentIdsByTicket (base64Binary ticket)", where the ticket 124 is a parameter.

After step S1005, the document control service 123 checks the validity of the ticket 124 using the table 126. If the ticket 124 is valid, the document control service 123 obtains the document ID corresponding to the ticket ID included in the received ticket 124 from the table 126, and transmits the thumbnail ID corresponding to the document ID to the document output service 130 in step S1006. The thumbnail ID is transferred from the document control service 123 to the document output service 130 as the value of the function to obtain a thumbnail ID.

In step S1007, the document output service 130 transmits the thumbnail ID received in step S1006 to ECS 35, for example, and outputs (print, for example) the thumbnail corresponding to the thumbnail ID. ECS 35 reads the thumbnail corresponding to the thumbnail ID from the document control DB stored in HDD 68.

The document output service 130 and ECS 35 collaborate to output the thumbnail as described by reference to FIG. 8.

In step S1008, the document output service 130 transmits, using SOAP and XML, the result of the output operation to the network apparatus 2 via the httpd 121 of NCS 35 and the network 3. The network apparatus 2 displays the result of the output operation received from the multifunctional apparatus 1 on the screen.

Accordingly, the user can easily output (print, for example) the thumbnail stored in the multifunctional apparatus 1 by operating the network apparatus 2. The multifunctional apparatus 1 can output the thumbnail that is already authenticated using the ticket 124 without informing the document output service 130 of the password.

Seventh Embodiment

FIG. 11 is a schematic diagram for explaining a method of outputting a thumbnail according to yet another embodiment. Functional elements irrelevant to the description are not shown in FIG. 11. Additionally, because steps S1100 through 51102 of FIG. 11 are identical to steps S1000 through S1002 of FIG. 10, their description will be omitted.

In step S1103, the document control service 123 stores the generated ticket 124 in a HTTP session object 152 so that the ticket 124 corresponds to a HTTP session ID 153. After step S1103, the document control service 123 transmits, using SOAP and XML, a HTTP session ID 153 corresponding to the HTTP session object 152 to the network apparatus 2 via httpd 121 of NCS 31 and the network 3 in step S1104.

In step S1105, the network apparatus 2 transmits, using SOAP and XML, the HTTP session ID 153 received in step S1104 to the document output service 130 of the multifunctional apparatus 1, and requests the document output service 130 to output the thumbnail.

In step S1106, the document output service 130 refers to the HTTP session object 152, and obtains the ticket 124 corresponding to the HTTP session ID 153 received in step S1105.

The document output service 130 may determine whether the network apparatus 2 that receives the HTTP session ID 153 in step S1104 and the network apparatus 2 that transmits the HTTP session ID 153 in step S1105 are the same. If they are different, the document output service 130 may not accept the request to output the stored document from the different network apparatus 2.

Since steps S1107 through S1110 in FIG. 11 are identical to steps S1005 through S1008 of FIG. 10, their description will be omitted.

As described above, the multifunctional apparatus 1 and the network apparatus 2 exchange the HTTP session ID 153 corresponding to the HTTP session object 152 storing the ticket 124 therein instead of the ticket 124 itself through the network 3 so as to improve the security of information.

Eighth Embodiment

FIG. 17 is a schematic diagram for explaining a method of outputting a stored document according to an embodiment. In FIG. 17, functional elements irrelevant to the description are not shown. Since steps S1700 through S1703 of FIG. 17 are identical to steps S1000 through S1003 of FIG. 10, their description will be omitted.

As showed in FIG. 17, the network apparatus 2 is connected to the multifunctional apparatus 1 via the network 3 such as the Internet. The network apparatus 2 outputs (prints, for example) the thumbnail stored in the multifunctional apparatus 1 using the method of outputting a thumbnail according to an embodiment.

In step S1704, the network apparatus 2 transmits, using SOAP and XML, the ticket 124 received in step S1703 to the document output service 130 of the multifunctional apparatus 1, and requests the document output service 130 to output the thumbnail.

After step S1704, the document output service 130 transmits the ticket 124 received from the network apparatus 2 in step S1704 to the document control service 123, and requests the document control service 123 to obtain the thumbnail ID corresponding to the ticket 124 in step S1705.

After step S1705, the document control service 123 verifies the validity of the ticket 124 using the table 126. If the ticket 124 is valid, the document control service 123 obtains the document ID from the table 126 based on the ticket ID included in the received ticket 124, and transmits the obtained thumbnail ID corresponding to the document ID to the document output service 130 in step S1706.

In step S1707 after step S1706 the document output service 130 transmits the thumbnail ID received from the document control service 123 in step S1706 to DCS 32, FCS 34, or ECS 35 to output the thumbnail corresponding to the thumbnail ID. For example, DCS 32, FCS 34, or ECS 35 reads the thumbnail from the document control DB stored in HDD 68 and so forth using the thumbnail ID, and outputs the thumbnail.

For example, the document output service 130 transmits the thumbnail ID received from the document control service 123 to ECS 35, and causes ECS 35 to print the thumbnail corresponding to the thumbnail ID based on the output operation described by reference to FIG. 8.

In step S1708 after step S1707, the document output service 130 transmits the result of the output operation to the network apparatus 2 via the httpd 121 of NCS 31. The network apparatus 2 displays the result of the output operation received from the multifunctional apparatus 1 on the screen of the network apparatus 2.

Accordingly, the user can easily output the thumbnail stored in the multifunctional apparatus 1 operating the network apparatus 2. Additionally, thanks to the use of the ticket 124, the multifunctional apparatus 1 of FIG. 17 does not need to transfer the large amount of data of the thumbnail, and the multifunctional apparatus 1 can use its resources efficiently.

In addition, because the ticket 124 is transferred to the document output service 130, the document output service 130 can output the thumbnail that is already authenticated without knowing the password.

Ninth Embodiment

FIG. 18 is a schematic diagram for explaining a method of outputting a stored document according to yet another embodiment. In FIG. 18, functional elements irrelevant to the description are not shown.

In step S1800, the network apparatus 2 establishes a session with the document control service 123 of the multifunctional apparatus 1. The document control service 123 obtains a session ID 151 of the document control service corresponding to the session object 150 of the document control service.

The network apparatus 2 transmits the document ID and the password of the stored document selected by the user to the document control service 123 of the multifunctional apparatus 1 via the network 3 and the httpd 121 of NCS 31.

In step S1801 after step S1800, the document control service 123 transmits the document ID and the password included in the request to obtain the ticket 124 received from the network apparatus 2 to MCS 36, and requests MCS 36 to authenticate the password. Using the document ID and the password received from the document control service 123, MCS 36 authenticates the password.

In step S1802 after step S1801, MCS 36 transmits the result of the password authentication to the document control service 123. If the password authentication of the document ID is successfully completed, the document control service 123 generates the ticket 124.

In step S1803, the document control service 123 stores the generated ticket 124 and the session ID of the document control service in the HTTP session object 152 correspondingly to the HTTP session ID 153. In step S1804 after step S1803, the document control service 123 transmits the HTTP session ID 153 corresponding to the HTTP session object 152 to the network apparatus 2 via the httpd 121 of NCS 31 and the network 3.

In step S1805, the network apparatus 2 requests the document output service 130 of the multifunctional apparatus 1 to output the thumbnail using the HTTP session ID 153 received in step S1804.

In step S1806 after step S1805, the document output service 130 refers to the HTTP session ID 153 received from the network apparatus 2 in step S1805, and obtains the ticket 124 and the session ID 151 of the document control service from the HTTP session object 152 corresponding to the HTTP session ID 153.

At this point of time, the document output service 130 may determine whether the network apparatus 120 that transmits the HTTP session ID 153 in step S1805 is the same as the network apparatus 120 that received the HTTP session ID 153 in step S1804. If they are different, the document output service 130 may reject the request to output the thumbnail from the different network apparatus 120.

In step S1807 after step S1806, the document output service 130 transmits the ticket 124 and the session ID 151 of the document control service obtained in step S1806 to the document control service 123, and requests the document control service 123 to obtain the thumbnail ID.

At this point of time, the document control service 123 verifies the session object 150 of the document control service corresponding to the received session ID 151 of the document control service, and if the session ID 151 is not available, the document control service 123 may reject the request to obtain the thumbnail.

In step S1808 after step S1807, the document control service 123 verifies the validity of the ticket 124. If the ticket 124 is valid, the document control service 123 obtains the document ID corresponding to the ticket ID included in the received ticket 124 from the table 126, and transmits the thumbnail ID corresponding to the document ID to the document output service 130.

The description of steps S1809 and S1810 after the document output service 130 obtains the thumbnail ID from the document control service 123 is omitted since they are identical to steps S1707 and S1708 of FIG. 17.

Accordingly, since only the HTTP session ID 153 corresponding to the ticket 124 is transmitted through the network 3 between the multifunctional apparatus 1 and the network apparatus 2, the multifunctional apparatus 1 can keep secure the information stored therein.

Tenth Embodiment

FIG. 15 is a schematic diagram for explaining a method of outputting a thumbnail according to yet another embodiment. In FIG. 15, functional elements irrelevant to the description are not showed.

The network apparatus 2 is connected to the multifunctional apparatuses 1a and 1b via the network such as the Internet. The network apparatus 2 causes the multifunctional apparatus 1b to output (print, for example) the thumbnail stored in the multifunctional apparatus 1a using a method of outputting a thumbnail according to this embodiment.

In steps S1500 through S1503, the ticket 124 is generated and transmitted to the network apparatus 2 in the same manner as steps S1700 through S1703 of FIG. 17, and discussion thereof is omitted.

In step S1504, the network apparatus 2 transmits the ticket 124 received in step S1503 to the document output service 130b of the multifunctional apparatus 1b via the httpd 121b of NCS 31b, and requests the document output service 130b to output the thumbnail.

In step S1505, the document output service 130b transmits the ticket 124 received in step S1504 to the document control service 123a of the multifunctional apparatus 1a via NCS 31b and the httpd 121a of NCS 31a, and requests the document control service 123a to obtain the thumbnail corresponding to the ticket 124.

In step S1506, the document control service 123a verifies the validity of the received ticket 124 using the table 126a. If the ticket is valid, the document control service 123a obtains the document ID corresponding to the ticket ID included in the received ticket 124 from the table 126a, and reads the thumbnail corresponding to the document ID from the document control DB. The document control service 123a transmits the read thumbnail to the document output service 130b of the multifunctional apparatus 1b via the httpd 121a of NCS 31a and NCS 31b.

In step S1507, the document output service 130b transmits the thumbnail received in step S1506 to DCS 31b, FCS 34b, or ECS 35b to output the thumbnail. For example, the thumbnail is output by the document output service 130b and ECS 35b as described above by reference to FIG. 8.

In step S1508 after step S1507, the document output service 130b transmits the result of the output operation to the network apparatus 2 via the httpd 121b of NCS 31b. The network apparatus 2 displays the result of the output operation received from the multifunctional apparatus 1b on the screen.

Accordingly, the user can easily output the thumbnail stored in the multifunctional apparatus 1a with the multifunctional apparatus 1b using the document control service 123a of the multifunctional apparatus 1a by operating the network apparatus 2.

Additionally, thanks to the use of the ticket 124, the multifunctional apparatuses 1a and 1b of FIG. 15 do not need to exchange the large amount of data of the thumbnail unnecessarily, and the multifunctional apparatuses 1a and 1b can avoid wasting the network resources and their hardware resources. Furthermore, thanks to the use of the ticket 124, the document output service 130b of the multifunctional apparatus 1b can output the authenticated thumbnail stored in the multifunctional apparatus 1a without knowing the password of the thumbnail.

Eleventh Embodiment

FIG. 16 is a schematic diagram for explaining a method of outputting a stored document according to yet another embodiment. In FIG. 16, functional elements irrelevant to the description are not showed.

In step S1600, the network apparatus 2 establishes a session with the document control service 123a of the multifunctional apparatus 1a. The document control service 123a obtains the session ID 151 corresponding to the session object 150a.

The network apparatus 2 transmits the document ID and the password of the stored document selected by the user to the document control service 123a of the multifunctional apparatus 1a via the httpd 121a of NCS 31a, and requests the document control service 123a to obtain the ticket 124.

In step S1601 after step S1600, the document control service 123a transmits the document ID and the password of the stored document received from the network apparatus 2 to MCS 36a, and request MCS 36a to authenticate the password. MCS 36a authenticates the password using the document ID and the password received from the document control service 123a.

In step S1602 after step S1601, MCS 36a transmits the result of the password authentication to the document control service 123a. If the password is successfully authenticated, the document control service 123a generates the ticket 124 as showed in FIG. 4A.

In step S1603 after step S1602, the document control service 123a transmits the generated ticket 124 and the session ID 151 of the document control service to the network apparatus 2 via httpd 121a of NCS 31a.

In step S1604, the network apparatus 2 transmits the ticket 124 and the session ID of the document control service received in step S1603 to the document output service 130b of the multifunctional apparatus 1b via the httpd 121b of NCS 31b to request the output of the thumbnail.

In step S1605, the document output service 130b transmits the ticket 124 and the session ID 151 of the document control service received in step S1604 to the document control service 123a of the multifunctional apparatus 1a via NCS 31b and the httpd 131a of NCS 31a, and requests the document control service 123a to obtain the thumbnail corresponding to the ticket 124.

In step S1606 after step S1605, the document control service 123a verifies the validity of the ticket 124 using the table 126a. If the ticket 124 is valid, the document control service 123a obtains the document ID corresponding to the ticket ID included in the received ticket 124, and reads the thumbnail corresponding to the document ID from the document control DB.

At this point of time, the document control service 123 verifies the session object 150 of the document control service corresponding to the received session ID 151 of the document control service, and if the session ID 151 is not available, the document control service 123 may reject the request to obtain the thumbnail.

The document control service 123*a* transmits the thumbnail read from the document control DB to the document output service 130*b* of the multifunctional apparatus 1*b* via the httpd 121*a* of NCS 31*a* and NCS 31*b*.

Because steps S1607 and S1608 after the document output service 130*b* of the multifunctional apparatus 1*b* obtains the thumbnail from the document control service 123*a* of the multifunctional apparatus 1*a* are identical to steps 1507 and S1508 of FIG. 15, their description will be omitted.

Accordingly, the user can easily cause the multifunctional apparatus 1*b* to output the thumbnail stored in the multifunctional apparatus 1*a* using the document control service 123*a* of the multifunctional apparatus 1*a* by operating the network apparatus 2.

Additionally, thanks to the use of the ticket 124 and the session ID 151 of the document control service, the multifunctional apparatuses 1*a* and 1*b* of FIG. 16 do not need to exchange the large amount of data of the thumbnail unnecessarily, and can avoid wasting the network resources and their hardware resources. Furthermore, thanks to the use of the ticket 124 and the session ID 151 of the document control service, the document output service 130*b* of the multifunctional apparatus 1*b* can output the authenticated thumbnail stored in the multifunctional apparatus 1*a* without knowing the password of the thumbnail. The use of the session ID 151 of the document control service enhances security of the stored document.

In the description of the above embodiments showed in FIGS. 10 through 16, it is assumed that the thumbnail of the stored document is already stored in the document control DB stored in HDD 68, for example. The thumbnail may be generated in response to a request to obtain the thumbnail indicating the thumbnail ID as described above by reference to FIG. 22.

In the above embodiment, the ticket 124 is used as authentication information to access the stored document; however, another kind of authentication information may be used. Additionally, the session ID 151 of the document control service is used as authentication information to use the document control service; however, another kind of authentication information may be used.

5. Method of Obtaining a Thumbnail for Displaying

First Embodiment

Figure 24:
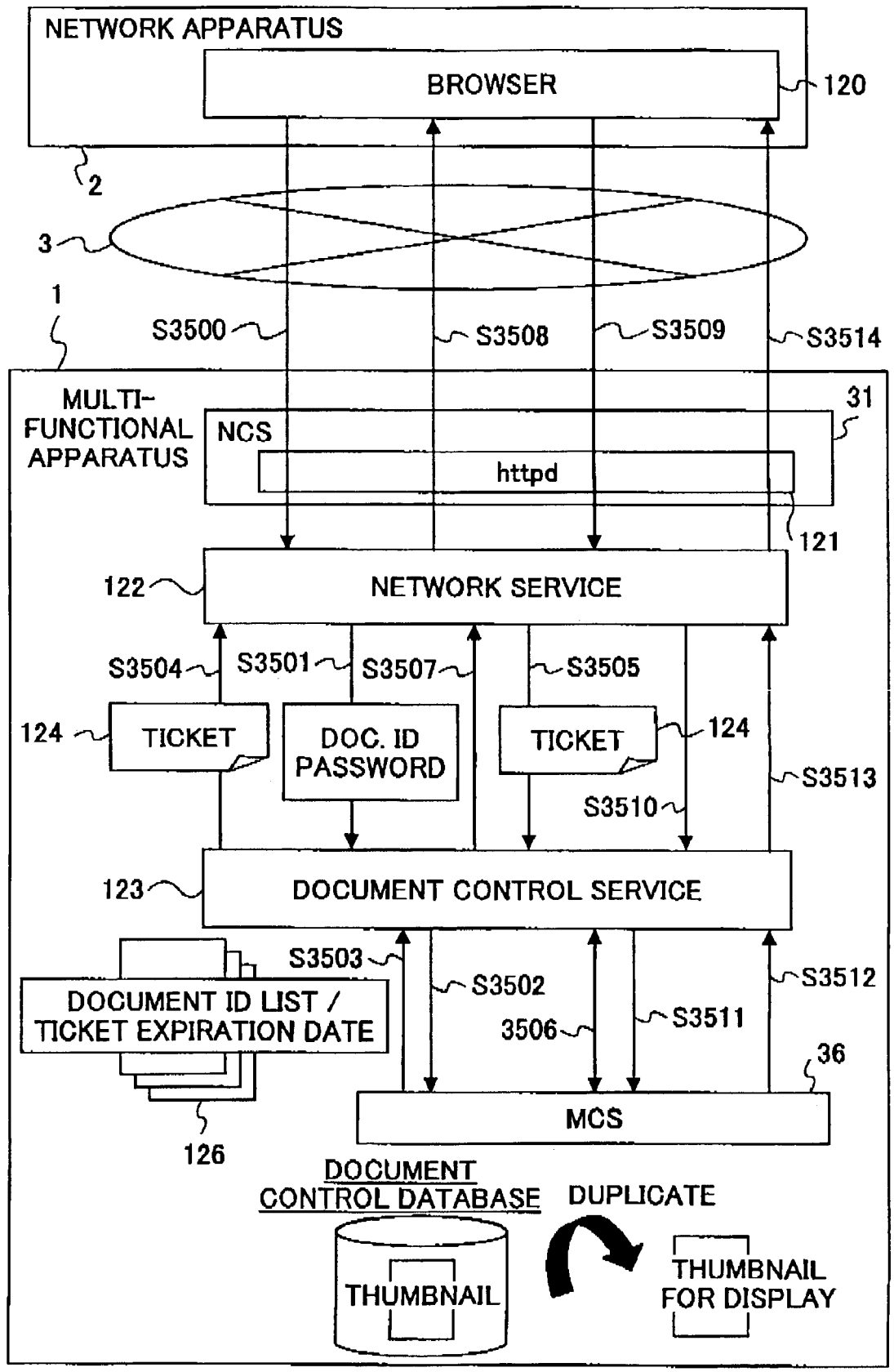
FIG. 24 is a schematic diagram for explaining a method of obtaining a duplicated thumbnail for displaying according to the first embodiment.

FIG. 24 is a schematic diagram for explaining a method of obtaining a thumbnail according to an embodiment. In FIG. 24, functional elements irrelevant to the description are not shown.

As showed in FIG. 24, a network apparatus 2 is connected to the multifunctional apparatus 1 via a network 3 such as the Internet. The network apparatus 2 obtains the thumbnail of a document file (stored document) stored in the multifunctional apparatus 1 using the method of obtaining a stored document.

A browser 120 of the network apparatus 2 obtains the list of stored documents and the document IDs thereof stored in the multifunctional apparatus 1 from the multifunctional apparatus 1 using an HTTP request and an HTTP response, for example, in advance. The user operating the network apparatus 2 inputs a password to obtain the thumbnail of a stored document, if necessary, and the user clicks a button provided in the screen of the browser 120 with a mouse, for example, to obtain the thumbnail. The user may select all or a part of the stored documents listed on the screen of the browser 120.

Since steps S3500 through S3504 are identical to steps S1900 through S1904 of FIG. 19, their description will be omitted.

In step S3505 after step S3504, the network service 122 transmits the ticket 124 received in step S3504 to the document control service 123, and requests the document control service 123 to generate a thumbnail to display on the screen of the browser 120 of the network apparatus 2. The thumbnail to display is requested using, for example, a function "anyURL createThumbnail (base64Binary ticket)" to create a thumbnail for displaying, where the ticket 124 is a parameter.

In step S3506 after step S3505, the document control service verifies the validity of the received ticket 124. If the ticket 124 is valid, the document control service 123 transmits the document ID included in the ticket 124 to MCS 36 to request MCS 36 to open a thumbnail file of the stored document corresponding to the document ID. The request to open a thumbnail file is made using, for example, a function "boolean mcsOpenPage (unsignedInt DocId)", where the document ID is a parameter.

After the thumbnail file is open, the document control service 123 generates a thumbnail for displaying by duplicating the thumbnail of the stored document corresponding to the document ID. The thumbnail for displaying is stored in the system memory 62, the local memory 67, or HOD 68, for example. If the thumbnail for displaying is stored in a memory region other than the document control DB, the load to the document control DB can be reduced.

The document control service 123 generates a URL (thumbnail URL) that indicates where the thumbnail for displaying is stored. The thumbnail URL is expressed as http://[IP address of apparatus]/[document file name]?[ticket data].

In step S3507 after step S3506, the document control service 123 transmits the generated thumbnail URL to the network service 122. The thumbnail URL is transmitted from the document control service 123 to the network service 122 as the value of the function to create a thumbnail for displaying.

In step S3508 after step S3507, the network service 122 transmits the thumbnail URL received in step S3507 to the network apparatus 2 via the httpd 121 of NCS 31.

In step S3509 after step S3508, the browser 120 of the network apparatus 2 generates an HTTP request including the thumbnail URL, and transmits it to the multifunctional apparatus 1 via the network 3.

The HTTP request including the thumbnail URL requests the thumbnail URL by the "get method" of the HTTP. The HTTP request transmitted from the network apparatus 2 is provided to the network service 122 via the httpd 121 of NCS 31.

In step S3510 after step S3509, the network service 122 transmits the thumbnail URL to the document control service 123, and requests the document control service to obtain the thumbnail. The request to obtain the thumbnail is made using, for example, a function "void getThumbnail (anyURL docID)" to obtain a thumbnail, where the thumbnail URL is a parameter.

In step S3511 after step S3510, the document control service 123 transmits the thumbnail ID of the thumbnail for displaying corresponding to the thumbnail URL to MCS 36, and requests MCS 36 to open the thumbnail file. The thumbnail file is opened by using, for example, a function "boolean mcsOpenThumbnail (unsignedInt thumbnailID)" to open a thumbnail, where the thumbnail ID is a parameter.

In step S3512 after step S3511, MCS 36 reads the thumbnail for displaying corresponding to the thumbnail ID from the system memory 62, the local memory 67, or HDD 68, for example using the thumbnail ID received from the document control service 123, and transmits the thumbnail for displaying to the document control service 123. The thumbnail for displaying corresponding to the thumbnail ID is transmitted from MCS 36 to the document control service 123 as the value of the function to open the thumbnail.

In step S3513 after step S3512, the document control service 123 transmits the thumbnail for displaying received from MCS 36 to the network service 122. The thumbnail for displaying is transmitted from the document control service 123 to the network service 122 as a value of the function to obtain thumbnail.

In step S3514 after step S3513, the network service 122 transmits the thumbnail for displaying received from the document control service 123 to the network apparatus 2 via httpd 121 of NCS 31.

The network apparatus 2 displays the thumbnail for displaying obtained from the multifunctional apparatus 1 on the screen of the browser 120. The document control service 123 deletes the generated thumbnail for displaying after the validity of the ticket 124 is terminated. The thumbnail for displaying is deleted using, for example, a function "void mcsDeleteThumbnail (unsignedInt thumbnailId)" to delete a thumbnail for displaying, where the thumbnail ID is a parameter.

Accordingly, the user can easily obtain the thumbnail for displaying of a stored document stored in the multifunctional apparatus 1 by operating the browser 120 of the network apparatus 2. Additionally, since the ticket 124 is transferred instead of the thumbnail for displaying, the multifunctional apparatus 1 can prevent its resources from being wasted.

Second Embodiment

Figure 25:
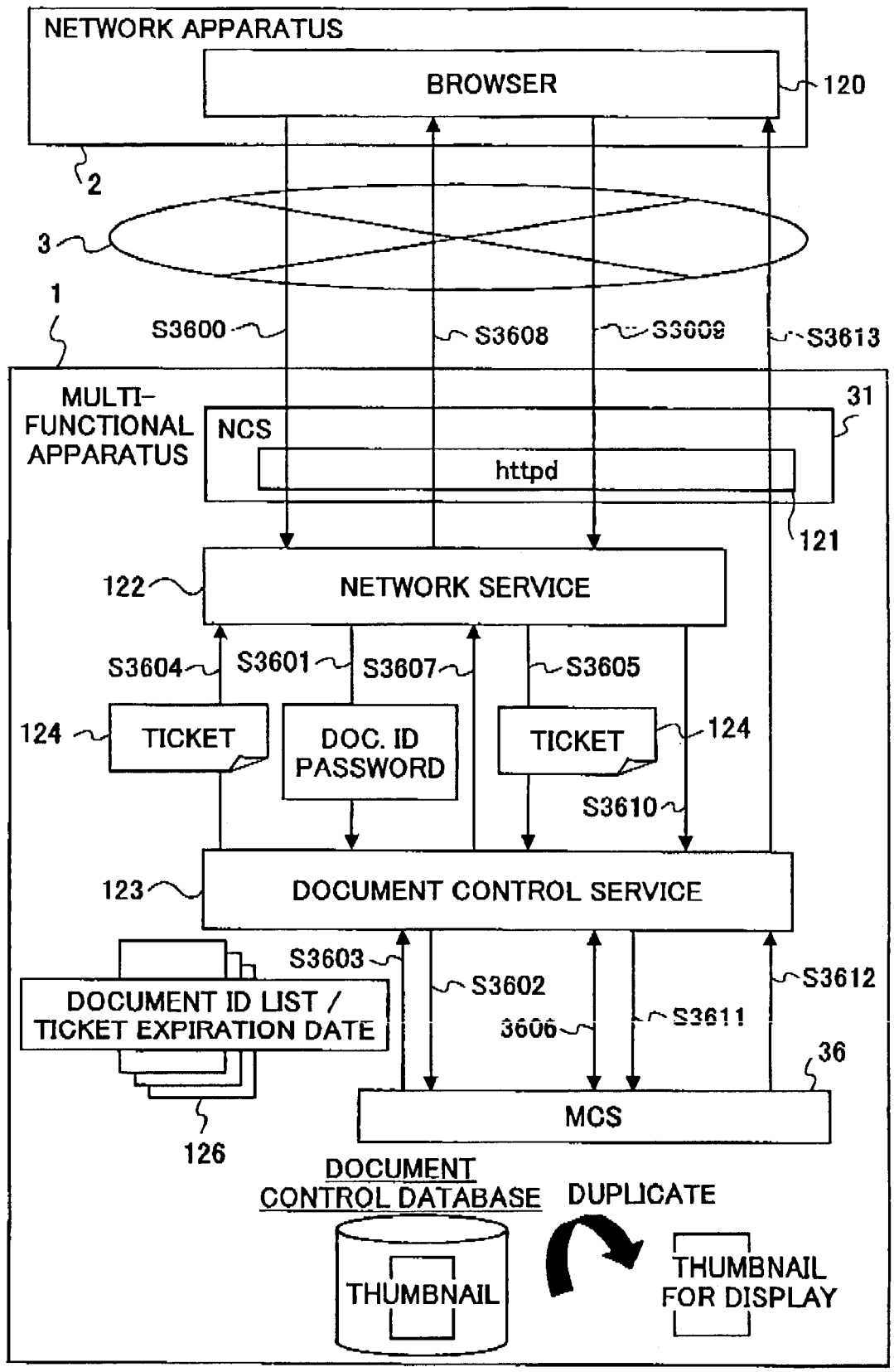
FIG. 25 is a schematic diagram for explaining a method of obtaining a duplicated thumbnail for displaying according to the second embodiment.

FIG. 25 is a schematic diagram for explaining a method of obtaining a thumbnail according to an embodiment. In FIG. 25, functional elements irrelevant to the description are not shown.

Since steps S3600 through S3612 of FIG. 25 are identical to steps S3500 through S3512 of FIG. 25, their description will be omitted.

In step S3613 after step S3612, the document control service 123 transmits the thumbnail for displaying received from MCS 36 in step S3612 to the network apparatus 2 via the httpd 121 of NCS 31.

The network apparatus 2 displays the thumbnail for displaying obtained from the multifunctional apparatus 1 on the screen of the browser 136. In addition, the document control service 123 deletes the generated thumbnail for displaying after the validity of the ticket 124 is terminated.

Accordingly, the user can easily obtain the thumbnail for displaying of a stored document stored in the multifunctional apparatus 1 by operating the browser 120 of the network apparatus 2. On the other hand, since the ticket 124 is transferred instead of the thumbnail for displaying itself, the multifunctional apparatus 1 can prevent its resources from being wasted.

Third Embodiment

Figure 26:
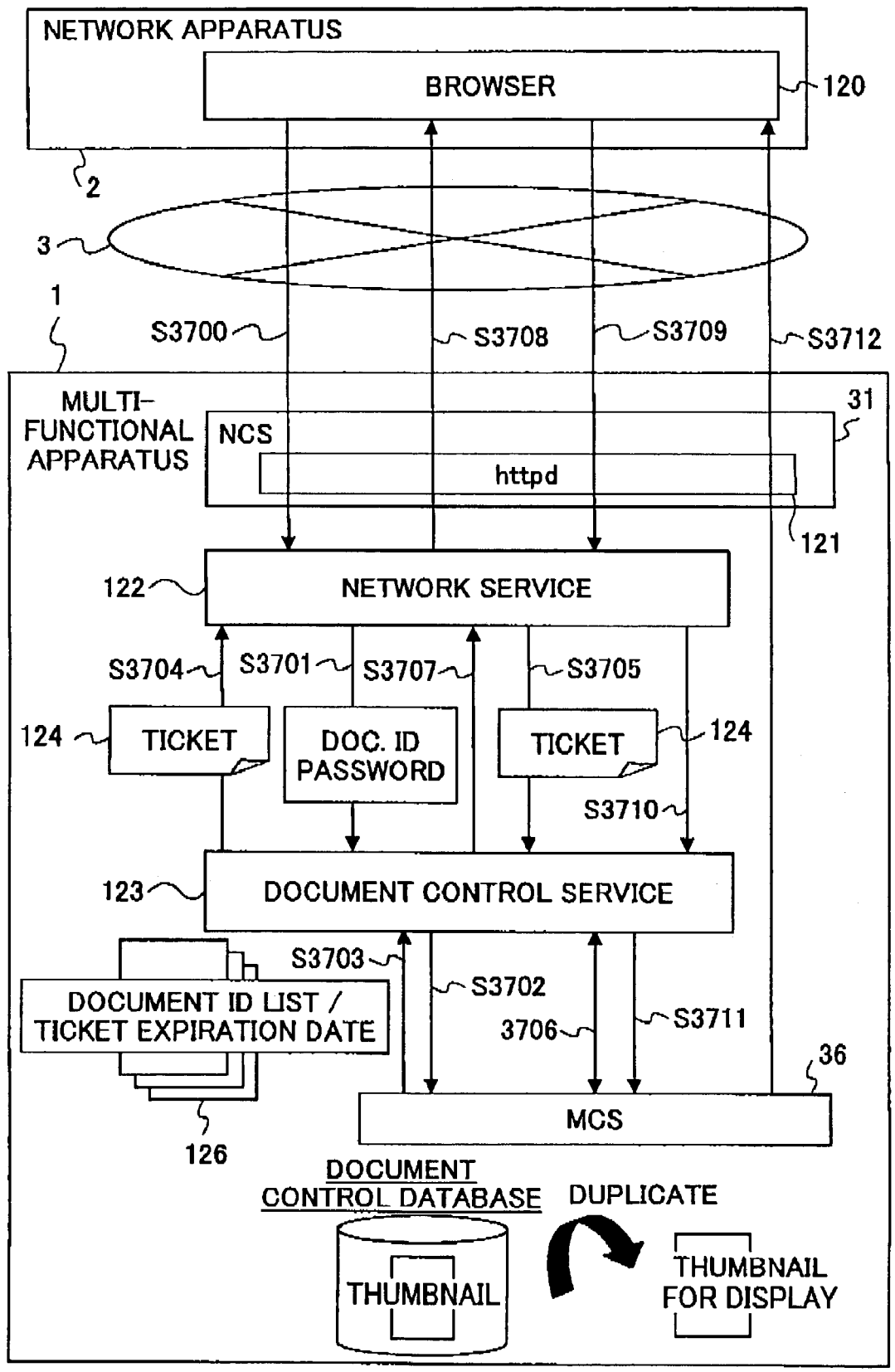
FIG. 26 is a schematic diagram for explaining a method of obtaining a duplicated thumbnail for displaying according to the third embodiment.

FIG. 26 is a schematic diagram for explaining a method of obtaining a thumbnail according to an embodiment. In FIG. 26, functional elements irrelevant to the description are not shown. Since steps S3700 through S3711 of FIG. 26 are identical to steps S3500 through S3511 of FIG. 26, their description is omitted.

In step S3712 after step S3711, the MCS 36 reads the thumbnail for displaying corresponding to the thumbnail ID from HDD 68, for example, using the thumbnail ID received from the document control service 123, and transmits the read thumbnail for displaying to the network apparatus 2 via the httpd 121 of NCS 31.

The network apparatus 2 displays the thumbnail for displaying obtained from the multifunctional apparatus 1 on the screen of the browser 120. In addition, the document control service 123 deletes the generated thumbnail for displaying after the validity of the ticket 124 is terminated.

Accordingly, the user can easily obtain the thumbnail for displaying of a stored document stored in the multifunctional apparatus 1 by operating the browser 120 of the network apparatus 2. Additionally, since the ticket 124 is transferred instead of the thumbnail for displaying, the multifunctional apparatus 1 can prevent its resources from being wasted.

6. Method of Outputting a Thumbnail for Outputting

An image forming apparatus that outputs a thumbnail for outputting will be described by reference to the drawings referred to in the previous description.

First Embodiment

The image forming apparatus according to this embodiment will be described by reference to FIG. 7. The image forming apparatus according to this embodiment is different from the image forming apparatus previously described by reference to FIG. 7 in that the image forming apparatus according to this embodiment uses a "thumbnail for outputting" that is a duplicate of the thumbnail of a stored document.

In the case of the multifunctional apparatus 1 according to this embodiment, in step S706, the document output service 130 transmits the ticket 124 received in step S705 to the document control service 123, and requests the document control service 123 to generate the "thumbnail for outputting". The thumbnail for outputting is generated using, for example, a function "anyURL createThumbnail (base64Binary ticket)" to generate the thumbnail for outputting, where the ticket 124 is a parameter.

In step S707, the document control service 123 verifies the validity of the received ticket 124 using the table 126. If the ticket 124 is valid, the document control service 123 transmits the document ID included in the ticket 124 to MCS 36, and requests MCS 36 to open the thumbnail file of the stored document corresponding to the document ID, using, for example, a function "boolean mcsOpenPage (unsignedInt DocId)" to open the thumbnail, where the document ID is a parameter.

After the thumbnail file is opened, the document control service 123 generates the thumbnail for outputting, a duplicate of the thumbnail of the stored document corresponding to the document ID. The thumbnail for outputting is stored in the system memory 62, the local memory 67, or the HDD 68, for example. If the thumbnail for outputting is stored in a memory region other than the document control DB, the load to the document control DB can be reduced. The document control service 123 sets a thumbnail ID corresponding to the thumbnail for outputting.

The document control service 123 transmits the set thumbnail ID to the document output service 130. For example, the thumbnail ID is transmitted from the document control service 123 to the document output service 130 as the value of the function to generate a thumbnail for outputting.

In step S708, the document output service 130 transmits the thumbnail ID received in step S707, and outputs the thumbnail for outputting corresponding to the thumbnail ID. For example, ECS 35 reads the thumbnail for outputting from the HDD, using the thumbnail ID, and prints the thumbnail for outputting.

The document control service 123 deletes the generated thumbnail for outputting after the validity of the thicket 124 terminates. The thumbnail for outputting is deleted using, for example, a function "void mcsDeleteThumbnail (unsignedInt thumbnailId) to delete a thumbnail for outputting, where the thumbnail ID is a parameter.

Accordingly, the user can easily output the thumbnail for outputting stored in the multifunctional apparatus 1 by operating the browser 120 of the network apparatus 2. Additionally, thanks to the use of the ticket 124, the multifunctional apparatus 1 according to this embodiment does not need to transfer the large amount of data of the thumbnail for outputting, and the multifunctional apparatus 1 can use its resources efficiently. In addition, because the ticket 124 is transferred to the document output service 130, the document output service 130 can output the thumbnail for outputting that is already authenticated without receiving the password.

Second Embodiment

The multifunctional apparatus according to this embodiment will be described by reference to FIG. 9. The multifunctional apparatus according to this embodiment is different from the image forming apparatus previously described by reference to FIG. 9 in that the image forming apparatus according to this embodiment uses a "thumbnail for outputting" that is a duplicate of the thumbnail of a stored document.

Since steps S900 through S908 are identical to steps S700 through S708 of the multifunctional apparatus 1 according to the above first embodiment, their description will be omitted.

In step S909 after step S908, the document output service 130 transmits the result of the output operation to the network apparatus 2 via the httpd 121 of NCS 31. The network apparatus 2 displays the result of the output operation received from the multifunctional apparatus 1 on the screen of the browser 120. The document control service 123 deletes the generated thumbnail for outputting after the validity of the ticket 124 terminates.

Accordingly, the user can easily output the thumbnail for outputting stored in the multifunctional apparatus 1 by operating the browser 120 of the network apparatus 2. Additionally, thanks to the use of the ticket 124, the multifunctional apparatus 1 according to this embodiment does not need to transfer the large amount of data of the thumbnail for outputting, and the multifunctional apparatus 1 can use its resources efficiently. In addition, because the ticket 124 is transferred to the document output service 130, the document output service 130 can output the thumbnail for outputting that is already authenticated without receiving the password.

Third Embodiment

The image forming apparatus according to this embodiment will be described by reference to FIG. 12. The multifunctional apparatus according to this embodiment is different from the image forming apparatus previously described by reference to FIG. 12 in that the image forming apparatus according to this embodiment uses a "thumbnail for outputting" that is a duplicate of the thumbnail of a stored document.

In the case of the multifunctional apparatus 1 according to this embodiment, in step S1205, the network service 122 transmits the ticket 124 received from the document control service 123 to the document control service 123, and requests the document control service 123 to generate the "thumbnail for outputting". The thumbnail for outputting is generated using, for example, a function "anyURL createThumbnail (base64Binary ticket)" to generate the thumbnail for outputting, where the ticket 124 is a parameter.

In step S1206 after S1205, the document control service 123 checks the validity of the ticket 124 using the table 126. If the ticket 124 is valid, the document control service 123 transmits the document ID included in the ticket 124 to MCS 36, and requests MCS 36 to open the thumbnail file of the stored document corresponding to the document ID. After the thumbnail is opened, the document control service 123 generates the thumbnail for outputting by duplicating the thumbnail of the stored document corresponding to the document ID. The thumbnail for outputting is stored in the system memory 62, the local memory 67, or the HDD 68, for example. If the thumbnail for outputting is stored in a memory region other than the document control DB, the load to the document control DB can be reduced. The document control service 123 sets a thumbnail ID corresponding to the thumbnail for outputting, and transmits the thumbnail ID to the network service 122. For example, the thumbnail ID is transmitted from the document control service 123 to the network service 122 as the value of the function to generate a thumbnail for outputting.

The document control service 123 deletes the generated thumbnail for outputting after the validity of the thicket 124 terminates. The thumbnail for outputting is deleted using, for example, a function "void mcsDeleteThumbnail (unsignedInt thumbnailId) to delete a thumbnail for outputting, where the thumbnail ID is a parameter.

Accordingly, the user can easily output the thumbnail for outputting stored in the multifunctional apparatus 1 by operating the browser 120 of the network apparatus 2. Additionally, thanks to the use of the ticket 124, the multifunctional apparatus 1 according to this embodiment does not need to transfer the large amount of data of the thumbnail for outputting, and the multifunctional apparatus 1 can use its resources efficiently. In addition, because the ticket 124 is transferred to the document output service 130, the document output service 130 can output the thumbnail for outputting that is already authenticated without receiving the password.

Fourth Embodiment

The image forming apparatus according to this embodiment will be described by reference to FIG. 13. The multifunctional apparatus according to this embodiment is different from the image forming apparatus previously described by reference to FIG. 13 in that the image forming apparatus according to this embodiment uses a "thumbnail for outputting" that is a duplicate of the thumbnail of a stored document.

In the case of the multifunctional apparatus 1 according to this embodiment, in step S1309, the network service 122 transmits the ticket 124 and the session ID 151 of the document control service received in step S1308 to the document control service 123, and requests the document control service to generate the thumbnail for outputting that is used for output operation.

In step S1310 after step S1309, the document control service 123 checks the validity of the received ticket 124 using the table 126. If the ticket 124 is valid, the document control service 123 transmits the document ID included in the ticket 124 to MCS 36, and request MCS 36 to open the thumbnail file of the stored document corresponding to the document ID.

After the thumbnail file is opened, the document control service 123 generates the thumbnail for outputting by duplicating the thumbnail of the stored document corresponding to the document ID. The thumbnail for outputting is stored in the system memory 62, the local memory 67, or the HDD 68, for example. If the thumbnail for outputting is stored in a memory region other than the document control DB, the load to the document control DB can be reduced. The document control service 123 sets a thumbnail ID corresponding to the thumbnail for outputting, and transmits the thumbnail ID to the network service 122.

Accordingly, the user can easily output the thumbnail for outputting stored in the multifunctional apparatus 1 by operating the browser 120 of the network apparatus 2. Additionally, thanks to the use of the ticket 124, the multifunctional apparatus 1 according to this embodiment does not need to transfer the large amount of data of the thumbnail for outputting, and the multifunctional apparatus 1 can use its resources efficiently. In addition, because the ticket 124 is transferred to the document output service 130, the document output service 130 can output the thumbnail for outputting that is already authenticated without receiving the password.

Additionally, because document control service 123 and the document output service 130 do not communicate directly, the document output service 130 does not become a client of the document control service 123, and consequently, complex communication processing is not required.

Fifth Embodiment

The image forming apparatus according to this embodiment will be described by reference to FIG. 14. The multifunctional apparatus according to this embodiment is different from the image forming apparatus previously described by reference to FIG. 14 in that the image forming apparatus according to this embodiment uses a "thumbnail for outputting" that is a duplicate of the thumbnail of a stored document.

In the case of the multifunctional apparatus 1 according to this embodiment, in step S1407, the output service 130 transmits the ticket 124 and the session ID 151 of the document control service received from the network service 122 to the document control service 123, and requests the document control service 123 to generate the "thumbnail for outputting" that is used for output operation.

In step S1408 after step S1407, the document control service 123 checks the validity of the received ticket 124 using the tables 126. If the ticket 124 is valid, the document control service 123 transmits the document ID included in the ticket 124 to MCS 36 and requests MCS 36 to open the thumbnail file of the stored document corresponding to the document ID. After opening the thumbnail file, the document control service 123 generates the thumbnail for outputting by duplicating the thumbnail of the stored document corresponding to the document ID. The thumbnail for outputting is stored in the system memory 62, the local memory 67, or the HDD 68, for example. If the thumbnail for outputting is stored in a memory region other than the document control DB, the load to the document control DB can be reduced. The document control service 123 sets a thumbnail ID corresponding to the thumbnail for outputting, and transmits the thumbnail ID to the document output service 130.

Accordingly, the user can easily output the thumbnail for outputting stored in the multifunctional apparatus 1 by operating the browser 120 of the network apparatus 2. Additionally, thanks to the use of the ticket 124, the multifunctional apparatus 1 according to this embodiment does not need to transfer the large amount of data of the thumbnail for outputting, and the multifunctional apparatus 1 can use its resources efficiently. In addition, because the ticket 124 is transferred to the document output service 130, the document output service 130 can output the thumbnail for outputting that is already authenticated without receiving the password.

Sixth Embodiment

The image forming apparatus according to this embodiment will be described by reference to FIG. 10. The multifunctional apparatus according to this embodiment is different from the image forming apparatus previously described by reference to FIG. 10 in that the image forming apparatus according to this embodiment uses a "thumbnail for outputting" that is a duplicate of the thumbnail of a stored document.

In the case of the multifunctional apparatus 1 according to this embodiment, in step S1005, the document output service 130 transmits the ticket 124 received in step S1004 to the document control service 123, and requests the document control service 123 to generate the thumbnail for outputting that is used in output operation. The thumbnail for outputting is generated using, for example, for example, a function "anyURL createThumbnail (base64Binary ticket)" to generate the thumbnail for outputting, where the ticket 124 is a parameter.

In step S1006 after step S1005, the document control service 123 checks the validity of the ticket 124 using the table 126. If the ticket 124 is valid, the document control service 123 obtains the document ID corresponding to the ticket ID included in the ticket 124 from the table 126.

The document control service 123 transmits the obtained document ID to MCS 36, and requests MCS 36 to open the thumbnail file of the stored document corresponding to the document ID. The thumbnail file is opened using, for example, a function "boolean mcsOpenPage(unsignedInt DocId)" to open thumbnail, where the document ID is a parameter.

After the thumbnail is opened, the document control service 123 generates the thumbnail for outputting by duplicating the thumbnail of the stored document corresponding to the document ID. The thumbnail for outputting is stored in the system memory 62, the local memory 67, or the HDD 68, for example. If the thumbnail for outputting is stored in a memory region other than the document control DB, the load to the document control DB can be reduced. The document control service 123 sets a thumbnail ID corresponding to the thumbnail for outputting, and transmits the thumbnail ID to the document output service 130.

In step S1007, the document output service 130 transmits the thumbnail ID received in step S1006 to ECS 35, and outputs (print, in this case) the thumbnail for outputting. For example, ECS 35 reads the thumbnail for outputting from the HDD 68 using the thumbnail ID.

The document control service 123 deletes the generated thumbnail for outputting after the validity of the thicket 124 terminates. The thumbnail for outputting is deleted using, for example, a function "void mcsDeleteThumbnail (unsignedInt thumbnailId) to delete a thumbnail for outputting, where the thumbnail ID is a parameter.

Seventh Embodiment

The image forming apparatus according to this embodiment will be described by reference to FIG. 11. The multifunctional apparatus according to this embodiment is different from the image forming apparatus previously described by reference to FIG. 11 in that the image forming apparatus according to this embodiment uses a "thumbnail for outputting" that is a duplicate of the thumbnail of a stored document.

Because steps S1100 through S1102 of FIG. 11 are identical to steps S1000 through S1002 of the multifunctional apparatus 1 according to the sixth embodiment described by reference to FIG. 10, their description will be omitted.

In the step S1103, the document control service 123 stores the generated ticket 124 in a HTTP session object 152 so that the ticket 124 corresponds to a HTTP session ID 153. After step S1103, the document control service 123 transmits, using SOAP and XML, a HTTP session ID 153 corresponding to the HTTP session object 152 to the network apparatus 2 via httpd 121 of NCS 31 and the network 3 in step S1104.

In step S1105, the network apparatus 2 transmits, using SOAP and XML, the HTTP session ID 153 received in step S1104 to the document output service 130 of the multifunctional apparatus 1, and requests the document output service 130 to output the thumbnail.

In step S1106, the document output service 130 refers to the HTTP session object 152, and obtains the ticket 124 corresponding to the HTTP session ID 153 received in step S1105.

The document output service 130 may determine whether the network apparatus 2 that receives the HTTP session ID 153 in step S1104 and the network apparatus 2 that transmits the HTTP session ID 153 in step S1105 are the same. If they are different, the document output service 130 may not accept the request to output the stored document from the different network apparatus 2.

Since steps S1107 through S1110 in FIG. 11 are identical to steps S1005 through S1008 of FIG. 10, their description will be omitted.

As described above, the multifunctional apparatus 1 and the network apparatus 2 exchange the HTTP session ID 153 corresponding to the HTTP session object 152 storing the ticket 124 therein instead of the ticket 124 itself through the network 3 so as to improve the security of information.

Eighth Embodiment

The image forming apparatus according to this embodiment will be described by reference to FIG. 17.The image forming apparatus according to this embodiment is different from the image forming apparatus previously described by reference to FIG. 17 in that the image forming apparatus according to this embodiment uses a "thumbnail for outputting" that is a duplicate of the thumbnail of a stored document.

In the case of the multifunctional apparatus 1 according to this embodiment, in step S1705, the document output service 130 transmits the ticket 124 received in step S1704 to the document control service 123, and requests the document control service 123 to generate the thumbnail for outputting that is used in output operation. The thumbnail for outputting is generated using, for example, a function "anyURL createThumbnail (base64Binary ticket) to generate a thumbnail for outputting, where the ticket 124 is a parameter.

In step S1706 after step S1705, the document control service 123 checks the validity of the received ticket 124 using the table 126. If the ticket 124 is valid, the document control service 123 transmits the document ID included in the ticket 124 to MCS 36, and requests MCS 36 to open the thumbnail file of the stored document corresponding to the document ID.

After the thumbnail file is opened, the document control service 123 generates the thumbnail for outputting, a duplicate of the thumbnail of the stored document corresponding to the document ID. The thumbnail for outputting is stored in the system memory 62, the local memory 67, or the HDD 68, for example. If the thumbnail for outputting is stored in a memory region other than the document control DB, the load to the document control DB can be reduced.

The document control service 123 sets a thumbnail ID corresponding to the thumbnail for outputting, and transmits the thumbnail ID to the document output service 130. For example, the thumbnail ID is transmitted from the document control service 123 to the document output service 130 as the value of the function to generate a thumbnail for outputting.

The document control service 123 deletes the generated thumbnail for outputting after the validity of the thicket 124 terminates. The thumbnail for outputting is deleted using, for example, a function "void mcsDeleteThumbnail (unsignedInt thumbnailId) to delete a thumbnail for outputting, where the thumbnail ID is a parameter.

Accordingly, the user can easily output the thumbnail for outputting stored in the multifunctional apparatus 1 by operating the browser 120 of the network apparatus 2. Additionally, thanks to the use of the ticket 124, the multifunctional apparatus 1 according to this embodiment does not need to transfer the large data of the thumbnail for outputting, and the multifunctional apparatus 1 can use its resources efficiently. In addition, because the ticket 124 in transferred to the document output service 130, the document output service 130 can output the thumbnail for outputting that is already authenticated without receiving the password.

Ninth Embodiment

The multifunctional apparatus according to this embodiment will be described by reference to FIG. 18. The multifunctional apparatus according to this embodiment is different from the image forming apparatus previously described by reference to FIG. 18 in that the image forming apparatus according to this embodiment uses a "thumbnail for outputting" that is a duplicate of the thumbnail of a stored document.

In the case of the multifunctional apparatus 1 according to this embodiment, in step S1807, the document output service 130 transmits the ticket 124 and the session ID 151 of the document control service obtained in step S1806, and requests the document control service 123 to generate the thumbnail for outputting that is used in output operation.

In step S1808 after step S1807, the document control service 123 verifies the validity of the received ticket 124 using the table 126. If the ticket 124 is valid, the document control service 123 transmits the document ID included in the ticket 124 to MCS 36, and requests MCS 36 to open the thumbnail file of the stored document corresponding to the document ID.

After the thumbnail file is opened, the document control service 123 generates the thumbnail for outputting, a duplicate of the thumbnail of the stored document corresponding to the document ID. The thumbnail for outputting is stored in the system memory 62, the local memory 67, or the HDD 68, for example. The document control service 123 sets a thumbnail ID corresponding to the thumbnail for outputting, and transmits the thumbnail ID to the document output service 130.

Tenth Embodiment

The multifunctional apparatus according to this embodiment will be described by reference to FIG. 15. The multifunctional apparatus according to this embodiment is different from the image forming apparatus previously described by reference to FIG. 15 in that the image forming apparatus according to this embodiment uses a "thumbnail for outputting" that is a duplicate of the thumbnail of a stored document.

In the case of the multifunctional apparatus 1 according to this embodiment, in step 1505, the document output unit 130b transmits the ticket 124 received in step S1504 to the document control service 123a of the multifunctional apparatus 1a via NCS 31 and the httpd 121a of NCS 31a, and requests the document control service 123a to generates the thumbnail for outputting that is used for output operation.

In step S1506, the document control service 123a verifies the validity of the received ticket 124 using the table 126a. If the ticket 124 is valid, the document control service 123a obtains the document ID corresponding to the ticket ID included in the ticket 124 from the table 126a and requests to open the thumbnail file of the stored document corresponding to the document ID.

After the thumbnail file is opened, the document control service 123a generates the thumbnail for outputting by duplicating the thumbnail of the stored document corresponding to the document ID. The thumbnail for outputting is stored in the system memory 62, the local memory 67, or the HDD 68, for example. If the thumbnail for outputting is stored in a memory region other than the document control DB, the load to the document control DB can be reduced. The document control service 123a reads the thumbnail for outputting from the HDD 68, for example, and transmits the thumbnail for outputting to the document output service 130b of the multifunctional apparatus 1b via the httpd 121a of NCS 31a and NCS 31b.

In step S1507, the document output service 130b transmits the thumbnail for outputting received in step S1506 to DCS 32b, FCS 34b, or ECS 35b to output the thumbnail for outputting.

The document control service 123 deletes the generated thumbnail for outputting after the validity of the ticket 124 terminates.

Accordingly, the user can easily output, from the multifunctional apparatus 1b, the thumbnail for outputting stored in the multifunctional apparatus 1a using the document control service 123a by operating the browser 120 of the network apparatus 2. In addition, because the ticket 124 is transferred to the document output service 130b, the document output service 130b can output the thumbnail for outputting that is already authenticated without receiving the password.

Eleventh Embodiment

The multifunctional apparatus according to this embodiment will be described by reference to FIG. 16. The multifunctional apparatus according to this embodiment is different from the image forming apparatus previously described by reference to FIG. 16 in that the image forming apparatus according to this embodiment uses a "thumbnail for outputting" that is a duplicate of the thumbnail of a stored document.

In the case of the multifunctional apparatus 1 according to this embodiment, in step 1605, the document output unit 130b transmits the ticket 124 and the session ID 151 of the document control service received in step S1604 to the document control service 123a of the multifunctional apparatus 1a via NCS 31b and the httpd 121a of NCS 31a, and requests the document control service 123a to generates the thumbnail for outputting that is used for output operation.

In step S1606, the document control service 123a verifies the validity of the received ticket 124 using the table 126a. If the ticket 124 is valid, the document control service 123a obtains the document ID corresponding to the ticket ID included in the ticket 124 from the table 126a, and requests to open the thumbnail file of the stored document corresponding to the document ID.

After the thumbnail file is opened, the document control service 123a generates the thumbnail for outputting by duplicating the thumbnail of the stored document corresponding to the document ID. The thumbnail for outputting is stored in the system memory 62, the local memory 67, or the HDD 68, for example. If the thumbnail for outputting is stored in a memory region other than the document control DB, the load to the document control DB can be reduced. The document control service 123a reads the thumbnail for outputting from the HDD 68, for example, and transmits the thumbnail for outputting to the document output service 130b of the multifunctional apparatus 1b via the httpd 121a of NCS 31a and NCS 31b.

The document control service 123 deletes the generated thumbnail for outputting after the validity of the ticket 124 terminates.

Accordingly, the user can easily output, from the multifunctional apparatus 1b, the thumbnail for outputting stored in the multifunctional apparatus 1a using the document control service 123a by operating the browser 120 of the network apparatus 2. In addition, because the ticket 124 is transferred to the document output service 130b, the document output service 130b can output the thumbnail for outputting that is already authenticated without receiving the password.

The preferred embodiments of the present invention are described above. The present invention is not limited to these embodiments, but various variations and modifications may be made without departing from the scope of the present invention.

This patent application is based on the following Japanese priority patent applications: No. 2002-076865 filed on Mar. 19, 2002; No. 2002-079118 filed on Mar. 20, 2002; No. 2002-081426 filed on Mar. 22, 2002; No. 2002-164406 filed on Jun. 5, 2002; No. 2002-164407 filed on Jun. 5, 2002; No. 2002-164408 filed on Jun. 5, 2002; No. 2002-183532 filed on Jun. 24, 2002; No. 2002-215542 filed on Jul. 24, 2002; No. 2003-68148 filed on Mar. 13, 2003; No. 2003-68149 filed on Mar. 13, 2003; No. 2003-68150 filed on Mar. 13, 2003; No. 2003-70910 filed on Mar. 14, 2003; No. 2003-70911 filed on Mar. 14, 2003; No. 2003-70912 filed on Mar. 14, 2003; No. 2003-70924 filed on Mar. 14, 2003. The entire contents of the above Japanese priority patent applications are hereby incorporated by reference.

What is claimed is:

1. An image forming apparatus comprising:
a hardware resource used for image forming;
a program configured to process a user service related to image forming stored on a computer readable medium;
a document storage unit configured to store one or more documents;
a network service unit configured to receive, from an external network apparatus, a first request to obtain a particular document stored in said document storage unit; and
a document control service unit configured to generate authentication information corresponding to the first request in response to the receipt of a password and transmit the generated authentication information to said network service unit which stores the authentication information, the authentication information authenticating the network service unit thus enabling the network service unit to retrieve the particular document from said document storage unit by sending the authentication information along with a request for the particular document.

2. The image forming apparatus as claimed in claim 1, wherein said network service unit sends said document control service unit a second request to retrieve the particular document from said document storage unit along with the authentication information; and said document control service unit transmits said particular document in response to reception of the second request.

3. The image forming apparatus as claimed in claim 2, wherein said network service unit is further configured to transmit a third request to obtain the particular document using said authentication information to said document control service unit, said document control service unit is further configured to receive the third request from the network service unit, to obtain the particular document from the document storage unit and to transmit the particular document to the network service unit, and said network service unit is further configured to transmit the particular document, transmitted from said document control service unit, to said external network apparatus.

4. The image forming apparatus as claimed in claim 2, wherein said network service unit transmits a third request to obtain the particular document using said authentication information to said document control service unit; and said document control service unit obtains the particular document from said document storage unit, and transmits the obtained particular document to said external network apparatus.

5. The image forming apparatus as claimed in claim 2, wherein said network service unit transmits a third request to obtain the particular document using said authentication information to said document control service unit; and said document control service unit causes a memory control service unit to obtain the particular document and to transmit the particular document to the external network apparatus, wherein said memory control service unit controls the storage of the one or more documents of said document storage unit.

6. The image forming apparatus as claimed in claim 1, wherein the first request to obtain the particular document includes at least identification information to identify the particular document.

7. The image forming apparatus as claimed in claim 1, wherein said document control service unit generates, in response to the first request, said authentication information, transmits the authentication information to said network service unit, and also keeps said authentication information.

8. The image forming apparatus as claimed in claim 7, wherein said network service unit transmits a third request to obtain the particular document to said document control service unit, the third request including the identification information transmitted from said document control service unit; and said document control service unit identifies the kept authentication information using said identification information included in the third request to obtain said stored document.

9. The image forming apparatus as claimed in claim 3, wherein said network service unit obtains said authentication information corresponding to the third request to obtain said stored document using a predefined function.

10. The image forming apparatus as claimed in claim 3, wherein said document control service unit obtains the particular document corresponding to said authentication information using a predefined function.

11. The image forming apparatus as claimed in claim 5, wherein said document control service unit causes said memory control service unit to obtain the particular document corresponding to said authentication information and to provide the particular document corresponding to said authentication information to said external network apparatus using a predefined function.

12. A method of obtaining a stored document for an image forming apparatus having a hardware resource used for image forming, a program that processes a user service related to image forming, a document storage unit that stores therein a stored document, and network service unit and a document control service unit, comprising:

receiving a first request by said network service unit to obtain said stored document stored in said document storage unit from an external network apparatus;

receiving a second request by said document control service unit to obtain said stored document including a password from the network service and generating authentication information corresponding to the second request to obtain said stored document, the authentication information authenticating the network service unit thus enabling the network service unit to retrieve the stored document from said document storage unit by sending the authentication information along with a request for the stored document; and obtaining and storing, by said network service unit, said authentication information from said document control service unit which is used to authenticate the network service unit and enable the network service to obtain said stored document from said document control service unit.

13. The method as claimed in claim 12, further comprising:

transmitting the second request by said network service unit to obtain said stored document using said authentication information to said document control service unit;

obtaining, by said document control service unit, said stored document corresponding to said authentication information from said document storage unit and transmitting the obtained stored document to said network service unit; and providing, by said network service unit said stored document transmitted from said document control service unit to said external network apparatus.

14. The method as claimed in claim 12, further comprising:

transmitting the second request by said network service unit to obtain said stored document using said authentication information to said document control service unit; and obtaining, by said document control service unit, said stored document corresponding to said authentication information from said document storage unit and providing the obtained stored document to said external network apparatus.

15. The method as claimed in claim 12, further comprising:

transmitting the second request by said network service unit to obtain said stored document using said authentication information to said document control service unit; and causing a memory control service unit, by said document control service unit, to obtain said stored document corresponding to said authentication information and to provide said stored document corresponding to said authentication information to said external network apparatus.

* * * * *